(12) United States Patent
Repici

(10) Patent No.: US 7,814,038 B1
(45) Date of Patent: Oct. 12, 2010

(54) FEEDBACK-TOLERANT METHOD AND DEVICE PRODUCING WEIGHT-ADJUSTMENT FACTORS FOR PRE-SYNAPTIC NEURONS IN ARTIFICIAL NEURAL NETWORKS

(76) Inventor: Dominic John Repici, 120 Jefferson St., Riverside, NJ (US) 08075

( * ) Notice: Subject to any disclaimer, the term of this patent is extended or adjusted under 35 U.S.C. 154(b) by 559 days.

(21) Appl. No.: 11/951,611

(22) Filed: Dec. 6, 2007

(51) Int. Cl.
  *G06F 15/18* (2006.01)
  *G06N 3/08* (2006.01)
(52) U.S. Cl. ...................................... 706/25
(58) Field of Classification Search .................... 706/25
   See application file for complete search history.

(56) References Cited

U.S. PATENT DOCUMENTS

| | | | |
|---|---|---|---|
| 5,050,095 A | 9/1991 | Samad | |
| 5,136,687 A | * 8/1992 | Edelman et al. | ............... 706/20 |
| 5,168,550 A | 12/1992 | Sakaue et al. | |
| 5,212,767 A | 5/1993 | Higashino et al. | |
| 5,257,342 A | 10/1993 | Takatori et al. | |
| 5,293,454 A | 3/1994 | Kamiya | |
| 5,355,434 A | 10/1994 | Yoneda et al. | |
| 5,430,829 A | 7/1995 | Takatori et al. | |
| 5,430,830 A | 7/1995 | Frank et al. | |
| 5,448,681 A | 9/1995 | Khan | |
| 5,450,528 A | 9/1995 | Chung et al. | |
| 5,459,817 A | 10/1995 | Shima | |
| 5,473,730 A | 12/1995 | Simard | |
| 5,555,345 A | 9/1996 | Komori et al. | |
| 5,563,983 A | 10/1996 | Nozaki et al. | |
| 5,572,628 A | 11/1996 | Denker et al. | |
| 5,608,843 A | 3/1997 | Baird, III | |
| 5,613,042 A | 3/1997 | Chung et al. | |
| 5,630,020 A | 5/1997 | Makram-Ebeid | |
| 5,644,681 A | 7/1997 | Takahashi et al. | |
| 5,704,016 A | 12/1997 | Shigematsu et al. | |
| 5,720,002 A | 2/1998 | Wang | |
| 5,748,848 A | 5/1998 | Tresp | |
| 5,768,476 A | 6/1998 | Sugaya et al. | |
| 5,802,507 A | 9/1998 | Gentric et al. | |
| 5,806,053 A | 9/1998 | Tresp et al. | |
| 5,822,742 A | 10/1998 | Alkon et al. | |

(Continued)

OTHER PUBLICATIONS

Toward Unification of Source Attribution Processes and Techniques, Khosmood, F.; Levinson, R.; Machine Learning and Cybernetics, 2006 International Conference on Digital Object Identifier: 10.1109/ICMLC.2006.258376 Publication Year: 2006 , pp. 4551-4556.*

(Continued)

*Primary Examiner*—Michael Holmes

(57) ABSTRACT

In an artificial neural network a method and neuron device that produce weight-adjustment factors, also called error values (116), for pre-synaptic neurons (302a ... 302c) that are used to adjust the values of connection weights (106 ... 106n) in neurons (100) used in artificial neural networks (ANNs). The amount of influence a pre-synaptic neuron has had over a post-synaptic neuron is calculated during signal propagation in the post-synaptic neuron (422a ... 422n) and accumulated for the pre-synaptic neuron (426) for each post-synaptic neuron to which the pre-synaptic neuron's output is connected (428). Influence values calculated for use by pre-synaptic neurons may further be modified by the post-synaptic neuron's output value (102) (option 424), and its error value (116) (option 1110).

18 Claims, 14 Drawing Sheets

U.S. PATENT DOCUMENTS

| | | | |
|---|---|---|---|
| 5,832,465 | A | 11/1998 | Tom |
| 5,832,466 | A | 11/1998 | Feldgajer |
| 5,845,051 | A | 12/1998 | Oh |
| 5,870,728 | A | 2/1999 | Yatsuzuka et al. |
| 5,930,781 | A | 7/1999 | Toomarian et al. |
| 5,946,675 | A | 8/1999 | Sutton |
| 6,009,418 | A | 12/1999 | Cooper |
| 6,192,353 | B1 | 2/2001 | Assaleh et al. |
| 6,247,001 | B1 | 6/2001 | Tresp et al. |
| 6,249,781 | B1 | 6/2001 | Sutton |
| 6,263,325 | B1 | 7/2001 | Yoshida et al. |
| 6,269,351 | B1 | 7/2001 | Black |
| 6,272,479 | B1 * | 8/2001 | Farry et al. .............. 706/13 |
| 6,347,309 | B1 | 2/2002 | De Tremiolles et al. |
| 6,401,082 | B1 | 6/2002 | Kropas-Hughes et al. |
| 6,421,654 | B1 | 7/2002 | Gordon |
| 6,424,961 | B1 | 7/2002 | Ayala |
| 6,507,828 | B1 * | 1/2003 | Leonard et al. ............ 706/33 |
| 6,532,305 | B1 | 3/2003 | Hammen |
| 6,601,049 | B1 | 7/2003 | Cooper |
| 6,687,686 | B1 * | 2/2004 | Nervegna et al. ........... 706/15 |
| 6,745,169 | B1 | 6/2004 | Schlang et al. |
| 6,894,639 | B1 | 5/2005 | Katz |
| 6,947,915 | B2 | 9/2005 | Liang et al. |
| 6,965,885 | B2 | 11/2005 | Gutta et al. |
| 6,968,327 | B1 | 11/2005 | Kates et al. |
| 6,976,012 | B1 | 12/2005 | Rising, III |
| 7,047,225 | B2 * | 5/2006 | Poon ..................... 706/15 |
| 7,054,850 | B2 * | 5/2006 | Matsugu .................. 706/48 |
| 7,139,740 | B2 * | 11/2006 | Ayala .................... 706/26 |
| 7,287,015 | B2 * | 10/2007 | Cecchi et al. ............. 706/20 |
| 7,459,432 | B2 * | 12/2008 | Cowley et al. ............. 514/12 |

OTHER PUBLICATIONS

Using the particle swarm optimization technique to train a recurrent neural model, Salerno, J.; Tools with Artificial Intelligence, 1997. Proceedings., Ninth IEEE International Conference on Digital Object Identifier: 10.1109/TAI.1997.632235 Publication Year: 1997 , pp. 45-49.*

Hybrid system for robust recognition of noisy speech based on evolving fuzzy neural networks and adaptive filtering, Kasabov, N.; Illiev, G.; Neural Networks, 2000. IJCNN 2000, Proceedings of the IEEE-INNS-ENNS International Joint Conference on vol. 5 Digital Object Identifier: 10.1109/IJCNN.2000.861440 Publication 2000 , pp. 91-96 vol. 5.*

An adaptive function neural network (ADFUNN) for phrase recognition, Miao Kang; Palmer-Brown, D.; Neural Networks, 2005. IJCNN '05. Proceedings. 2005 IEEE International Joint Conference on vol. 1 Digital Object Identifier: 10.1109/IJCNN.2005.1555898 Publication Year: 2005 , pp. 593-597 vol. 1.*

Levitan, Irwin B. and Kaczmarek, Leonard K., The Neuron: Cell and Molecular Biology, Third Edition, ISBN: 0-19-514523-2, 2002, 603 Pages, Oxford University Press, U.S.A.

Anil K. Jain, Jianchang Mao, K.M. Mohiuddin, "Artificial Neural Networks: A Tutorial," Computer, vol. 29, No. 3, pp. 31-44, Mar., 1996.

William P. Jones, Josiah Hoskins, "Back-Propagation, A generalized delta learning rule," Byte, Oct. 1987, pp. 155-162, vol. 12, No. 11, McGraw-Hill.

DARPA, Autonomous Ground Vehicle Grand Challenges for 2004 through 2006, Internet http://www.darpa.mil/grandchallenge/overview.asp.

Douglas Eck, "Recurrent Neural Networks—A Brief Overview", Oct. 1, 2007, University of Montreal.

Dominic John Repici, "Netlab format A0 version (NLA001)", Apr. 2, 1990, http://www.JohnRepici.com/NN/.

* cited by examiner

*(Prior Art)*

*(Prior Art)*

FEEDBACK-TOLERANT METHOD AND DEVICE PRODUCING WEIGHT-ADJUSTMENT FACTORS FOR PRE-SYNAPTIC NEURONS IN ARTIFICIAL NEURAL NETWORKS

CROSS REFERENCE TO RELATED APPLICATION

The systems and embodiments described in this application may be used with those described in my copending application Ser. No. 11/689,676, filed Mar. 22, 2007, titled "Neuron And Neuron Method For Artificial Neural Networks", as indicated below.

REFERENCE TO COMPUTER PROGRAMS

Appendix I of this application consists of four attached files with program listings written in the C programming language, which implement a first embodiment (Embod1_c.txt), a second embodiment (Embod2_c.txt), a third embodiment (Embod3_c.txt), and a fourth embodiment (Embod4_c.txt) as described in this specification.

BACKGROUND

1. Field

The disclosure relates to the field of artificial neural networks. Specifically it relates to an improved learning method capable of producing neuron-level error values in non-output neurons. This permits networks to be constructed with arbitrarily complex signal feedback.

2. Prior-Art

Artificial neural networks (ANNs), are electronic circuits or software circuit simulations composed of some number of artificial neurons connected together. ANNs roughly attempt to mimic the functions of networks of biological neurons (sometimes referred to as biological brain cells), and interconnected collections of such biological brain cells. ANNs have considerable history in fields relating to automation, pattern recognition, artificial intelligence, and computation. Today they can be found in wide use in these and other fields.

In general, ANNs are systems in which some number of neurons, or neuron units (artificial brain cell simulations) are connected together. Input signals from outside of the ANN may also be connected to the inputs of some of the neurons making up the ANN. Also, some of the outputs of neurons within the ANN will generally serve as the desired output signals produced by the ANN.

ANNs differ from conventional logic circuits in that logic circuits respond with ONES or ZEROS based on static mappings between inputs and outputs. ANNs, on the other hand, can have multi-valued outputs, and change how they respond to input signals (input-to-output mappings) by altering the relative strengths of the connections between neurons. Logic circuits map (or transform) input signals to outputs based on static logic functions. In an ANN, the strength of each connection made to a neuron can be altered by a learning algorithm to produce a more desired response to a given set of inputs. A logic circuit will produce an output that is the equivalent of performing a Boolean function of its input signals. An AND gate, for example, will produce an output that represents the result of performing a Boolean AND operation on its inputs, e.g., a ONE output only when both of two inputs are ONES.

Neurons have input synapses which are roughly analogous to synapses in biological brain cells. A synapse is an input connection between the neuron and an axon (a signal-carrying nerve or means) that possesses elasticity. That is, it is a connection to the neuron in which the strength of the connection may be altered based on experiences. Artificial neurons contain connection weights within their input synapses whose values can be changed to alter the connection strength to the synapse. Such input synapses effectively modulate the strength of connections between neurons or between neurons and external signal sources. Neurons and networks of neurons can be "trained" to respond correctly to outside signals by changing the values of such connection weights. This effectively changes the strengths of those connections, which alters how a given neuron's output responds to a given set of inputs.

Neural networks consisting of neurons are typically trained ahead of time using a representative set of mappings between a set of expected inputs, and the desired outputs the network should produce in response to each of those inputs. The neural network, once trained, is able to provide responses to novel input patterns that were not known at the time it was trained. It possesses this ability because it is able to generate a new output from the patterns in the original representative training set. This leads to one of the primary advantages of neural networks. I.e., they are particularly suited for situations where the exact inputs that will be present when the network runs cannot be known ahead of time, while it is being trained.

Neuron Structure—FIG. 1

The most important element within a conventional neural network is a neuron (sometimes called a processing unit, or neurode, to distinguish it from its biological counterpart). Multiple input values are conveyed to the neuron via its synapses. Its single output or output means, in turn, conveys the result of the neuron's processing of inputs. Its output is sometimes referred to as its axon. The signals or values connected to a neuron's inputs can be the outputs of other neurons, or they can originate from external sources, such as sensors, or databases. In digital neuron systems, signals that are used as inputs and outputs are represented numerically. They are usually a positive number. In floating point representations (number of decimal places not fixed) the number is usually between 0.0 and 1.0 (inclusive), e.g., 0.1374. Other representations are possible, such as integer values or (in the case of electronic circuits) voltage levels. The values that are supplied to a neuron's input will sometimes be referred to here as axon levels (AL), because they are the value levels which the neurons permit to be conveyed on input and output axons.

Neurons also use connection weights, most often simply referred to as weights here and in the prior art. The weights are used to modulate, or gate, the values connected to each neuron's inputs. In floating-point representation, the value on a given input is gated or modulated by the weight value by simply multiplying the input value by the weight value. The term 'gate' is sometimes used here as a more general term for a modulation effect that is performed with a simple multiplication in floating-point arithmetic. The results of modulating each input value by the weight value in all the synapses in the neuron are then summed to produce a preliminary output or internal sum of all the weighted inputs for the neuron. This preliminary sum (sometimes called an internal sum) is further passed through a transfer function in order to limit the final result of the neuron processes to a predetermined range (usually 0.0 to 1.0) permitted for axon levels. The result is then made available on the output of the neuron. It can be connected to the inputs of other neurons, or used by external processes, such as motors, display indicators, or databases.

FIG. 1 shows a schematic depiction of a typical prior-art neuron along with some of its primary components. Individual neurons such as the one depicted in FIG. 1 produce very fundamental functionality, which can be combined with other neurons to produce neural networks which are capable of functioning as adaptive systems for many applications such as classification, pattern matching, and robotics. The components making up the neuron are the neuron's body 100, an output axon 102, input synapses or connections 104, 104b, . . . 104n containing weights 106, 106b, . . . 106n holding weight values (labeled $W_1$ through $W_n$ in FIG. 1). The neuron body calculates an output value (X), which is conveyed on its axon 102. The neuron's axon can be used to connect the neuron's output value to other neurons in a neural network, or to external processes. Other axons can be connected to the neuron's input synapses 104, 104b, . . . 104n. Axons 108, 108b, . . . 108n connected to the neuron via its synapses can originate at other neurons in a neural network, or from external processes. In some neural networks, they can even be fed back from their own neuron's output, or output axon 102. In many of the most popular neural network configurations, however, no feedback is used. There is no typical number of inputs to a neuron. Depending upon the application, a neuron may have as few as one input, or a few, thousands, millions, or even more inputs.

Each weight value 106, 106b, . . . 106n is depicted as a box at the synapse between the incoming axon and the neuron body.

Modulating Input Value By Weight Value—FIG. 1

In the signal propagation phase, when processing and propagating input signals, signal values are supplied to the neuron's synapses 104, 104b, . . . 104n. Each is modulated by the synapse's respective weight values 106, 106b, . . . 106n. The synapse modulating means is depicted in the diagram as a box with an asterisk for each input 105, 105b, . . . 105n. The effect of this modulation process is to pass, or gate, a portion of the input value through the synapse, which is proportional to the value of the weight. In this way, the weight value modulates the connection strength of the synapse. The result is then summed with the other similarly processed input values 110. Using conventional floating-point math, the modulating function is performed by multiplying the signal value by the weight value. It is expressed simply as:

$$r_i = A_i W_i$$

In this formula, for each of the neuron's synapses 'i', '$r_i$' is the result of that synapse's modulating function, "$A_i$" is an axon level (AL), which is the value carried by the axon that is connected to the synapse, and "$W_i$" is the weight value for modulating the input signal at the synapse. In typical neural network configurations the weight may be negative or positive. A negative weight value produces a negative result ($r_i$), which will reduce the sum, thereby acting as an inhibitory synapse. A positive weight value will produce a positive result ($r_i$), which will contribute to an increase in the sum of all the results, thereby acting as an excitatory synapse.

Weights are usually adjusted in a separately performed training procedure to bring the outputs produced in the signal propagation phase closer to a desired response for a given set of input signals. During the learning phase, the neuron is trained using an external learning algorithm 114. A set of input patterns is presented to the neuron or neural network being trained. For neurons at the output of the network, the external learning algorithm produces an error value 116 by comparing the neuron's output to predetermined set of desired outputs (responses) for the pattern. The error value represents the difference between the desired output and the output produced by the neuron. The error value is used to train the weights within the neuron so that the next time the same input pattern is presented to it, the response will be a little closer to the desired response.

Output Functions—FIG. 1

Functionally, a typical neuron can be described at a high level of abstraction as a device that accepts multiple input values and processes them to produce a single representative output value. Generally, the output value produced is the sum of all the neuron's inputs, after they have each been multiplied by their respective synapse's weight values. The neuron's output signal value is then made available for connection to other neurons or processes through its output axon (also referred to as its output).

The value carried on axon 102 is sometimes referred to here as an axon level (AL). As mentioned, the single output value produced by a neuron is a weighted sum representation of the values that are connected to the neuron's input synapses 104, 104b . . . 104n through other axons 108, 108b . . . 108n. As the values connected to its inputs change, so will the neuron's single representative output value (denoted with an X in FIG. 1).

At a more practical level, the internally produced sum of a neuron's multiple weighted inputs 110 will often be restricted to a predetermined range before being output on its axon. Typically, axon levels will be restricted to positive values between 0.0 and 1.0. Floating-point arithmetic is typically used, though other representations, such as percentages, or integer representations are also acceptable. The process that restricts the internal sum of a neuron's weighted inputs is often referred to as a squashing function 112. It is used to restrict the values produced by neurons to a reasonable range. The neuron's output value X (its axon level) can be connected to other neurons where it may then be summed together with other axon levels. These sums can become infinitely large if left to propagate unchecked. It is essential therefore, that the level at the output of each neuron be restricted, limited, or clipped in some way so that it remains in a workable range.

Selecting Transfer Function

There are a variety of squashing functions that can be used to limit the neuron's output level. Simply clipping the weighted sum of the input values to maximum and minimum values, for example, a range of 0.0 to 1.0, is one of the simplest methods. Here, any sums of weighted inputs that exceed 1.0 will be made 1.0, and any sums of weighted inputs that fall below 0.0 will be made 0.0 on the neuron's axon.

This simple clipping technique will work well as long as the levels produced by summing the weighted inputs typically stay below the level where they will be clipped. Once the internal sum exceeds the clipping maximum, differences in the input signals will not be reflected as differences in the neuron's output signal. That is, the output will be identical for all input values that cause the weighted sums to exceed the maximum axon level value. Since most weight-training algorithms assume and require that differences in inputs will be represented as differences at the neuron's resultant output value, this situation should be avoided.

Sigmoid Squashing Function—FIG. 1

A more general transfer function called a sigmoid or squashing function is often defined in the event the neuron is employed in a network with hidden layers. Such a transfer function is expressed as:

$$f(x) = \frac{1}{1+e^{-x}}$$

Here x is the result of the above described modulation and summing facilities, and e is the natural exponentiation constant (2.718281828 ... ). This will keep the output below 1.0 but will also bias weighted sums near zero to produce an output of approximately 0.5.

The output value returned by the transfer function is placed on the neuron's output axon 102 (FIG. 1). The output signal value X is an axon level, which is made available for connection to other neurons as well as to external processes on the neuron's axon, which is also referred to as its output means or simply its output.

Most prior-art neural network methods use a similar sigmoid squashing function as their transfer function. A sigmoid squashing function causes the output value to increase more slowly as its input approaches the maximum allowable level. As the maximum is approached, large increases in the internal sum will produce successively smaller increases in the resulting output value. Near the maximum side of the allowable range, this ensures that differences in input values will be represented as differences in output values on the neuron's axon (though the differences on the output will be much smaller). Its advantage over simpler schemes is that it provides at least a small amount of representative change in its output value as long as the variable has enough resolution to represent it.

The sigmoid squashing function also has benefits for internal sum values near the minimum AL value, which is usually 0.0. In this case, relatively large changes at lower values will produce smaller changes in the output. This may be a benefit in some prior-art designs. On the other hand, it may be desirable to have large changes at lower values to help effect early learning. For this reason, prior-art neurons may sometimes bias the sigmoid function in order to speed learning at lower output levels.

The sigmoid function is computationally intensive, so simpler schemes, such as approximations based on a table lookup are sometimes used. This is especially true in applications where the computational costs of the sigmoid function will tend to outweigh its benefits.

In some cases, where the designer is confident the neuron outputs will not become unreasonably large, the transfer function may be defined as simply passing the calculated internal sum to the neuron's output. In such a case, the transfer function would be expressed as:

$$f(x)=x$$

Here, the function $f(x)$ simply returns the value of it parameter x as its result. This basically makes the neuron's internally calculated weighted sum of inputs the output value of the neuron.

Two Main Phases or Modes of Operation

As discussed above, there are generally at least two main phases, or modes of functional operation for a neuron and for neural networks made up of neurons. These are a signal-propagation mode and a weight-adjustment mode. In the signal-propagation mode, input stimuli, sometimes called signals or axon levels, are supplied to the neuron, and are processed to produce the single output signal for the neuron. The output of each neuron processed in this way is then applied as input to post-synaptic neurons, which process their input in the same way. This mode of operation is sometimes referred to as the execution phase or run-time mode of a neural network. The other general operational mode of a neural network is the learning mode, which is sometimes called the weight-training, or weight-adjusting mode. Usually, a neural network is fully trained initially to perform some task, and is then placed into service running exclusively in its signal propagation mode so no further training commences.

Learning Algorithms

A neuron will map a pattern of input stimulus or signals to a desired set of output responses for a given set of input patterns. A neuron "learns" to respond correctly to a given pattern of input values by having its weight values adjusted, or trained, by a learning algorithm (114 in FIG. 1), which is sometimes called a weight-adjustment means, a weight-adjustment method, or weight training method or means. When a neuron or neural network is having its weights adjusted by a learning algorithm, it is said to be in learning mode, or weight-training mode. A learning algorithm is sometimes referred to as a weight training algorithm or just a training algorithm because it is the set of functional methods that are used to "train" weights in the neurons of the neural network.

Producing Neuron-Level Error Values In Output Layer Neurons

During this process, the weight values are adjusted higher or lower to bring the neuron's output value X closer to a desired output. For training, the desired output is predetermined for the specific pattern of values that are present on the neuron's input synapses. The first step is to produce an error term δ 116 for the neuron k, from which proportional weight changes at the neuron's connection synapses can be calculated. For a given neuron k that is directly connected to the output of the network, the error term is simply the difference between the output produced by the neuron $X^{actual}$, and the output we desire $X^{desired}$. It is expressed as:

$$\delta_k = X_k^{desired} - X_k^{actual}$$

The error term δ 116 for a given neuron is then used to adjust each individual weight value in the neuron in an effort to move the neuron's output closer to its ideal value. How these error terms are applied to adjustments of individual weight values will be discussed in more detail below.

Neural Networks With Hidden Layers

The method described above of obtaining an error value for training a neuron in a neural network breaks down when there is no direct output connection. That is, neurons in a neural network that connect only to other neurons will contribute to the network's output, but in ways that are difficult to compute. Such neurons are called hidden neurons because their outputs are hidden "behind" other neurons. Because they are usually configured in networks that use no feedback, they are almost always part of an entire layer of neurons that are hidden. For this reason, related groups of hidden neurons are generally referred to as hidden layers, or hidden slabs.

Back Propagation

Networks that do not permit a neuron's output signal to feed back to any previous or upstream neurons feeding the instant neuron are called feed-forward networks. The distinction is made in the prior art primarily because a family of gradient descent learning algorithms have been developed for feed-forward networks, which propagate error values back to hidden neurons. These algorithms are called back propagation, or back-error propagation, learning algorithms. The feed-forward neural networks they run on are often classified as back-propagation neural networks. While there are other types of networks, back-propagation networks have experienced considerable success. They have been widely used and are generally well-known.

Back propagation uses a special set of calculations to produce error values (116 in FIG. 1) for hidden layer neurons. The expression for calculating the error value at a given neuron in a hidden layer j are dependent on the error values that have been calculated at the subsequent (post-synaptic) neurons k to which neuron j is connected, along with the weight value W between the two neurons. The calculation is expressed as:

$$\delta_j = \left[\sum_k \delta_k W_{jk}\right](X_j(1-X_j))$$

Note that the output of the neuron for which the error value is being calculated $X_j$ is used in the calculation as well. Here, it represents the result of the output transfer function, further modified to represent the derivative of the sigmoid.

Adjusting Individual Weights

The error value $\delta$ calculated for a given neuron j using one of the above formulas is then incorporated in making the individual weight-adjustment calculations for the neuron j. There are a variety of ways the calculated neuron error values are used to adjust the neuron's weights. One example is given by the equation:

$$W_{ij} = W_{ij} + \eta \delta_j A_i$$

Here, i represents the pre-synaptic neuron or process that is connected to the neuron j whose weights are currently being adjusted. In this calculation $W_{ij}$ is the weight value between i and j to be adjusted by the calculation. The weight is adjusted by the neuron's error value $\delta_j$ which can be obtained using the back propagation method (for a hidden neuron) or simply subtracting the desired output from the actual output (for an output neuron). The neuron's error value is further modulated by the learning rate $\eta$ determined as part of the learning algorithm. The learning rate is generally used to slow the rate at which the weights are altered so as to reduce the amount each weight value adjustment will corrupt weight values that have already been trained on previously trained patterns.

Finally, the individual weight-adjustment value is also proportional to the output value $A_i$ produced by the pre-synaptic neuron or process connected to (and modulated by) this weight (i.e., the output value of the neuron connecting to the target neuron). If the value on the output of the pre-synaptic neuron is small, the weight-adjustment will be small in the target neuron. This particular weight-adjustment method, based on these three factors, is sometimes referred to as the GDR, or generalized delta rule. It is identical to a previous weight-adjustment calculation that was simply called the delta rule.

Neurons are Typically Used in Networks

As stated, a neuron is the primary component in a neural network. To perform a useful task, a typical neural network may be composed of a small handful, tens of thousands, or even millions of individual neurons connected together in a variety of ways and trained. Information is represented in a neural network according to the strengths of the connections between the individual neurons comprising the network. Connection strengths between neurons are represented by the weight values at each neuron's input synapses. Information is represented in these connection strengths between each neuron in a highly distributed way across all, or at least many, of the neurons and connections making up the neural network.

Typical Neural Network Structure—FIG. 2

FIG. 2 shows a simple feed-forward prior-art network structure of the kind typically used in neural networks employing the back-propagation learning algorithm. A typical example of an application for such a network would be a character recognition machine that accepts bitmaps of characters as inputs, and outputs distinct codes for each distinct character recognized. The network contains a set of input nodes 200a-200f, a hidden layer of neurons 201a-201c, and a set of output neurons 202a-202f. There may be more than one hidden layer, though in the network of FIG. 2 there is only one. Input layer nodes 200a-200f are traditionally represented as neurons in diagrams such as these, but they are usually limited to carrying only sets of input patterns into the network. The input node neurons are not normally trained and do not normally have inputs to sum. The neurons in the hidden and output layers, on the other hand, produce weighted sums of the signal values present on their inputs and have their weights adjusted during a network training phase.

The neural network is utilized by placing an input pattern on the input nodes and processing it at each of hidden layer neurons 201a-201c in signal propagation mode. This will produce an output for the pattern. The output of the hidden layer is in turn processed by the neurons in forward (post-synaptic) layers until an output pattern for the entire network is produced on the outputs of the output layer neurons 202a-202f.

Network Training Phase

Once a given input pattern is presented and propagated through the network in this way, the training phase may begin. To train existing neural networks, sets of signals representing desired exemplary input patterns are usually successively applied to the primary inputs and allowed to propagate through the neural network (as discussed) to the output. This has been referred to here as the signal propagation, or execution phase. The differences between the actual and desired output values, determined by an external teacher, are then calculated to arrive at an error signal for each output neuron. The calculated error is then used to adjust each output neuron's synapse weights. Error values used by the hidden layer neurons are calculated using the back propagation formula that depends on the error values having been calculated for all the neurons to which the target neuron is connected. Just as in the output neurons, the calculated error value is then used as a factor in the calculation used to adjust each individual weight.

The process of presenting exemplary patterns and training toward a desired output is performed in a recurring manner and typically requires a large number of iterations through all the patterns to reduce errors appearing at the primary network outputs to an acceptable level.

Adjustments need to be made slowly because, as input patterns are trained, every weight-adjustment will adversely affect the weight value adjustments performed previously for all other patterns. This is primarily the purpose of the learning rate used in the weight training calculations discussed above.

Weights Encode Mappings Between Inputs and Desired Responses

Any given weight in a neuron or in a neural network can, and likely will, contribute to a multitude of different trained responses to different input combinations. This characteristic of neural networks is both a strength and a weakness. It is a strength because it allows the neural network to generalize and apply lessons previously learned when responding to a novel set of similar inputs. That is, if the network has learned a desired output for one set of inputs, and it is then presented with a set of inputs that are almost, but not quite, identical, it will produce an output that is conceptually similar to the output it learned in response to the first training set. This same generalization behavior may also be a weakness in situations where very different responses are required for two similar input patterns. In this case, a neural network will have trouble discerning between the two similar input patterns. It will want to generalize the response learned for one pattern to produce a similar response to the other pattern.

A neural network's use of the same set of weight values to encode multiple responses doesn't necessarily eliminate its ability to discern two very similar input vectors that require very different responses. It does make such discernment difficult though, requiring more and more resolution, or bit-width from the variables used to hold weight values. In this case the small number of inputs that differ between the two sets of inputs will be responsible for all the difference in the output values. In other words, the weights for the inputs that aren't common to both sets of inputs will be adjusted deeply to compensate for the values produced by the weight calculations performed on the common inputs. From this it can be seen that the ability of a neural network to discern between similar input sets is directly related to the resolution, or bit-width of the weight values.

Those who design and train the network may not specify or know how the neural network ends up representing the various responses to input patterns within its connection weights between neurons. In many instances, only representations of the trained input patterns to the network, and the desired output from the network for each of those input patterns, are known and presented by the trainer. How the network produces those desired responses, and how that information is represented internally by the connections within the neural network, is a product of many factors. Such factors include the initial neural network structure, the informational structure of the training data, the initial weight values, and the training algorithm and learning rate used. Other factors that may affect the ultimate representation in weight-values include small random changes made to weights as the network is trained, the order that the training set is presented to the network, and any imperfections in the training set that may be presented during training Back Propagation Networks Do Not Normally Permit Signal Feedback It can be seen in the above calculation of the neuron level error values for a hidden layer neuron that the same error value is required to have been calculated for each post-synaptic (forward) neuron $\delta_j$ that the current neuron is connected to, prior to producing the current neuron's error value. This is what restricts back propagation to feed-forward-only networks.

Studies of biological neural networks have demonstrated that numerous and diverse signal feedback paths and mechanisms exist in biological organisms (Levitan, Kaczmarek, "The Neuron,Cell And Molecular Biology", 2002, Oxford University Press, ISBN: 0-19-514523-2). These mechanisms include direct signaling carried on afferent axons (those that bring signals from output neurons to input neurons) back through networks whose outputs, in turn, affect the efferent signal flows. Signal feedback in biological organisms also occurs through a variety of chemical signaling mechanisms carried directly through glial cell (those cells that support neurons in biological brains) and through the bloodstream from a variety of intra-organism sources. Finally, signal feedback mechanisms occur tacitly in biological organisms through the senses that carry afferent information about causal effects that efferent signals have had on outside world environments.

In biological organisms, the concept of internal and external may not represent absolute locations, but instead may allude to a continuum. Simplistically, afferent signaling may begin with senses of external world events caused by motor controls such as muscles. On the other hand, it may be caused by a chain of events that started within the brain and ended up as stimulation to the adrenal gland, which in turn produces an afferent chemical signal that causes the brain to retain more experiences. The later case shows that external signals can be generated by a feedback loop that never leaves the organism. Such loops may occur entirely inside the brain, or may just get out to the point of generating scent signals via the organism's own sweat glands, which are then sensed and have an afferent effect on the network. Much further out, a very complex chain of external events may be affected by the brain and produce effects that are then sensed by the brain. In this way, the brain can produce effects on, and correct for, external world events. To summarize, feedback loops of signals originating in the brain and returning can remain inside the brain, go outside the brain but remain inside the organism, or include causal activities completely outside of the organism.

Back Propagation is Difficult to Use With Other Types of Learning, Such as Positive and Negative Reinforcement Back propagation is an abstraction that encapsulates the detailed mechanisms used in biological networks to determine how connection strengths are altered by experience to better respond to the external environment. Because the back propagation algorithm's abstraction of these underlying mechanisms encapsulates the details of these mechanisms into its reverse error propagation calculation, it doesn't normally allow those same mechanisms to be broken out and used in combination. In other words, the details of how biological neural networks actually produce changes in their connection strengths are completely incorporated into a single conceptual black-box that is the back propagation algorithm.

The advantage of this level of abstraction is that back propagation fully encompasses and mimics the concepts of positive and negative reinforcement learning within its calculations, thus freeing the network designer from having to consider such details when designing a neural network. The disadvantage can, in some sense, be expressed by simply parroting the advantage. The designer must accept back propagation's abstract interpretation of the underlying concepts and details that it encapsulates. There is little (if any) flexibility in the details of how such mechanisms can be employed by the neural network to affect changes in its connection weights.

Back Propagation Networks can be Retrofitted to be Less Susceptible to Feedback Restrictions A variety of methods to work around back-propagation's inability to be used for neural networks employing feedback (e.g., Recurrent Neural Networks) have been tried with varying levels of success.

Back Propagation Through Time (BPTT) has been Used to Partially Mitigate Back Propagation's Limitation on Feedback A simple means of applying standard back propagation in a neural network that would normally employ feedback (a recurrent neural network) is called "Back Propagation Through Time" or BPTT. It accommodates the use of the standard back propagation algorithms by unfolding the time sequence that would normally be present in a recurrent network in order to get around back-propagation's restriction on feedback. The essence of BPTT is that it unfolds the discrete-time recurrent neural network into a multilayer feed-forward neural network (FFNN) each time a sequence is processed. In effect, the FFNN has a separate hidden layer for each "time step" in the sequence. It should be noted that the feed-forward-only restriction of back propagation has not been overcome in BPTT. Instead a clever means of removing the feedback from a recurrent network has been implemented so that the back propagation learning algorithm can be used along with its inherent restriction.

Real Time Back Propagation (RTBP) Permits Feedback but Only of Output Neurons

Real time back propagation, or RTBP, permits feedback from output layer neurons to output layer neurons only. As shown in the above calculations, each of the output neurons' error values are calculated directly by subtracting an expected (desired) output from the actual output of each neuron. Since there is no need to use the calculated error values from post-synaptic neurons in order to calculate these error values, this tightly restricted form of feedback for this one layer can be permitted in RTBP networks. There is still no way to produce the feedback of complex afferent signal flows seen in biological neural networks. Any feedback from the outputs of hidden neurons to themselves, or to neurons even further back would break the learning algorithm. This is because, for all but the output neurons, the back propagation learning algorithm requires that error values be calculated for all post-synaptic neurons before the error value for the current neuron can be calculated.

Alternatives to Back Propagation that Allow Feedback Will Usually Strictly Dictate Specific Network and Feedback Structures Alternatives to back propagation neural networks have been conceived in an effort to produce networks with some rudimentary forms of feedback (Douglas Eck, University Of Montreal, Recurrent Neural Networks—A Brief Overview, 1 Oct. 2007). These generally rely on very strictly prescribed feedback topologies and complex feedback functions to achieve networks with recurrent characteristics. While the recurrent character of the brain is abstractly emulated in these schemes, the ability to design neural networks with the complex and varied feedback structures observed in connected networks of biological neurons is poorly addressed or not addressed. Other forms of networks that permit strictly defined feedback will limit the network to a single layer, or to no more than two layers.

ADVANTAGES

Thus one advantage of one or more of the embodiments documented here provides and demonstrates a learning method that is comparable in effectiveness with earlier conventional methods (such as back propagation) for adjusting weight values in pre-synaptic neurons (traditionally called hidden layer neurons). At the same time they permit neural networks to be constructed that may include the added structural characteristic of arbitrarily complex signal feedback paths. Another advantage is the ability to fully encapsulate all the computational functionality required for neural network learning into a single neuron, such that highly parallel networks of neurons can be constructed without being restricted by need for external computations. Further advantages of one or more aspects or embodiments will become apparent from a consideration thereof.

SUMMARY

Neural networks are parallel processing networks composed of artificial neurons connected together in a variety of topologies. Neural networks seek to mimic the way biological neural networks are constructed in order to perform computational functions that are similar to cognitive brain functions. These embodiments describe a generalized learning method and means, which is capable of supporting the construction of artificial neural networks that include complex signal feedback, as well as artificial neural networks that do not employ signal feedback. The resultant capability is the ability to produce artificial neural networks that more closely mimic the complex feedback and feed-forward mechanisms observed in studies of biological neural networks.

In one or more aspects learning in pre-synaptic neurons is accomplished without using error values with forward calculation dependencies. Instead, learning occurs tacitly and inherently in pre-synaptic neurons without any need to propagate an explicit error value back to pre-synaptic neurons during the learning and weight-adjustment phase. Because there is no forward self-dependent error calculation, there is no need to restrict the network to only forward-feeding signals. It is also demonstrated in other aspects that, while signal feedback is permitted, it is not required in order for pre-synaptic neurons to be properly trained by the learning method. Networks constructed using the learning method defined here may be constructed as feed-forward-only networks, or they may employ feedback without restriction on the type, amount, or level of complexity of signal-feedback paths.

This is accomplished in some aspects, with a pre-synaptic neuron that will produce its neuron-level error value based on how much influence each neuron it connects with exercises in producing a current response to the current environmental context (the current pattern of input signals). This influence is calculated and accumulated during signal propagation phase. It therefore does not need a separate backward calculation and propagation of interdependent error values, nor does it require a network topology that is restricted by such a need. This structure inherently permits all the functionality necessary for neurons to work together in networks to be encapsulated into the function of single neurons. This, in turn, allows the construction of very large scale neural networks with nearly unlimited numbers of neurons running in parallel.

DRAWINGS

Figures

REFERENCE NUMERALS

Figure 1:
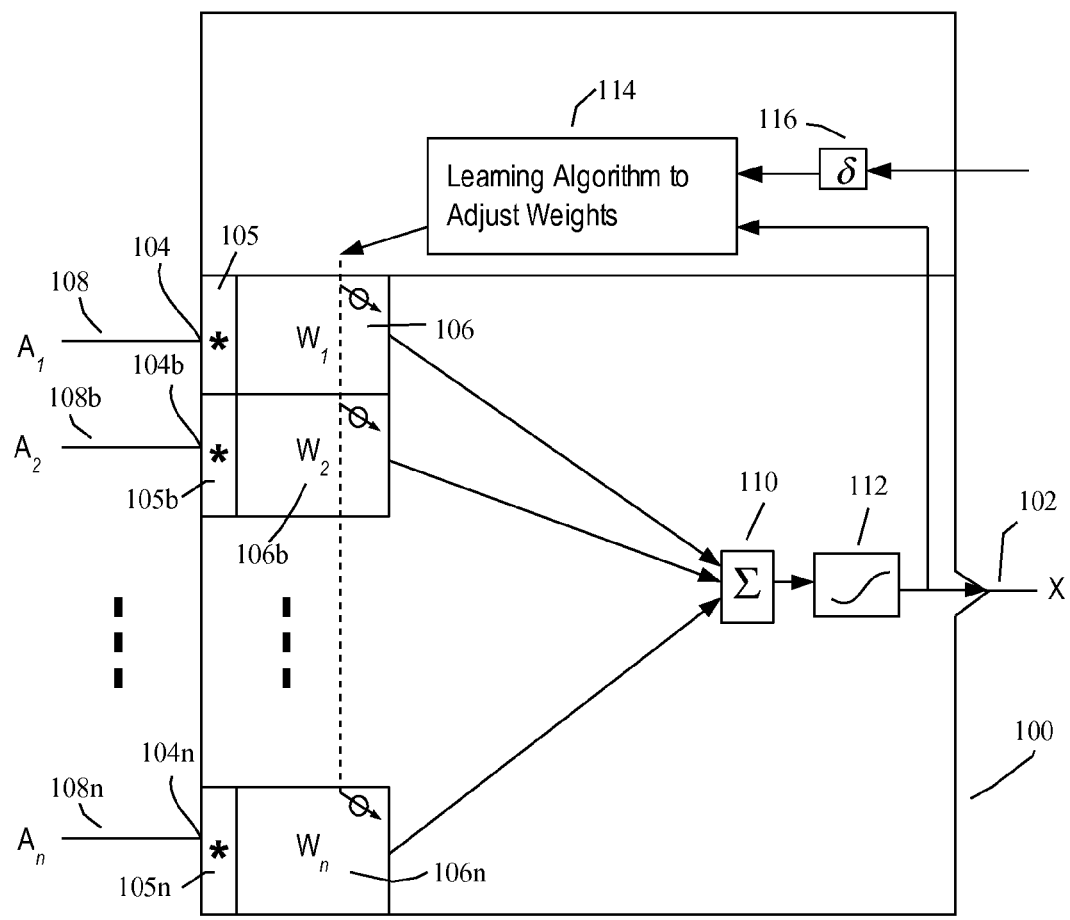
FIG. 1 is a schematic diagram of a prior-art neuron used in ANNs, an artificial processing unit that mimics some of the known processing mechanisms found in biological neurons.
Figure 2:
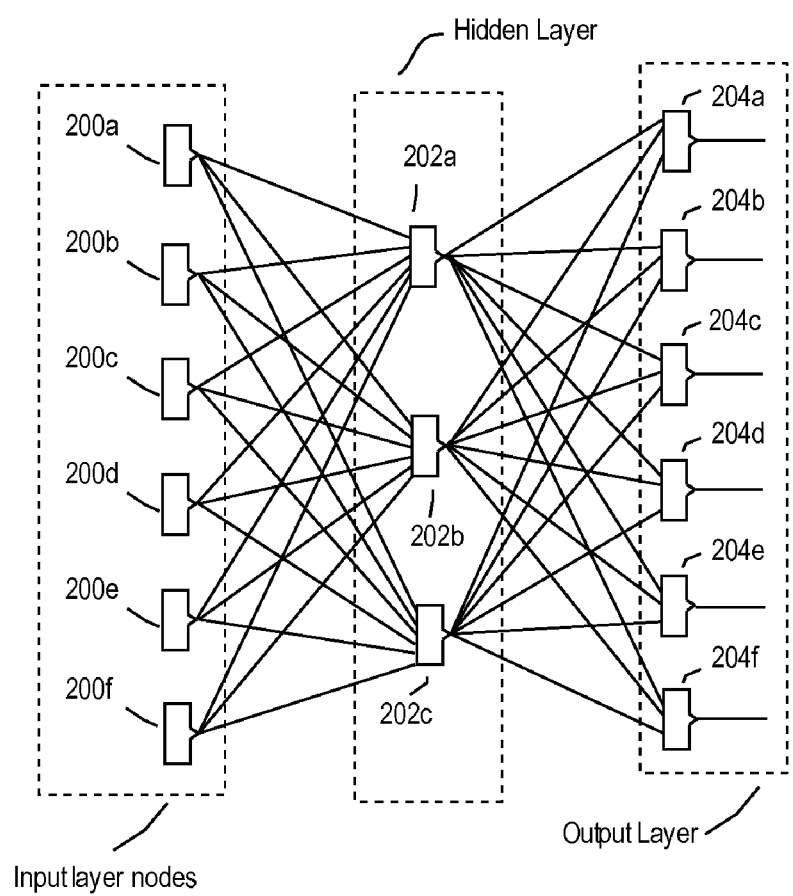
FIG. 2 is a schematic diagram of a prior-art neural network showing neurons connected together in a popular layered, feed-forward neural network topology.

100—Schematic depiction of a prior-art artificial neuron.

102—Schematic depiction of an axon conveying the output signal value (X) produced by a neuron, making it available for connection to other neurons and processes.

104—Synapse, or connection means providing a logical or physical means to connect an axon and its conveyed value to a neuron.

105—Synapse modulating means, which modulates the value at the input of a neuron by the value of a single weight stored, selected, or derived, for the synapse.

106—Weight value, according to the prior-art, which is used to modulate a value present on the synapse of the neuron by a single stored, selected, or derived, weight value.

108—Schematic depiction of an axon conveying an input value (A1) to the neuron.

110—Summing function that sums the results of preceding modulating operations within the neuron together.

112—Transfer function performed against the neuron's internal sum in order to restrict the output of the neuron to a predetermined maximum range.

114—Weight-adjustment facility to act on the values of individual weights of a neuron.

116—Error value, or set of error values and functions used to produce an error for an entire neuron.

200—Input nodes in a prior-art feed-forward neural network.

202—Hidden layer neurons in a prior-art feed-forward neural network.

204—Output layer neurons in a prior-art feed-forward neural network.

300—Input nodes providing signals to the neural network of the first embodiment (FFCN, or Feed Forward Chess Net) which represent characteristics of three different chess pieces.

302—Three hidden layer neurons which will employ the output-influenced based learning algorithm of the embodiment to learn proper hidden-layer responses.

304—Six output neurons representing valid chess moves which will be taught proper responses based on difference between the output response of the neuron and a desired response.

420—Signal path to convey influence values to the pre-synaptic neurons that make a connection to the present neuron.

422—Calculation to produce an influence value for use by pre-synaptic neuron to make weight-adjustments.

424—Switch that can be closed to produce output-influenced values in pre-synaptic neurons, or opened to produce input-influenced values in pre-synaptic neurons.

426—Means of summing output-influenced and input-influenced values produced by connections to post-synaptic neurons 428—Return paths of influence values generated by post-synaptic neurons that the current neuron's output is connected to.

500—Start of the steps to process signal propagation for one neuron of first embodiment.

502 through 514—Sequence through steps to process signal propagation for each connection weight in a single neuron.

516—Perform transfer function for signal propagation for one neuron of first embodiment.

518—Decision block to determine whether output-influenced signal should be calculated.

520 through 530—Sequence through process steps to calculate output-influenced values and propagate them back to each pre-synaptic neuron connected to the neuron.

532—End of steps to process signal propagation for one neuron of first embodiment 600—Start of the steps to process signal propagation phase for and entire network of neurons of first embodiment.

602—Decision block to determine if influence values need to be generated.

604—Step initializing all output-influenced and input-influenced values for all neurons to zero.

606 through 612 Sequence through steps to process signal propagation for each of the neurons in a neural network 616—End of steps to process signal propagation for an entire network of neurons of first embodiment 700—Start of the steps to process the weight-adjustment learning phase for a single neuron.

702—Step to initialize an error value prior to selection of the neuron level error value value performed during signal propagation phase.

704—Step to set P to a predetermined learning rate for influence-based weight value adjustment calculations.

706—Decision block to determine if an outside (desired) training signal is to be used for weight-adjustment calculations.

708—Step to set the neuron-level error value equal to the difference between the desired and actual outputs 710—Decision block to determine if output-influenced values accumulated during signal propagation phase are to be used as the neuron-level error value in weight-adjustment calculations.

712—Step incorporating output-influenced values into the neuron-level error value used for weight-adjustment calculations.

714—Decision block to determine if input-influenced values accumulated during signal propagation phase are to be used as the neuron-level error value in weight value adjustment calculations.

716—Step incorporating input-influenced values into the neuron-level error value used for weight-adjustment calculations.
720 through 728—Sequence through process steps to perform weight value adjustments for each of the connection synapse weights in a neuron.
730—End of steps to process the weight-adjustment learning phase for a single neuron.
800—Start of the steps to process weight-adjustment learning phase for an entire network of neurons of first embodiment.
802 through 808—Sequence through steps to perform weight adjustments for each of the connection synapse weights in a neuron
810—End of steps to process the weight-adjustment learning phase for an entire network of neurons.
900—Start of the steps to perform typical network training procedure for a neural network.
902—Step to set parameters used during neural network training procedure.
904—Step to initialize an index i to training patterns to 1 (one) and jog connection weight values.
906—Decision block step to determine if there are any more patterns in the training set to be taught to the network.
908—Step to present the currently indexed training pattern and respective desired outputs to the network.
910—Step to initialize index to the number of iterations to present each training pattern j to 1 (one).
912—Step to increment training index i to the next training pattern from the set of training patterns.
914—Step to initialize index j used to track the number of iterations to present each training pattern to the network to 1 (one)
916—Step to initialize index k, to 1 (one), which is the index to count the number of times a signal propagation phase is performed prior to performing a learning phase.
918—Decision block step to determine if there are any more signal propagation phases to be performed prior to doing a learning phase.
920—Step to do process of signal propagation phase for an entire neural network.
922—Step to increment index k to count the signal propagation phases performed.
924—Step to increment the index j counting the number of times a given training pattern has been presented to the network.
926—Step to process weight-adjustment learning phase for an entire neural network
928—Decision block to determine if the neural network should continue to be trained on the entire set of training patterns.
930—End of steps required for a typical training procedure for a neural network.
1000—Bus label for bus 'A' in a schematic of the Feedback Chess Net (FBCN) of the second embodiment.
1002—Bus line for signal bus 'A' first introduced in a schematic of the Feedback Chess Net (FBCN) of the second embodiment.
1004—Bus label for signal bus 'B' first introduced in a schematic of the Feedback Chess Net (FBCN) of the second embodiment.
1006—Bus line for signal bus 'B' in a schematic of the Feedback Chess Net (FBCN) of the second embodiment.
1100—Input to receive positive reinforcement from the outputs of neurons and from external sources.
1102—Input to receive negative reinforcement from the outputs of neurons and from external sources.
1104—Summing block to convert positive and negative adaptive learning signals into a single signed value.
1106—Switch representing option to incorporate reinforcement learning values from reinforcement learning inputs into the neuron's error value.
1108—Switch representing option to include output- and input-influenced values into the neuron's neuron-level error value
1200—Afferent neurons producing an output signal representing the difference between the output of a respective output neuron, and a desired value provided by an external trainer.
1202—Afferent neurons producing an output signal representing the difference between the output of a respective output neuron, and a desired value provided by an external trainer.
1204—Input nodes providing desired output signals to network.
1300—Calculate an input-influence value that includes use of the neuron's error value and add it to the pre-synaptic neuron's input-influenced error-value.
1302—Decision block to determine whether adaptive inputs should be used to produce error and influence values in a neuron.
1304—Calculate an error value by subtracting the value on the input of the negative adaptive input from the value connected to the positive adaptive input.
1306—Calculate an output-influence value that includes use of the neuron's error value and add it to the pre-synaptic neuron's output-influenced error-value.
1400—Decision block to determine if adaptive inputs are to be used to produce an error-value for weight adjustment calculations.
1402—Step to set the neuron-level error value equal to the difference between the signal value present on the positive adaptive input and the signal value present on the negative adaptive input.

GLOSSARY

Acquisition Time, Memory Acquisition Time, Learning Acquisition Time—In both biological and artificial neurons, the amount of time it takes for a response to a new experience to be learned. In prior-art ANNs and here, it is roughly determined by the learning rate configured for the learning algorithm used to adjust the weight.

Adaptive Feedback—Feedback connections consisting of adaptive signals to the adaptive inputs of pre-synaptic neurons. Adaptive feedback is feedback that consists of adaptive signals. Adaptive feedback may be incorporated into influence calculations by using the neuron's error value as a factor when producing the influence values that are propagated to pre-synaptic neurons.

Adaptive Inputs, Adaptive Signals—The connection inputs to neurons for signals used to effect adaptive changes are called adaptive inputs. Signals connected to such inputs are called adaptive signals. Any given signal produced by a neuron or signal source (such as a sensor) can serve as both reactive and adaptive in a given neural network. Adaptive signaling and feedback mechanisms as described in the embodiments are roughly analogous to the signaling mechanisms that are used to achieve reinforcement learning in biological neural networks. This is reflected in the embodiments, as occasionally the term reinforcement may also be used in these embodiments to refer to adaptive signal-values, feedback, and mechanisms. Adaptive inputs are special inputs to a neuron used in some embodiments, which carry signals that are used by the neuron's learning method to produce an error value. The error value is used by the weight-adjustment algorithm to alter the value of the neuron's connection weights. They are also used in one or more embodiments to modify the influence values that are calculated and accumulated in pre-synaptic neurons. Adaptive signals are normal signal values, such as those produced at the outputs of neurons, input nodes, or by sensors, that are used in a special way within the neural network. When serving in an adaptive capacity, signal values are not connected to the neuron's normal inputs to affect its output, but are instead used to effect changes to the neuron's connection weights. See Influence, Reactive Feedback.

Afferent, Afferent Signals, Afferent Network, Afferent Process—In discussions of biological neural networks and here, afferent signals are signals moving inward from neurons and processes that are closer to the outside of the neural network, brain, or organism. An afferent network describes a neural network which projects its outputs back into the network from farther out. Contrast with efferent signals which are signals that move outward from deeper within the neural network. Generally, this is used in a broad sense, as any given signal or process can project outward (efferent) and inward (afferent) simultaneously. See: Efferent $\alpha$(alpha), $\alpha^{Negative}$, $\alpha^{Positive}$—Used in calculations to represent signal values connected at the adaptive inputs of a neuron. In calculations $\alpha^{Negative}$ is used to represent the value of the signal at the negative adaptive input, and $\alpha^{Positive}$ is used to represent the value of the signal at the positive adaptive input.

ANN—Artificial Neural Network.

Association—See Reinforcement

Axon, Output, Output Means—A means of conveying signals produced and used by neurons to and from other neurons. In ANNs and biological nervous systems signals conveyed on axons may also be conveyed between neurons and external processes, such as motors, muscles, and sensors. In biological neurons, axons carry signals between neurons, and to and from motor and sensory feedback mechanisms within the organism. In an artificial neuron or neurode the axon is also the output or output means of the device.

Axon Level, A, X—The signal or value produced on the output of an artificial neuron, or the signal or value that can be connected to the input of an artificial neuron. While there is no direct correlation between an axon level and the signals observed on the axons of biological neurons, there is an abstract correlation. Biological neurons produce instantaneous all-or-nothing pulses called axon potentials. Streams of axon potentials in biological neural networks are thought to represent frequency and pulse-width modulated signal levels. Axon levels are roughly equivalent to the levels that are modulated and represented by the streams of axon potentials observed in biological neural networks. The letter 'A' or the alpha symbol ($\alpha$) is sometimes used in expressions to represent values of axon levels. The alpha symbol is only used here to represent axon levels connected to a neuron's adaptive inputs.

Connection Means—A means of conveying an input value to the input synapse of a neuron, or of conveying a neuron's output value (also called its output signal value) to external processes, or to the input synapses of other neurons. In neurons constructed with discrete hardware, this may be a terminal or solder connection to or from another neuron. In neurons constructed in software this may be a simple memory pointer containing the address where the value of the signal to be connected is stored.

Connection Strength—In neural networks, information is represented conceptually in the strengths of the connections between neurons, or between outside signal sources and neurons. Connection strengths are encoded in the values of connection weight values at the inputs of neurons. Input signals are modulated by the connection weight values at the inputs, which determines how much of the input signal is conveyed by the connection. See Weight.

Convergence—In the context of neural networks convergence describes a network state where the network has learned to properly respond to a set of training patterns within some margin of error. In the case of this disclosure, the margin of error is ten percent. That means, a network has converged on a training set when it produces output responses that are within ten percent of the desired output values for the input patterns.

$\delta$ (delta)—Used in calculations to represent the neuron level error value generated by the learning algorithm. In the neurons described in the embodiments these are calculated for non-output neurons using a new method. The neuron level error value is, in turn, used as a factor when making individual adjustments to weight values (weight-adjustments). See Neuron Error Efferent, Efferent Signals, Efferent Network—Loosely describes signals and processes that project or flow outward from farther inside of the organism, brain, or neural network. See Afferent.

Error Value, Error Value Means—See Neuron Error Value.

$\eta$ (eta)—Used to represent the learning rate in individual weight adjustments.

Excitatory Input, Excitatory Synapse—In biological neurons this is a synapse that, when stimulated by an input signal, tends to increase the likelihood that the neuron will fire. In artificial neurons, input signals connected to an excitatory synapse will tend to increase the output value produced by the neuron. Such excitatory behavior is usually accomplished in artificial neurons by modulating the input signal by a positive weight value. See also: Inhibitory Input.

External Process, Outside Source, External Source, External Signal Source—In this disclosure, this is used to denote processes that provide sensory information to a neuron, or that can be affected by the output of a neuron. Examples of external processes may include such things as actuators, indicators, communications, data storage and analysis systems, and other processes which may use the output, or provide the input, that is respectively produced and used by a neuron in a neural network.

Gate—Occasionally used here and in biological descriptions of synapse processes to describe the process of modulating, or gating, an input value on a synapse by a weight or connection strength value. The result is a portion of the input value that is determined by the weight value. This is sometimes referred to as gating because conceptually, the weight value determines the magnitude of the signal value that passes, and in which direction (the weight can be positive or negative). Expressed in floating point math, it is synonymous with the process of multiplying the input value connected to the synapse by the weight value associated with the synapse. In this way, the weight value determines the conceptual connection strength of each value connected to the neuron's inputs. Because the weight values can usually be positive or negative, it also determines if the input is excitatory (positive weight value) or inhibitory (negative weight value). The biological processes responsible for modulating the connection strength to a neuron are often referred to as gating in biological studies of synapse processes in neurons. In biological synapses, such gating modulates the strengths of connected signals by permitting varying amounts of neuro-transmitters to pass in and out of the neuron, based on how far (or more accurately for biological cells, how often) it is conceptually opened or closed (Levitan, Kaczmarek, "The Neuron,Cell And Molecular Biology", 2002, Oxford University Press, ISBN: 0-19-514523-2). Purely mathematical simulations usually refer to this as a multiplication because it has become customary to talk about such neural network models in terms of functions performed using floating point arithmetic. See Modulate.

GDR—Generalized delta rule

Glia, Glial Cells—Cells that occupy much of the space between neurons in biological brains. They provide physical support, or scaffolding to neurons. They also mediate the blood brain barrier, provide nutrients to neurons, and convey various chemical influences between neurons among other things.

Hidden Layer, Hidden Neuron, Hidden Layer Neuron—In traditional feed-forward neural networks, a hidden layer neuron is a neuron whose output is connected to the inputs of other neurons and is therefor not visible as a network output (hence the term hidden layer). In the context of a feed-forward network, a hidden layer neuron is a pre-synaptic neuron because it is connected to other neurons in the network which are post-synaptic in reference to its output. In feed-forward networks, neurons form layers or slabs which are connected to and from post- and pre-synaptic neurons. Such groupings of neurons that are themselves connected to other neurons are sometimes called hidden layers or hidden layer nuerons.

Influence, Influenced, $I^{output}$, $I^{input}$, IO, II—Essentially, the neuron level error value produced by the learning methods and neurons of the embodiments. The learning methods and means of the one or more embodiments documented here are loosely based on the notion that axons of pre-synaptic neurons exhibit attraction, or aversion to the amount of influence that post-synaptic neurons have exerted over the current or recent response to current or recent stimuli. One important advantage of this tactic is that error values based on influence can be accumulated in each neuron from forward connected neurons during signal propagation phase, thus allowing the construction of neural networks with diverse signal feedback paths. There are two different types of influence documented that neurons may exert, and to which pre-synaptic neurons may have an attraction or aversion. An output-influenced ($I^{output}$) value is loosely a measure of how much of the forward neurons' output signals the target neuron is responsible for producing. Input-influenced ($I^{input}$) is loosely a measure of how much of the forward neurons' weighted inputs the target neuron is responsible for producing.

Inhibitory Input, Inhibitory Synapse—In biological neurons this is a synapse that, when stimulated by an input signal, tends to reduce the likelihood that the neuron will fire. In artificial neurons, input signals connected to an inhibitory synapse will tend to reduce the output value produced by the neuron. Such inhibitory behavior is usually accomplished in artificial neurons by modulating the input signal by a negative connection weight value. See Excitatory Input.

Input-Influenced—See Influence.

Internal Sum, Neuron_Sum, xSum—A sum of weighted inputs produced by a neuron prior to being processed by a transfer function for output. This is sometimes just called the sum, or the neuron sum. It may also be referred to as Neuron_Sum in flow charts, and xSum in source code.

Learning—The process of adjusting weight values to bring a neuron's output response closer to a desired response for a given set of inputs.

Learning Algorithm, Learning Method, Learning Means—A part of the weight-adjustment facilities. A set of functions and processes used to adjust the weights of a neuron or neural network closer to a desired output, so that they produce less output error the next time a similar set of inputs is presented.

Learning Rate—A value used by the learning algorithm to determine how quickly the weights are adjusted. It determines the acquisition time for neurons with weights trained using the algorithm.

Local Minima—A state that a learning neural network sometimes gets into, where the weight adjustments for one or more training patterns simply offset the adjustments performed for a previously trained pattern. The previously trained pattern is not in its ideal desired output mapping, but is stuck in a less than ideal "local" response mapping, referred to as a local minima. This state can sometimes be avoided by jogging the connection weights (see Weight Jogging).

Modulate, Modulation—Used to describe how a signal value is modified by a weight value in a synapse. It is a synonym for the word gate as it is used here, and roughly synonymous for the word gate as it is used to describe biological synapse functions. Expressed in floating point arithmetic, it is simply the signal value multiplied by the weight value. For this reason the word multiply is also sometimes used as a synonym for modulate. See Gate Modulating Means, Synapse Modulating Means—A means for modulating one value by another value. Expressed in conventional floating point arithmetic, it is simply a multiplication of the two values. A modulating means used in a synapse is sometimes referred to as a synapse modulating means, and modulates the signal value connected to the synapse to the value of a synapse weight provided or stored in the synapse. See Synapse.

Neural Network—A network of connected neurons. See Neuron.

Neuron, Neuron Means, Artificial Neuron Means, Processing Unit—Also known as a neurode, or artificial neuron when used in the context of an ANN. In essence, a neuron's primary function is to receive a multitude of input signals that are connected to its synapses from external sources, or from other neurons in a neural network, and produce an output signal. A typical neuron produces a single output value (sometimes called an output signal value) that represents the weighted combination of the values on its inputs. It can be connected to the inputs of other neurons or to outside processes. The synapses modulate, or gate, the input signals connected to them by weight values before combining them with the neuron's output. In floating point math, the input values are simply multiplied by the weight values to gate them. Because these weight values can be adjusted in response to stimuli, the output represented on the neuron's axon is further modified by changes the weight values undergo during training In biological nervous systems, a neuron is a single cell with exaggerated signaling capabilities. In artificial neural networks a neuron is a process element that mimics some aspects and characteristics of a biological neuron. In essence, a neuron, whether biological or simulated, comprises inputs called synapses that connect signals from other neurons and external sources, and outputs called axons, which carry the neuron's output signals to other neurons and external sources.

Neuron Error, Neuron Level Error, Error Value, Error Value Means, Weight-Adjustment Factor—An error value, produced for the neuron, to be used in the calculations that adjust the individual connection weights comprising the neuron. The embodiments describe a novel means for producing neuron level error values for pre-synaptic neurons (neurons whose output means are connected to other neurons).

Output-influenced—See Influence.

$\rho$ (rho)—Used here to denote rates or proportions of values to be incorporated into a given calculation. Used, for example, to denote the proportion of the value representing a pre-synaptic neuron's influence that is propagated back to the pre-synaptic neuron's error value during signal propagation phase.

Post-synaptic—Meaning the neuron or connection that comes after the current neuron. Also the neuron that the current axon is connected to, the following neuron, the neuron or neurons that the current neuron's output is connected to, the neuron containing the synapse, or synapse means being discussed. See Pre-synaptic Pre-synaptic—Meaning the neuron or signal source that precedes the neuron or connection being discussed. Also, the neuron or axon that is connected to the current neuron or synapse, the neuron whose axon is making connection to this synapse or connection, the preceding neuron or signal source, the neuron that is producing the connected signal. See Post-synaptic Reactive Feedback—Feedback of signals that will cause immediate changes in responses on the output of a neuron without having a direct effect on the values of connection weights. Contrast this with Adaptive Feedback, which is signal feedback that causes a change in the values of connection weights. A given axon level signal on the output of a neuron can serve as both reactive feedback, and reinforcement feedback within a neural network. See Adaptive Feedback.

Recurrent Neural Network, RNN—A type of artificial neural network (ANN) that incorporates signal feedback paths causing it to produce non-linear response sequences over time or computational iteration steps.

Reinforcement, Reinforcement Learning, Reinforcement Inputs, Reinforcement Signals—In behavioral studies reinforcement defines stimuli that will alter behavioral responses of an organism. In the two embodiments of the disclosure that use it, the term reinforcement is an umbrella term that describes the use of axon level signals that are made available to a neuron through its adaptive inputs, and used by its weight-adjustment learning facilities to produce an error value. The error value is in turn used by the neuron to make individual weight adjustments, and may also be used to produce influence values that are returned to pre-synaptic neurons. See Influence, Adaptive Feedback.

Signal Propagation Phase, Propagation Phase, Execution Phase—The phase at which signals representing stimuli to a neural network are processed by each neuron in the neural network and propagated through to each neuron's output. All the neurons in the network are eventually processed to produce an output response for the network. In networks with feedback, the output response to a single given environmental stimuli pattern may change over successive iterations.

Sum, Internal Sum, Summing Means—A weighted sum of all the input values. The sum of the results the modulation calculations performed for all the synapses in the neuron. The sum is usually subjected to a transfer function called a squashing function to limit its value to the range 0.0-1.0 before being used as the neuron's output value. See Weighted Sum Synapse, Synapse Means—An umbrella term for a part of a neuron that acts as a signal input to the neuron. A synapse encompasses a method of connecting an outside signal to the neuron, and the means of modulating the input signal by a weight value along with the weight used by that modulation means. At a high level of abstraction, a synapse is a point at which communication occurs between a neuron and another neuron or external process. In biological neurons a synapse is a physical interface between a pre-synaptic neuron's output axon (or an axon from a sensory system), and an area on the surface membrane of a post synaptic neuron. The synapse is where chemical and electrical signals invoked by the pre-synaptic neuron can produce an effect on the post synaptic neuron's output axon (this is simplified).

In the artificial neurons of these embodiments, a synapse contains a connection means (a way to reference or connect a value generated by an external source), a weight value, and a means of using the value of the weight to modulate the incoming signal. It may also include means for calculating and propagating influence values to a neuron producing the connected signal. In essence, the influence value calculated represents the amount of influence the pre-synaptic neuron has exercised over this synapse's neuron. A synapse, or synapse means logically resides at the connection point between an external pre-synaptic signal source (such as another neuron or external process) and the post-synaptic neuron.

Like its biological counterpart a synapse means also modulates the strength of the incoming signal and determines if it will have an inhibitory or excitatory effect on the post-synaptic neuron. For this reason a synapse is sometimes broadly referred to as a connection. In a stricter sense it is a connection point and a set of processes that exist at the point of connection. In the case of biological neurons, the processes are electro-chemical and may include, for example, membrane proteins that act as pores that selectively gate, or allow, a variety of ions to enter and exit the neuron when stimulated by a signal.

Synapse Weight, Synaptic Weight—A value used to determine (or weight) the strength of an input signal at an input or synapse to be passed to the neuron's internal sum calculation means. The result is a proportion of the input value that is a function of the weight value. Expressed in floating point, the input value connected to the synapse is multiplied by the weight value. This acts as a gate, modulating the amount of the input value to be accumulated in the neuron's sum.

Weight, Connection Weight, Weight Value—A value used to modulate, or gate a single input signal to a neuron during signal propagation phase. Expressed in floating-point arithmetic, the value of the input signal is multiplied by the weight value to produce a result. The result of the multiplication is then summed by the neuron. During training or learning phase, weight values are changed in order to bring each neuron's output response in line with a desired response for a given set of inputs. See Synapse Weight Weight-Adjustment Facility, Weight-Adjustment Means—An umbrella term encompassing anything that alters the values of one or more weights. This includes learning algorithms, and weight jogging methods.

Weight-Adjustment Factor—See Neuron Error.

Weighted Sum—The sum of all the input values connected to a neuron after being modulated by the weight values associated with their respective synapses or connection means.

Weight Jogging—A method of slightly altering the value of each weight in a neuron by a small, usually randomly generated amount while training, in an attempt to avoid local minima.

DETAILED DESCRIPTION

FIGS. 3-9—First Embodiment—Feed-Forward Chess Net (FFCN)

The learning method used to make weight adjustments is first discussed in a basic feed-forward network to demonstrate its ability to be used as a replacement in feed-forward-only neural networks that currently employ back-propagation. Feed-Forward Chess Net (FFCN) will be taught to recognize, and appropriately respond to inputs representing features of three selected chess pieces. Such a neural network may be found in a larger software program that implements a chess-playing program. It will train the weights in a feed-forward neural network with a hidden layer. This will demonstrate that the new learning algorithm is capable of being used as a replacement learning algorithm in existing neural networks.

Simple Feed Forward Neural Network: Feed Forward Chess Net—FIG. 3

Figure 3:
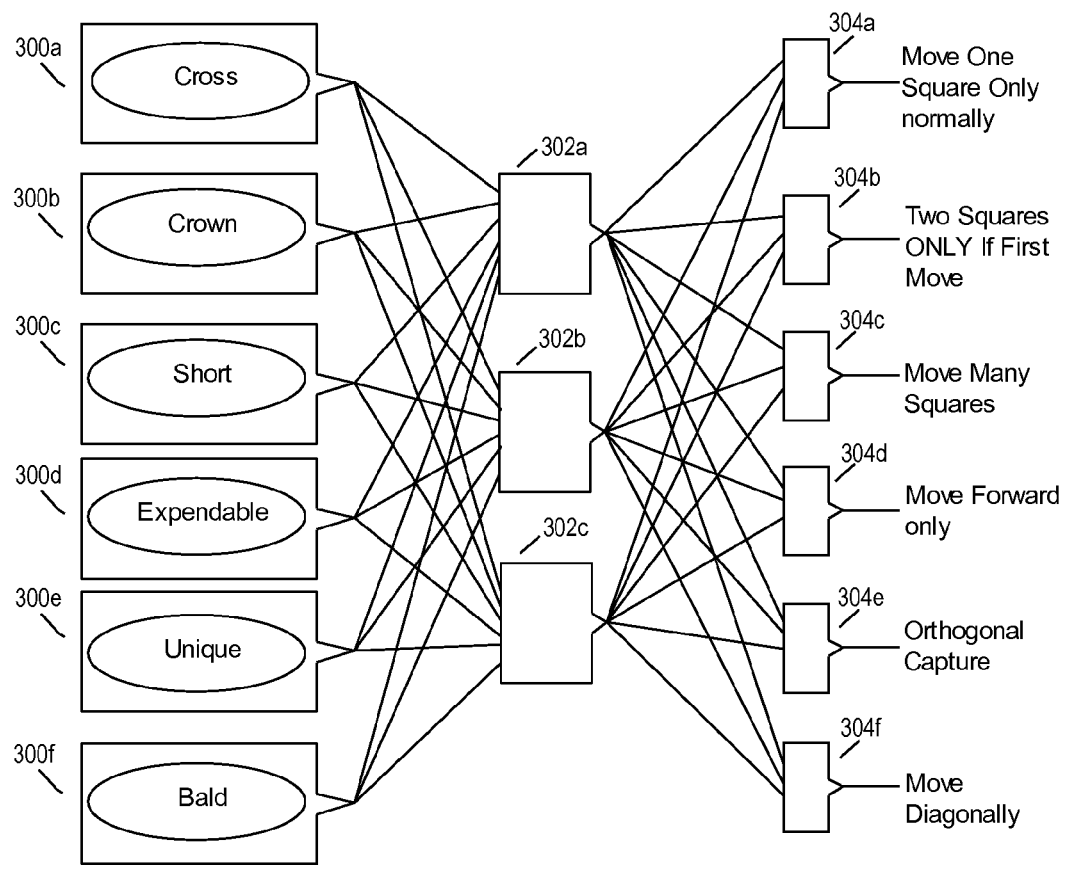
FIG. 3 Is a schematic diagram of a Feed Forward Neural network for first embodiment, called Feed Forward Chess Net, or FFCN.

As stated, the network structure used in the first embodiment will be restricted to only feed-forward signal propagation in order to demonstrate the new learning method's suitability as a replacement for learning methods in existing network structures. FIG. 3 shows a network that is trained. It is a basic feed-forward multi-layer neural network that includes a layer of six input nodes 300a-300f whose outputs are fully connected to one hidden layer comprised of three hidden neurons 302a-302c. In turn, these are fully connected to an output layer consisting of six output neurons 304a-304f. The input nodes are each assigned a meaning representing one of six possible input characteristics of three different chess pieces. A characteristic is any recognizable attribute of a chess piece, such as can be recognized in its visible physical appearance. A characteristic may also be based on a piece's relationship to other chess pieces, such as whether there are other pieces that are identical to it in appearance on the chess board during a normal chess game, or whether or not the game will be lost when the piece is captured. Each output neuron in the network is arbitrarily assigned a meaning representing one of six valid resultant chess-piece moves that the network will be trained to respond with, based on the six possible characteristics provided as inputs.

In other words, once trained the neural network will, given a set of inputs representing characteristics of one of three possible chess pieces, produce a set of output responses that represents some valid moves for the recognized piece. The three pieces used in the one or more embodiments are King, Queen, and pawn. The network will be trained to recognize each piece based on its known characteristics.

(a.) In the case of the King three characteristics will be presented on the input nodes. The characteristics presented to the network will be: "Cross" on input node 300a, to denote that a visible symbol of a cross is recognizable on the chess piece, "Crown" on input node 300b to denote that a visible crown is recognized on the piece, and "Unique" presented on input node 300e to denote that there are no other pieces with the same visible characteristics and color on the board during a regular chess game.

(b.) In the case of the Queen, three characteristics will be presented on the input nodes. The characteristics presented to the network will be: "Crown" on input node 300b to denote that a visible crown is recognized on the piece, "Expendable" on input node 300d to denote that the game will not be lost if the piece is captured and removed from the board, and "Unique" on input node 300e do denote that there are no other pieces with the same configuration and color on the board (note that the King and Queen share two of three recognizable characteristics).

(c.) Finally, in the case of the pawn, the recognizable characteristics presented to the network will be: "Short" on input node 300c which denotes that the piece is recognized as being physically short relative to other pieces on the board, "Expendable" on input node 300d which denotes that the game will not be lost if the piece is captured and removed from the board, and "Bald" on input node 300f meaning that the piece is recognized as having a smooth, round, unadorned top that resembles a bald head. Though the Queen is arguably the most powerful piece in the game, the pawn and Queen both are expendable.

Depending on which chess piece is recognized by the characteristics presented to the network's inputs, a set of output responses representing the allowable moves for the piece will be trained as follows:

(a.) If the King's characteristics are presented on the input nodes as described above, the network should respond by activating output neurons 304a, 304e, and 304f. Output neuron 304a denotes that a piece is allowed to move only one square per a turn normally during game play, though may have a special rule for the first move (the output of this neuron is labeled: "Move One Square Only, normally" on the network diagrams). Output neuron 304e denotes that a piece is permitted to capture other pieces on the board using orthogonal (non-diagonal) moves (the output of this neuron is labeled "Orthogonal Capture" on the network diagram). Output neuron 304f denotes that a piece is allowed to move diagonally as well as orthogonally on the chessboard (the output of this neuron is labeled "Move Diagonally" on the network diagram).

(b.) If the Queen's characteristics are presented on the input nodes as described above, the network should respond by activating output neurons 304c, 304e, and 304f. Output neuron 304c denotes that a piece may move many squares in a single turn during game play (the output of this neuron is labeled: "Move Many Squares" on the network diagram). Output neuron 304e denotes that a piece is permitted to capture other pieces on the board using orthogonal moves (the output of this neuron is labeled "Orthogonal Capture" on network diagrams). Output neuron 304f denotes that a piece is allowed to move diagonally as well as orthogonally on the chessboard (the output of this neuron is labeled "Move Diagonally" on the network diagram).

(c.) Finally, if the pawn's characteristics are presented on the input nodes as described above, the network will be taught to respond by activating output neurons 304a, 304b, and 304d. Output neuron 304a denotes that a piece is allowed to move only one square per a turn normally during game play, though may have a special rule for the first move (the output of this neuron is labeled: "Move One Square Only, normally" on the network diagram). Output neuron 304b denotes that a piece that is normally allowed to move only one square per a turn is allowed to move two squares per a turn the first time it is moved (the output of this neuron is labeled: "Two Squares ONLY if 1st Move" on the network diagram). Output neuron 304d denotes that a piece is not permitted to move backwards on the board (the output of this neuron is labeled: "Move Forward Only" on the network diagram).

Figure 4:
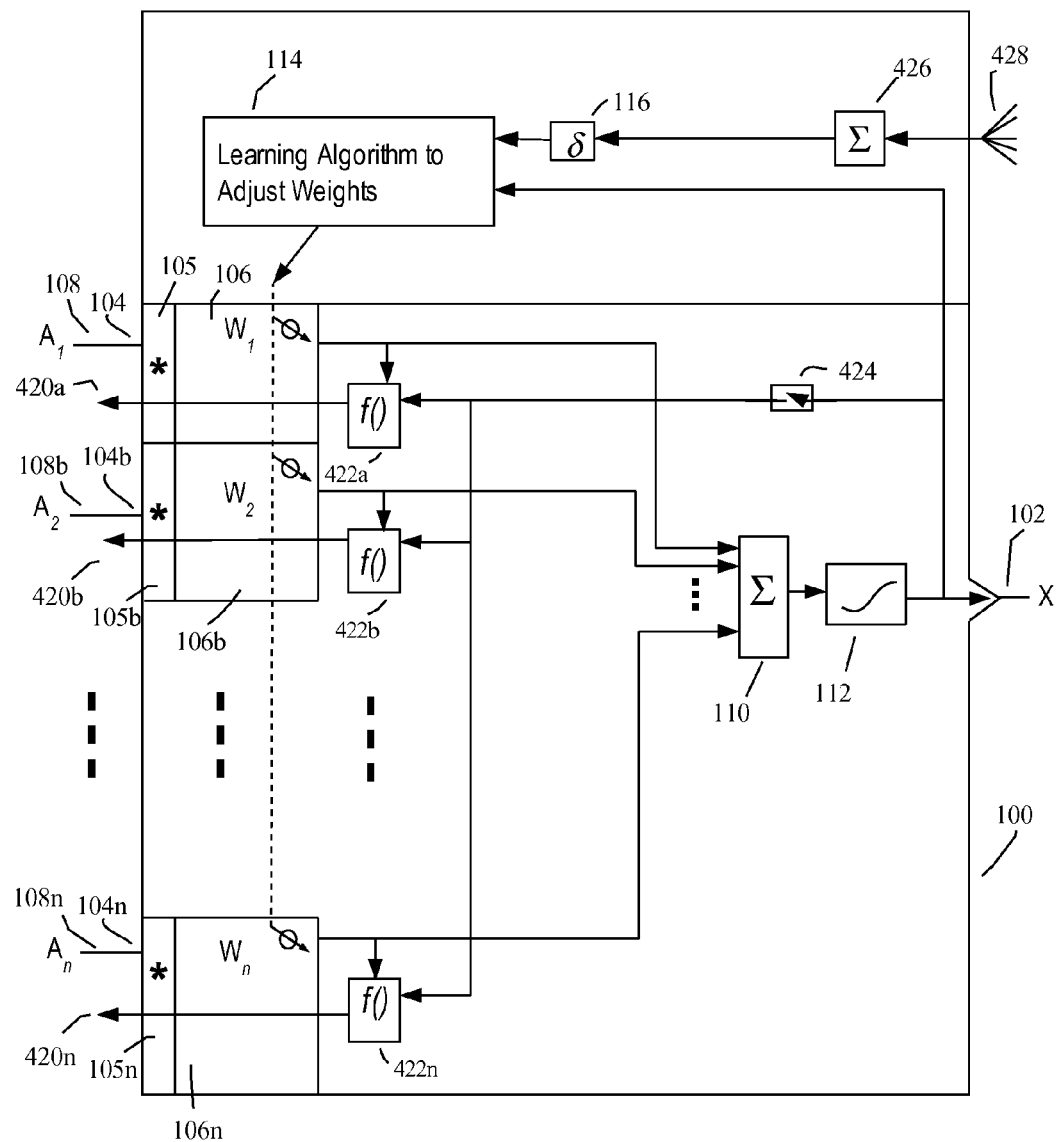
FIG. 4 is a schematic diagram of a neuron of FIG. 1 with some added features for demonstrating some of the functionality of the new learning methods.

Neuron Schematic Detail—FIG. 4

FIG. 4 shows a neuron, or neuron means, used to construct the neural network of the embodiment. Neurons used to construct neural networks that employ this learning method are partially conventional in structure. They function similarly to conventional neurons when propagating signals in that they produce an output that is a weighted sum representation of their inputs. They differ from conventional neurons in signal propagation functionality in that the error values (also called weight-adjustment factors here) calculated for pre-synaptic neurons are calculated during the signal propagation, or execution phase. A conventional diagram of a neuron has been modified in FIG. 4 in order to show this added functionality in the form of underlying schematic structure.

FIG. 4 shows a schematic depiction of a typical neuron, or neuron means, along with some of its primary components. The components making up the neuron are the neuron's body 100, an output axon, or output 102, input synapses or connection means 104, 104b, . . . 104n comprising means for storing or supplying weight values (labeled $W_1$ through $W_n$ in FIG. 4), which are generally referred to as weights 106, 106b, . . . 106n. The neuron calculates an output value (X), which is conveyed on its output means or axon 102. Input signal values (labeled $A_1, A_z \ldots A_n$) originating from outside sources, or from pre-synaptic neuron means are modulated by their respective weights 106, 106b . . . 106n and summed in an internal sum, or summing means 110. The synapse modulating means 105 . . . 105n simply modulate the values present on the inputs by the weight values. The sum produced is further processed by a transfer function 112, such as a clipping function or a sigmoid function before being placed on output axon 102. The transfer function is used to limit the results of the weighted sum to a workable range (often between 0.0 and 1.0 when represented in floating-point notation). Axon 102 can be used to connect the neuron's output value to other neurons in a neural network or to external processes.

Function blocks 422a, 422b, 422n are part of each synapse means and calculate respective influence values for the connected pre-synaptic neuron. They represent calculations of influence values which are made available through return paths 420a, 420b, . . . 420n to the pre-synaptic artificial neuron means that are respectively connected to each synapse. These returned influence values from post synaptic neurons are accumulated in pre-synaptic neurons through inputs 428. Inputs 428 are accumulated by a summing means 426 in the pre-synaptic neuron to form its error value means 116, also called a weight-adjustment factor.

Recapping the structure of the synapses, each synapse means within the neuron means or neuron device used in the embodiments comprises connection means 104 . . . 104n, modulating means 105 . . . 105n, weight means of storing or supplying a respective synapse weight or weight value 106 . . . 106n, influence value calculating means 422a . . . 422n for calculating influence values, and return paths 420a . . . 420n. Return paths 420a . . . 420n make calculated influence values available to respective pre-synaptic neurons connected to each synapse via their connection means.

The embodiments using the artificial neuron means depicted in FIG. 4 employ influence values to produce error values which are, in turn, used as weight-adjustment factors in weight-adjustment calculations in hidden layer, or pre-synaptic neuron weight-adjustments. The option of using output-influenced values or input-influenced values is represented in the schematic as a switch 424, which is closed to use output-influenced values, or opened to represent the use of input-influence values in the embodiments. This embodiment employs output-influenced values, which is selected by closing switch 424.

Operation of First Embodiment—Feed-Forward Chess Net—FIGS. 4-9

When discussing neural network functions it is customary to use floating point numbers in the range of 0.0 to 1.0 for values of axon levels (output signal values), and signed (+/−) floating point numbers for weight values. Other representations, such as integer values in predefined ranges, can also be used as well with proper scaling and processing. Floating-point number representations make modulating, or gating calculations easier to depict because a simple multiplication can be performed to obtain a ratio of the input signals modulated (or multiplied) by their respective weight values. For these reasons, unless specifically noted otherwise, floating-point representations will be used in these discussions. Other representations, such as use of integers within predetermined ranges, may be used with proper scaling and adaptation.

Calculation of Output-Influenced Values During Signal Propagation—FIG. 4

Support for the disclosed learning method is depicted in the neuron schematic of FIG. 4 as return signal paths 420a, 420b . . . 420n, which represent output-influenced values (sometimes called influence values) being made available to the respective pre-synaptic neurons making connection with each synapse. Influence values are produced during signal propagation phase in calculations represented in the schematic by function blocks 422a, 422b, . . . 422n, and returned to pre-synaptic neurons. They are calculated during signal propagation phase for each synapse using a combination of the respective weight values ($W_1, W_2 \ldots W_N$), the respective input values ($A_1, A_2 \ldots A_n$), and (optionally) the output value of the neuron X. They are also regulated by a predetermined proportion value ρ.

The calculations that produce the return influence values are depicted in the schematic as function boxes 422a, 422b . . . 422n for each synapse. The result of each calculation is returned to pre-synaptic neurons through return-paths 420a, 420b, . . . 420n. At each pre-synaptic artificial neuron means the return paths 428 from post-synaptic neurons are summed in a summing block 426 and incorporated into error value 116 used for its weight-adjustment calculations.

The following expression shows the calculation performed and depicted by each of function blocks 422a, 422b, 422n used to produce output-influenced values during signal propagation phase:

$$r = W_{jk} A_j X \rho$$

For each synapse between the output of a pre-synaptic neuron j and the present neuron k the value of the axon level connected to the synapse $A_j$ is multiplied by the respective weight value $W_{jk}$, the output of the neuron X, and a predetermined modifier value ρ used to globally regulate the proportion produced by the function blocks. The result r of each calculation of each function block 422a, 422b, 422n is then added to the error value of the pre-synaptic neuron connected at the respective synapse, as shown in the following expression:

$$\delta_j = \delta_j + r$$

Here, each pre-synaptic neuron j accumulates a sum 426 of all the post-synaptic output-influenced result r values 428 calculated for all of the synapses its output is connected to. This sum, in turn, is added to the neuron's error value 116, which will be used in making weight-adjustments.

Figure 5:
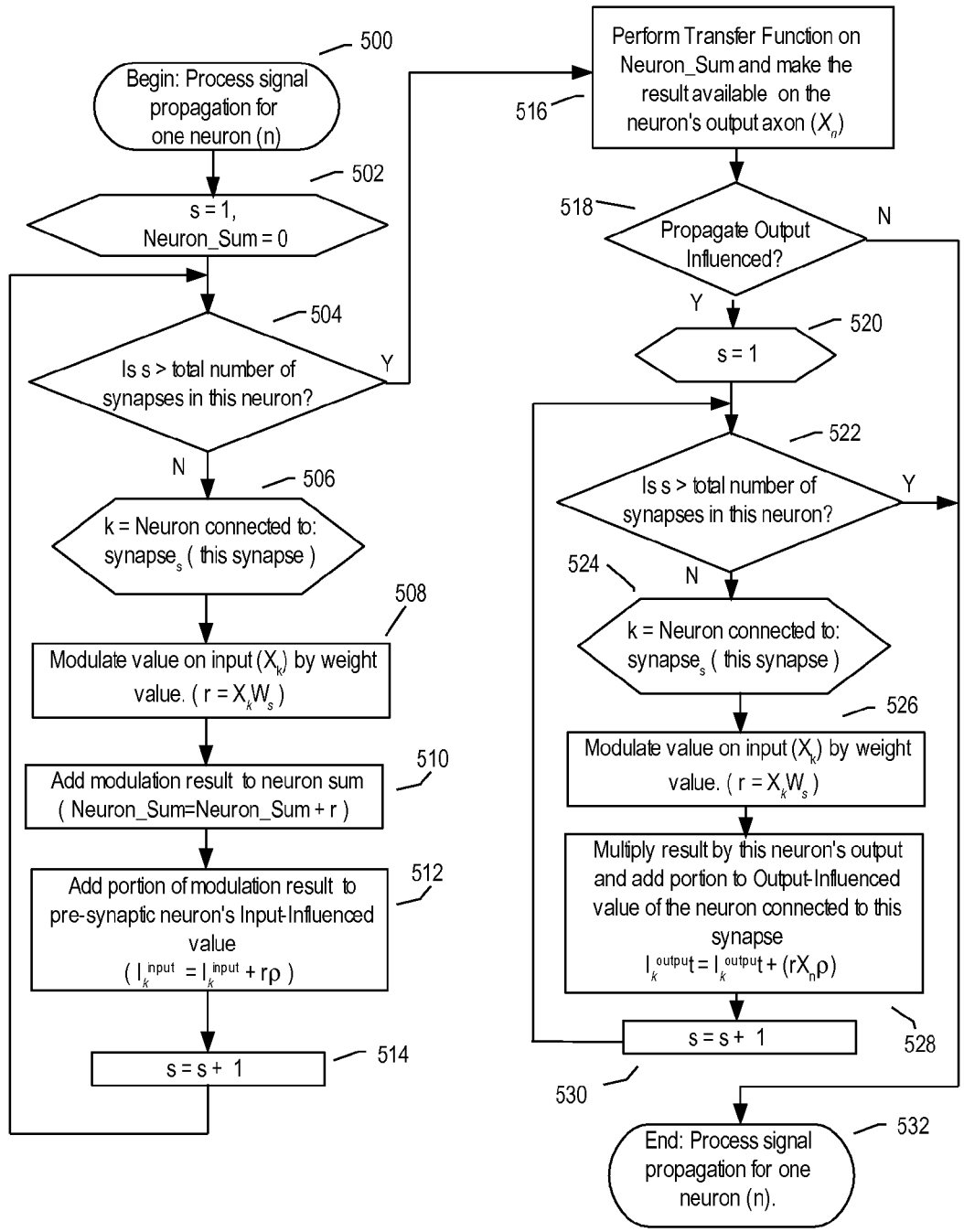
FIG. 5 is a flow chart showing the steps used to process signal propagation for a single neuron.

Signal Propagation Phase Processes for Neuron—FIG. 5

As in conventional methods, during signal propagation for a given neuron, a weighted sum of input values is produced. This is expressed in the following calculation:

$$x_k = \sum_i w_{ik} A_i$$

For each external process or pre-synaptic neuron i connected to the inputs of the given neuron k, the pre-synaptic neuron's output value (its output signal value, or axon level) $A_i$ is modulated by the weight value $w_{ik}$ between the given neuron k and the pre-synaptic neuron i. The result of each modulation of an axon level by a weight value is added to an internal sum $x_k$ for the neuron.

The neuron's internal sum $x_k$ will then be further processed by a transfer function, such as a sigmoid or clipping function, to produce the neuron's output value. (The output value is sometimes called an output signal value, or axon level.)

FIG. 4 is a flowchart depicting the processing steps followed to process signal propagation for one neuron. Beginning with step 500, the internal weighted sum described above is calculated in steps 502-514.

The internal sum is first zeroed and an index s used to access each synapse is initialized in step 502.

If decision block 504 determines that there are more synapses in the neuron to process, an index k to the pre-synaptic neuron whose output is contacting it is obtained in step 506.

The axon value from the pre-synaptic neuron $X_k$ is then multiplied by its respective weight $W_s$ in step 508, and the result r is added to the neuron's internal sum in step 510.

In step 512, this result of multiplying the input value by the weight value is also added to the input-influenced value $I_k^{input}$ maintained for the pre-synaptic neuron k that is connected to the synapse. Note that flexibility and performance in design is accommodated in the source code implementing the present embodiment by maintaining separate variables to accumulate input-influenced, and output-influenced variables in pre-synaptic neurons. These can be combined or selected for use as the error value for the neuron at this phase, or during weight-adjustment phase. They are referred to in the C code amendment accompanying this embodiment as II used for input-influenced, and OI used for output-influenced.

The index for synapses is incremented in step 514 so that these processing steps will be repeated for the next synapse in the neuron. If decision block 504 determines there are no more synapses to process, the internal sum that has been accumulated for the neuron is ready to be processed by a transfer function.

Transfer Function—FIG. 5

According to the present embodiment a simple clipping routine is employed for use as a transfer function. Expressed in C code it is:

```
f(x) {
    if(x>1) {
        x=1;
    }
    if(x<0) {
        x=0;
    }
    return(x);
}
```

Here, x represents the neuron's internal sum (the weighted sum of the inputs). If it is greater than +1 it is set equal to +1 and if it is less than 0 it is set equal to 0. If the value falls within the range of 0 to +1 it is not changed.

This transfer function is performed and the output value returned by the transfer function is made available on the neuron's output axon in step 516. The neuron's output value or output signal value is an axon level, which is made available for connection to other neurons as well as to external processes.

Summary of Calculations of Influence Values During Signal Propagation

In contrast to many well-known conventional methods, the embodiments described here can glean error values used for weight adjustments entirely during signal propagation (or execution) phase. In other words, the neuron-level error values produced and used in calculations to affect weight-adjustments in pre-synaptic neurons (traditionally called "hidden neurons") are generated based on conditions present during the signal propagation (or "execution") phase of the network.

Output-Influenced

The code implementation for the first embodiment is included in the Appendix as Embod1_c.txt. It will use output-influenced values for its learning method by default. Output-influenced values are values that loosely represent the amount of influence a given neuron has exerted over the outputs of the post-synaptic neurons it is connected to.

This function performed by the learning method to obtain neuron-level error values for use in weight-adjustments is documented in the following expression, which is performed for each neuron whose output connects to other neurons during signal propagation phase:

$$\delta_j = \delta_j + \left[\sum_k w_{jk} A_j A_k \rho\right]$$

The neuron-level error value 8 produced for a given pre-synaptic neuron j connecting to a post synaptic target neuron k is based on the amount of influence that pre-synaptic neuron j has had in producing the current network response to the current set of network inputs. This is accomplished during signal propagation phase by accumulating the influence that the pre-synaptic neuron's output $A_j$ has on all the neurons k to which it is connected.

Here, for each pre-synaptic neuron j, the amount of influence it has on the given neuron's output response $A_k$ is added to the pre-synaptic neuron's error value $\delta_j$, which will then be used by the pre-synaptic neuron in making its weight-adjustments. For each connection, the influence value to be added to the pre-synaptic neuron is calculated by multiplying (also referred to as modulating) the value of the weight $w_{jk}$ connecting the neuron k to the pre-synaptic neuron j by the pre-synaptic neuron's output value A. The value is further modulated by the output of the current neuron $A_k$ and by a predetermined propagation rate p that is optional.

Alternatively, the internal sum of the neuron may be used instead of the output after the transfer function. Here, it is important to note that adjustments to the pre-synaptic neuron's weights represent changes in attraction to, or repulsion from the pre-synaptic neuron by the axons to which they are making connections.

Input-Influenced

The source code (Embod1_c.txt) included in the Appendix demonstrating the current embodiment is set to use output-influenced learning values by default by setting the variable named UseOI equal to 1. The embodiment implemented in code can easily be set to use input-influenced values instead by setting the parameter UseOI equal to 0. The input-influenced calculation is essentially the expression presented above sans the output value of the post-synaptic neurons $A_k$. It is expressed by the following formula:

$$\delta_j = \delta_j + \left[\sum_k w_{jk} A_j \rho\right]$$

Each pre-synaptic neuron's error value is calculated during signal propagation phase by accumulating the influence that the pre-synaptic neuron's output $A_j$ has on all the neurons k to which it is connected.

Here, for each pre-synaptic neuron j, the amount of influence it has on the weighted inputs $w_{jk} A_j$ of each post synaptic neuron k to which it is connected is added to the pre-synaptic neuron's error value $\delta_j$. The pre-synaptic neuron's error value will, in turn, be used by the pre-synaptic neuron in making its weight-adjustments. For each connection, the influence value to be added to the pre-synaptic neuron is calculated by multiplying (also referred to as modulating) the value of the weight $w_{jk}$ connecting the neuron k to the pre-synaptic neuron j by the pre-synaptic neuron's output value A. The value is further modulated by a predetermined propagation rate p that is optional.

Comparison of Advantages Between Output-Influenced and Input-Influenced Values

Use of output-influenced values when producing error values for pre-synaptic neurons tends to be characteristically more self-limiting than use of input-influenced values. That is, once it has converged on a correct response, a network employing output-influenced values tends to lock into it more effectively. Once such a network is trained, it is much less likely that it will come back out of its converged state, even if one continues to apply training signals to it from the set. On the other hand, the advantage of using input-influenced learning calculations is that it is more computationally efficient. In networks that employ feedback, the feedback itself will often be designed in such a way so as to limit the network's continued learning once it has learned a given response. This first embodiment does not use feedback. Thus when input-influence is selected for use in the source code implementation, a limiting mechanism is provided as part of the training process. The network outputs are tested against the desired outputs during the training procedure, and the training is stopped once the network has fully converged for a specified number of training iterations.

Implementation of Error Value Calculation Based on Output-Influenced—FIG. 5

From a practical frame of reference, the steps used to propagate influence values to pre-synaptic neurons during signal propagation phase are documented in steps 518-530 of FIG. 5.

First decision block 518 determines if propagation of output-influenced is required. This is purely for design efficiency, i.e., to avoid performing the computations if they are not necessary.

If propagation of output-influenced values is not necessary, the steps to process signal propagation for one neuron are completed and end in step 532.

If step 518 determines that propagation of output-influenced values is required, all the synapses in the neuron are processed in sequence.

An index s for the synapses is initialized in step 520.

If decision block 522 determines that there are more synapses in the neuron to process, step 524 obtains an index k to the pre-synaptic neuron k that is connected at the synapse.

The output value from the pre-synaptic neuron $X_k$ is then multiplied by its respective weight value $W_s$ to produce a result r for the synapse s in step 526.

Step 528 further multiplies the result r by the output X of the current neuron n and adds this to the pre-synaptic neuron's output-influenced value $I_k^{output}$, which will in turn be incorporated into its error value.

Index s for synapses is incremented in step 530 so that these processing steps will be repeated for the next synapse in the neuron.

If decision block 522 determines that there are no more synapses to process, the steps to process signal propagation for one neuron are completed and end in step 532.

Figure 6:
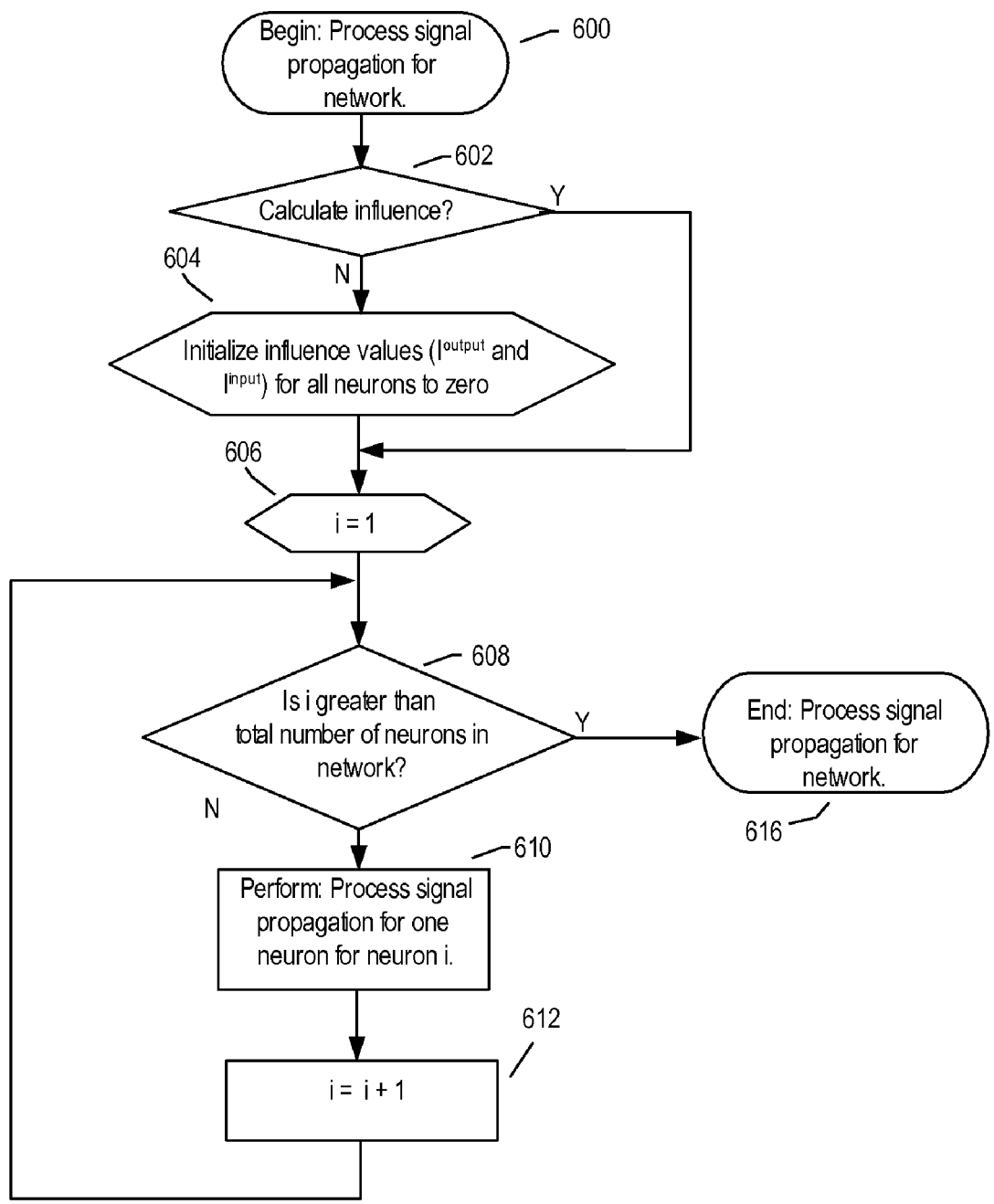
FIG. 6 is a flow chart showing the steps used to process signal propagation for an entire network of neurons.

Signal Propagation Phase Process for Entire Network—FIG. 6

Performing the signal propagation phase for the network consists of performing signal propagation for each neuron as described above (and documented in the flow chart of FIG. 5) for all the neurons in the network. FIG. 6 shows the process of signal propagation for an entire neural network, beginning at step 600.

If decision block 602 determines that influence should be calculated during this process, then step 604 initializes all the influence values in each neuron to zero (0.0). If no weight-adjustment phase will be run after the signal propagation phase, there is no need to calculate or initialize the neuron error values.

Once the influence values have been optionally initialized, each neuron in the network is processed in sequence in steps 606, 610, 612, and decision block 608.

An index i to the neurons in the network is set to one in step 606.

If decision block 608 determines that there are more neurons in the network to be processed, step 610 performs the single-neuron signal propagation procedure for the next neuron i. The procedure used to process signal propagation for an individual neuron is documented in the flow chart of FIG. 5, as described above.

The index is incremented in step 612 so that all the neurons comprising the neural network will be processed in sequence.

If decision block 608 determines that there are no more neurons to process, the steps to process signal propagation for the entire network are completed and end in step 616.

Figure 7:
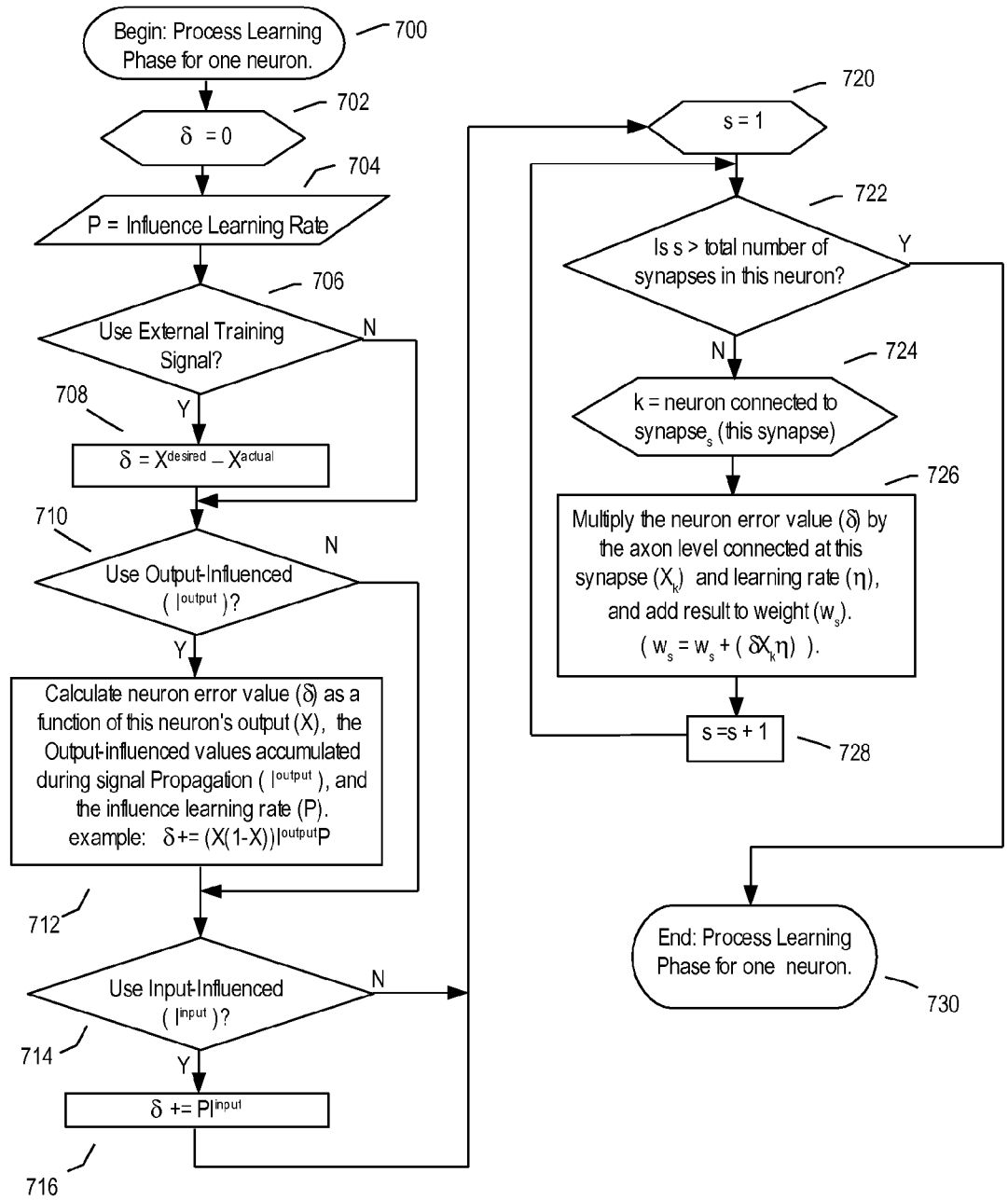
FIG. 7 is a flow chart showing the steps used to adjust weights with learning information for one neuron.

Weight-Adjustment Phase Processes for Neuron—FIG. 7

The learning or weight-adjustment phase adjusts the weights in each neuron in such a way that the network's output response is moved closer to the output response desired for the current stimulus pattern in the training set.

Obtaining Neuron Level Error Value For Output Neurons

During the weight-adjustment phase, the error value for an output neuron k that is trained using an external trainer is obtained in a conventional fashion. In this case, error value δ is obtained by subtracting the desired output $X_k^{desired}$ for the neuron from the actual output value $X_k^{actual}$ that was produced during the signal propagation phase. It can be expressed in a simple formula as:

$$\delta_k = X_k^{desired} - X_k^{actual}$$

Using Output-Influenced or Input-Influenced Values Obtained During Signal Propagation Phase—FIG. 7

Pre-synaptic neurons, i.e., neurons whose outputs are connected to other neurons in the network, will employ error values based on influence to affect the strength of connections to their inputs. In this embodiment these error values are calculated during signal-propagation phase. This is documented as an expression in the sections above starting at the section titled "Summary of Calculations of Influence Values During Signal Propagation". In this embodiment, therefore, the neuron level error values based on influence will have already been calculated prior to the weight-adjustment phase.

From a practical frame of reference, the steps performed during the weight-adjustment phase for a neuron being trained are implemented in the embodiment according to the steps and decision blocks of the flow chart of FIG. 7.

The error value used to adjust the weights is obtained in steps and decision blocks 702-716. In this case, because separate variables have been used to accumulate the influence values, the neuron-level error value is initialized to zero in step 702.

If the error value had been directly accumulated during signal propagation phase it would not be necessary to perform this initialization step, or the selection steps of 704-716.

Step 704 provides an optional predetermined influence learning rate P. If such a rate is not desired it can simply be set to 1.0. If there is an external trainer providing a desired output for the neuron, decision block 706 determines this and the error value is set equal to the desired value $X^{desired}$ less the actual output value $X^{actual}$ for the neuron in step 708.

If decision block 710 determines that output-influenced should be used to make weight adjustments, the error value used for weight-adjustments is calculated based on the output-influenced error value $I^{output}$ that was accumulated for this neuron during signal propagation phase. In the present embodiment (Feed Forward Chess Net, or FFCN) output-influenced is used to produce neuron errors used to perform weight adjustments in pre-synaptic neurons.

Modulating The Neuron-Level Error Value By The Neuron's Output Value

Essentially the output-influence value (labeled $I^{output}$ in the flow charts, and OI in the source code amendment, Embod1_c.txt) produced during signal propagation phase can be used directly as the error value that will be employed in the neuron's weight-adjustment calculations. In practice, it may also be further modulated as a function of the target neuron's output value, as in the following expression:

$$\delta = \delta X$$

Here B is the output-influenced value produced during signal propagation phase and X is the output value produced by the target neuron (the neuron whose weights are to be adjusted).

Modulating Neuron Error Value By Neuron's Modified Output Value—FIG. 7

The error value can be said to be modified by a function of the output in order to be expressed more generally, as in the expression:

$$\delta = \delta f(X)$$

Here f(X) represents some function of the output of the post synaptic neuron. In this embodiment (Feed Forward Chess Net, or FFCN), the target neuron's output may be modified in the function to provide a proper learning response curve, such as is expressed, for example, in the following formula:

$$\delta = \delta(X(1-X))$$

In this expression δ again represents the output-influenced value produced during signal propagation phase and X represents the output value produced by the target neuron. Here, the output value of the neuron is further modified to produce a faster learning rate in the middle of the neuron's output range, and a slower learning rate when the neuron's output is near its minimum or maximum output levels. This is the calculation performed in the presently described embodiment in step 712 of FIG. 7.

If decision block 714 determines that the error value used for weight-adjustments is input-influenced, then the input-influenced value accumulated during the signal propagation phase is multiplied by the learning rate (if any) in step 716. The product is used as the error value 6 in the weight-adjustment calculation.

The present embodiment does not use input-influenced values as a factor in weight-adjustments however, so control is passed to steps and decision block 720-730. Here the neuron level error value that has been previously produced is used to adjust each individual connection weight in the neuron.

Adjusting Individual Weights

Error value δ calculated by the learning method for a given neuron is used as a factor when making adjustments to the individual weights within the neuron. Once the error value has been calculated as a function of influence (as described above), individual weights may be adjusted using a variety of known means. In the present embodiment, individual weights are adjusted by employing a method that is sometimes referred to as the generalized delta rule, or GDR. Though it is a known formula, it will employ a neuron error value produced by the methods of the embodiment described above. The GDR is expressed by the equation:

$$W_{ij} = W_{ij} + \eta \delta_j A_i$$

The error value δ calculated for a given neuron j using one of the methods described above is incorporated in making the individual weight-adjustment calculations for the neuron j. Here, i represents the pre-synaptic neuron or external process that is connected to the neuron j whose weights are currently being adjusted. In this calculation, $W_{ij}$ is the weight value between i and j that will be adjusted by the calculation. In pre-synaptic neurons, the weight is adjusted by the neuron's error value $\delta_j$ which is culled during signal propagation phase as the influence value described above. For output neurons the error value is obtained simply by subtracting a desired output from the actual output. The neuron's error value is further modulated in this weight-adjustment expression by the learning rate η determined as part of the learning algorithm. The learning rate is generally used to slow the rate at which the weights are altered so as to reduce the amount each weight value adjustment will corrupt weight values that have already been trained on previously trained patterns.

Finally, the individual weight adjustment value is also proportional to the output value $A_i$ produced by the pre-synaptic neuron or process connected to (and modulated by) this weight. I.e., the output value of the neuron connecting to the target neuron. If the value on the output of the pre-synaptic neuron or external process is small, the weight-adjustment will be small in the target neuron.

Implementation of Individual Weight-Adjustments—FIG. 7

Continuing with FIG. 7, in step 720 an index s for use in accessing the connections and weights of the neuron's synapses is initialized to 1 (one). If decision block 722 determines that there are more synapses connections to process, step 724 obtains an index k to the neuron connected to the current synapse s. Step 726 multiplies the output value ($X_k$) of the neuron connecting to the target neuron by the error value $\delta$ and a global learning rate $\eta$. The result is added to the weight value for the connection synapse $w_s$. Step 728 increments index s to access the next connection synapse. If decision block 720 determines that there are no more connection synapses in the neuron to process, the process to perform the learning phase for one neuron ends in step 730.

Figure 8:
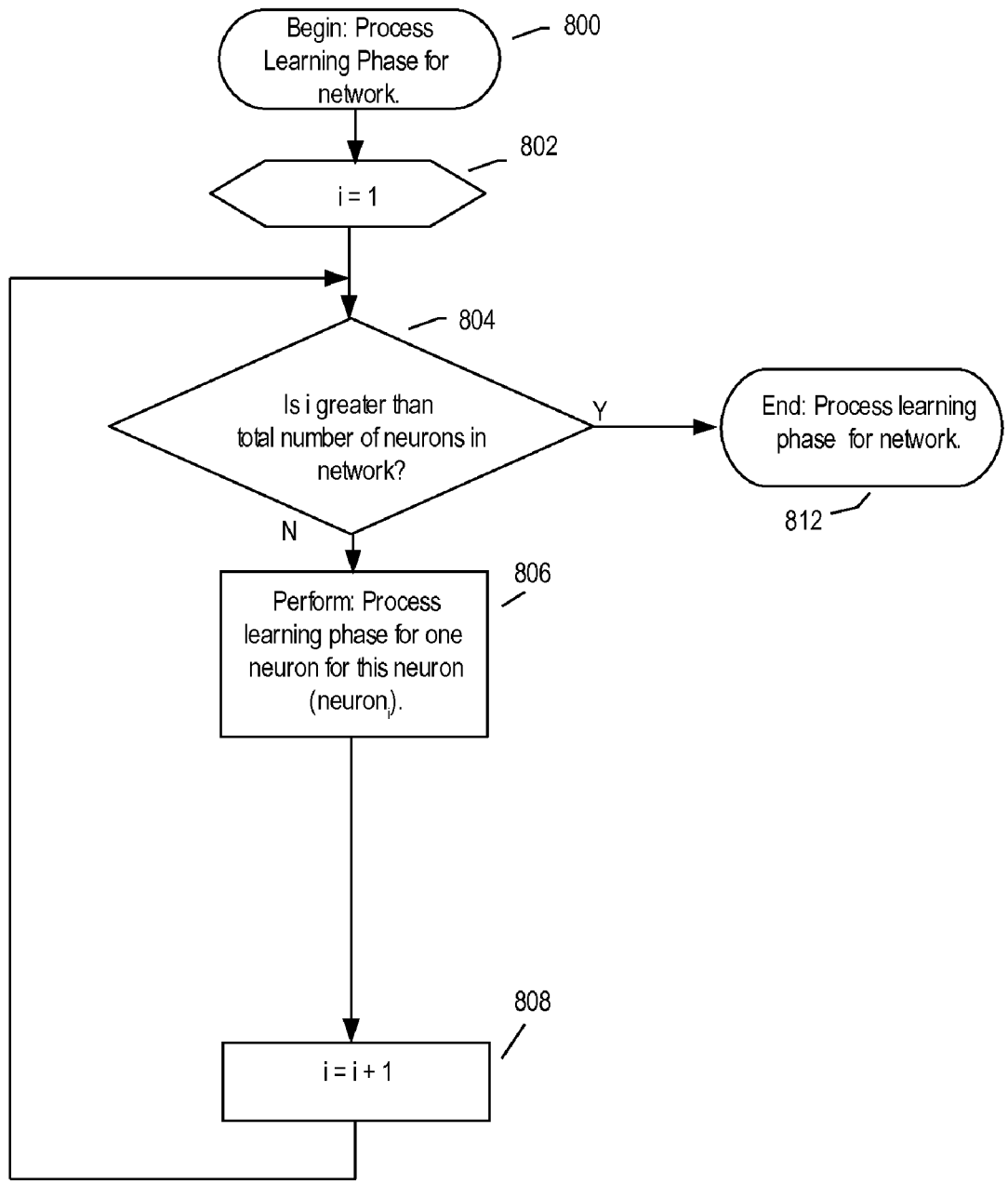
FIG. 8 is a flow chart showing the steps used to process the weight-adjustment learning phase for an entire network of neurons in the embodiments.

Weight-Adjustment Learning Phase Processes For An Entire Network—FIG. 8

Performing the weight-adjustment phase processes for an entire network of neurons consists of performing the weight adjustment processes for each neuron in the network as described above (and documented in the flow chart of FIG. 7). FIG. 8 illustrates the process of weight adjustment for an entire network beginning at step 800.

Each neuron in the network is processed in sequence in steps 802, 806, 808, and decision block 804.

An index i to the neurons in the network is initialized in step 802.

If decision block 804 determines that there are more neurons in the network to be processed, step 806 performs the single-neuron weight adjustment procedure for the next neuron i in the network. The procedure used to process signal propagation for an individual neuron is documented in the flow chart of FIG. 7, as described above.

Index i is incremented in step 808 so that all the neurons comprising the neural network will be processed in sequence.

If decision block 804 determines that there are no more neurons to process in the network, the steps to perform weight adjustments for the entire network are completed and end in step 812.

Figure 9:
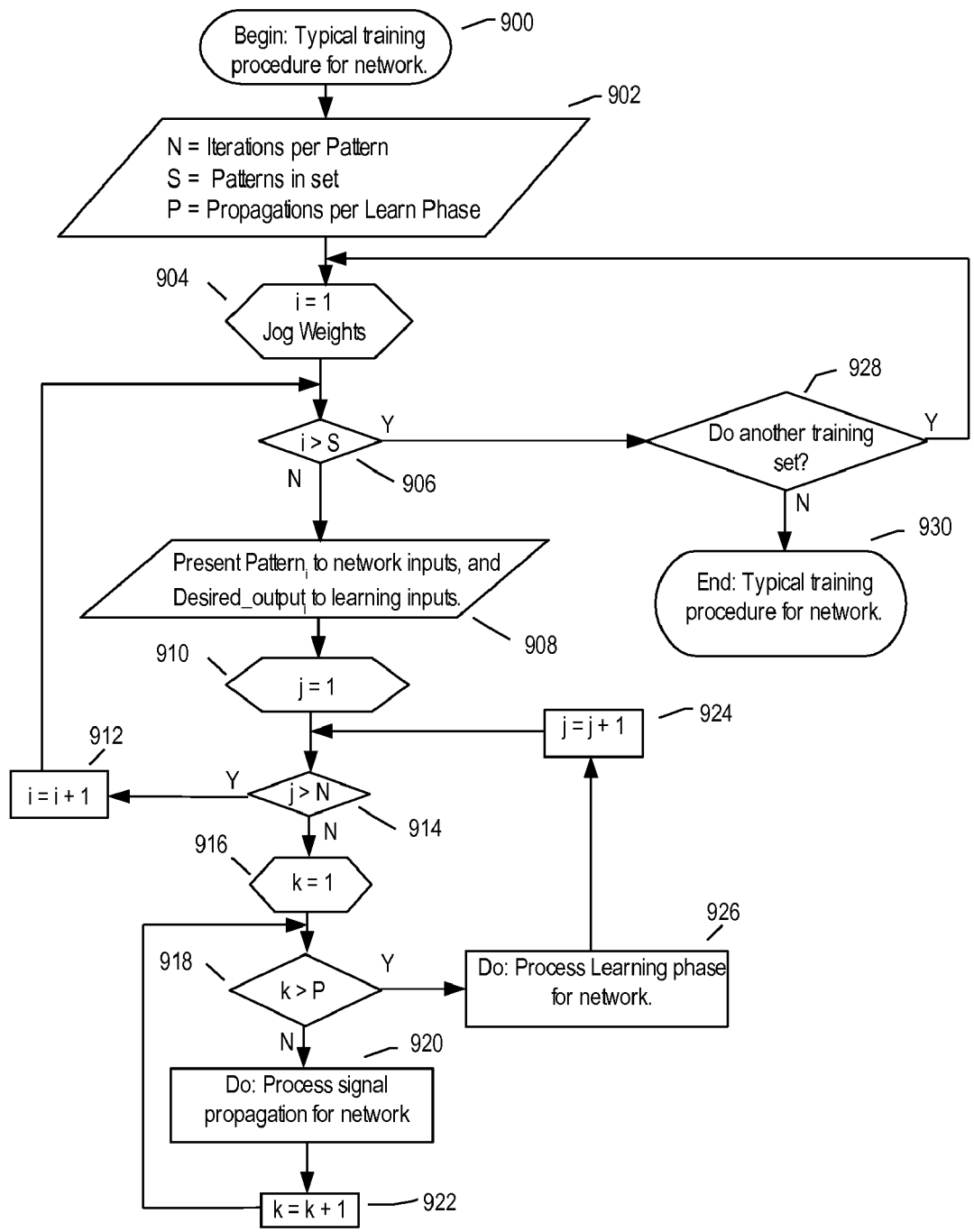
FIG. 9 is a flow chart showing the steps followed to train a neural network.

Network Training Procedure—FIG. 9

A neural network may be trained according to the procedure documented in the flow chart of FIG. 9, and in the source code (Embod1_c.txt in the appended attached files). FIG. 9 shows a set of pre-defined input patterns presented in sequence to the neuron along with desired output responses for each input pattern to be learned.

The procedure beginning at step 900 is controlled by a set of parameters which are set in data block step 902. This first embodiment will train at one iteration per a training pattern (N=1). This means that a training pattern from the set will be presented and trained, and then the next pattern in the set will be presented and trained.

Alternatively, the same training pattern can be trained for some number of successive signal propagation and learning phases before the next pattern in the set is presented and trained.

As discussed, responses to a set of three different input patterns (S=3) will be taught to the network during training In networks with feedback it is sometimes necessary to run multiple propagation phases on a given pattern before performing a training phase, so that the network's response outputs have time to settle on a given response. The presently described embodiment (FFCN) employs no feedback and so needs only one signal propagation phase (P=1) to completely settle between weight adjustment phases.

Weight Jogging—FIG. 9

During network training, usually after the weights have been individually adjusted, they may be further "jogged" by adding a small random amount to each.

A small random amount added to the weight values periodically during training will help to jog them out of local minima. Weight jogging may also be used to initialize the weights to a small random value prior to starting the signal propagation and learning processes. This technique provides diversity in each weight's adjustments, which in turn, helps to insure that each neuron makes a relatively smooth transition to its trained state. The first time a network is trained its weights are initialized to a small random amount in step 904 by the weight jogging procedure. On each successive iteration, the values are jogged further in order to keep the network from improperly converging on a local training minima.

Signal Propagation And Learning Phases—FIG. 9

As stated, each pattern in the set, along with its desired output value is presented to the network for some number of iterations using steps 908, 910, 912, and decision block 906. An index i is set to 1 in step 904 to access each of the three training patterns to be presented.

For each of the three training patterns in the set, the pattern and the desired outputs are presented to the network in step 908 and the network is trained on the pattern for 1 (N) iterations.

An index j is initialized to 1 (one) in step 910 to maintain a count of the number of times the network has been trained on the current (i) pattern.

To train the network on a given pattern, the network is first run in signal propagation phase in step 920 for a predetermined number of iterations, and then it is run in learning phase in step 926. In this (FFCN) embodiment only one propagation cycle is required for each learning cycle (P=1).

The index k is incremented in step 922 after performing the propagation phase in step 920.

If decision block 918 determines the index to be greater than P, a learn cycle will be performed in step 926. In this embodiment (FFCN) P is set to 1, and so the learning cycle will be performed after one propagation cycle.

After a signal propagation and learn cycle has been performed, index j, as stated, maintains a count of the number of times the network has been trained on a single given pattern. This index is incremented in step 924. If decision block 914 determines that the same pattern should be trained again, the propagation and learning steps just described are repeated.

On the other hand, if decision block 914 determines that the current pattern doesn't need another iteration (indexed by j) of training, index i is incremented in step 912 to index the next pattern in the set of three training patterns.

If step 906 determines that there are no more training patterns in the set, decision block 928 makes the decision as to whether the training procedure should be run again for the entire set of training patterns. If step 928 decides to run the training set again, the steps described above to train the network will be repeated, starting at step 904. If step 928 decides that no more propagation and learning cycles are required, the training procedure for the current embodiment (FFCN, or Feed Forward Chess Net) ends at step 930. This network typically achieves convergence rates in excess of 80 percent when it is trained using the training set and desired outputs described.

Weight Adjustment In Hidden-Layer Neurons Is Loosely Based On Axonal Attraction to Output Influenced By Hidden Layer Neurons The influence-based learning method used in the present embodiment (Feed Forward Chess Net, or FFCN) is able to adjust weights in hidden-layer neurons even though no error information is propagated back to the hidden layer neurons. That is, the method for adjusting connection strengths between the input nodes and the hidden layer neurons receives no direct information about the correctness or incorrectness of the responses at the output neurons. Learning is instead based on presumed axonal attraction to the post-synaptic hidden-layer neurons that have exercised the most influence over others in producing the current network response.

On the other hand, in this embodiment, the connections between the hidden-layer neurons and the output neurons are trained based on error values that are directly produced by a conventional training algorithm. Specifically the error value used to train the connections between hidden and output layer neurons are derived from the differences between a predetermined desired output response for each output neuron and the output actually produced by that output neuron. This error value, however, is used only for weight-adjustments in the output neurons and is not propagated back to pre-synaptic neurons.

The connection strengths between the input layer nodes and the hidden layer neurons are adjusted inductively, based only on the forward layer neuron responses. Essentially, this learning method expects that whatever learning means is being used by the forward neurons will be properly acting on those neurons to move their output responses toward a correct response. This assumption—that the output neurons are doing their part in producing output responses that are more correct than incorrect—is all that is required for proper connections to be made to hidden-layer neurons from their pre-synaptic input nodes.

In other words, axons from input nodes to hidden-layer neurons are adjusted based on the amount of influence a given hidden neuron's output has had in producing the current network response in forward neurons. The current network output response will presumably be more correct than incorrect (assuming the output neurons are being properly trained). Thus a strategy of strengthening the connections to hidden layer neurons that have had the most influence over such output responses will properly train the hidden layer connection weights.

Stated in terms that are slightly more in line with biological descriptions, axons from the input nodes are most attracted to hidden layer neurons that are exercising the greatest influence over those post-synaptic neurons that are the most involved in the current network response to the current environmental situation.

This is generally sufficient for training the connection strengths to the hidden layer because the efferent (forward) neurons responsible for the current response are themselves being properly trained, and are therefore more likely to be responding correctly than incorrectly. That said, if the efferent neurons are responding wrongly for any reason, the hidden layer neurons have no way of knowing that and will be trained in support of the incorrect response. An embodiment that will be described later, called Reinforcement Learning Chess Net (RLCN), will demonstrate how output-influenced based training of hidden-layer neurons can be combined with positive and negative reinforcement signals (called adaptive inputs) produced by the neural network itself. With the addition of these afferent reinforcement signals, hidden neurons will learn correctly, or be less likely to learn incorrectly, even when the network is producing an incorrect output response.

FIGS. 4-10—Second Embodiment—Feedback Chess Net (FBCN)

In another aspect signal feedback is added to the simple chess-based neural network previously presented in order to demonstrate output-influenced based learning performing in a network that employs reactive feedback of neuron output signals. Reactive feedback is a term used here to describe feedback that is connected to normal inputs of neurons from neuron outputs. It is feedback-signal input that alters the output of the neuron it is connected to, but has no direct effect on weight-values. The term feedback may also be used here without a qualifier, in which case it should be taken to mean reactive feedback. Reactive feedback may be contrasted with adaptive feedback, which uses feedback-signal inputs to make changes to the connection weight values of the neuron, rather than directly to its output.

The network described here and in the drawings has also been implemented in the C programming language and included as C code labeled Embod2_c.txt in an Appendix.

Figure 10:
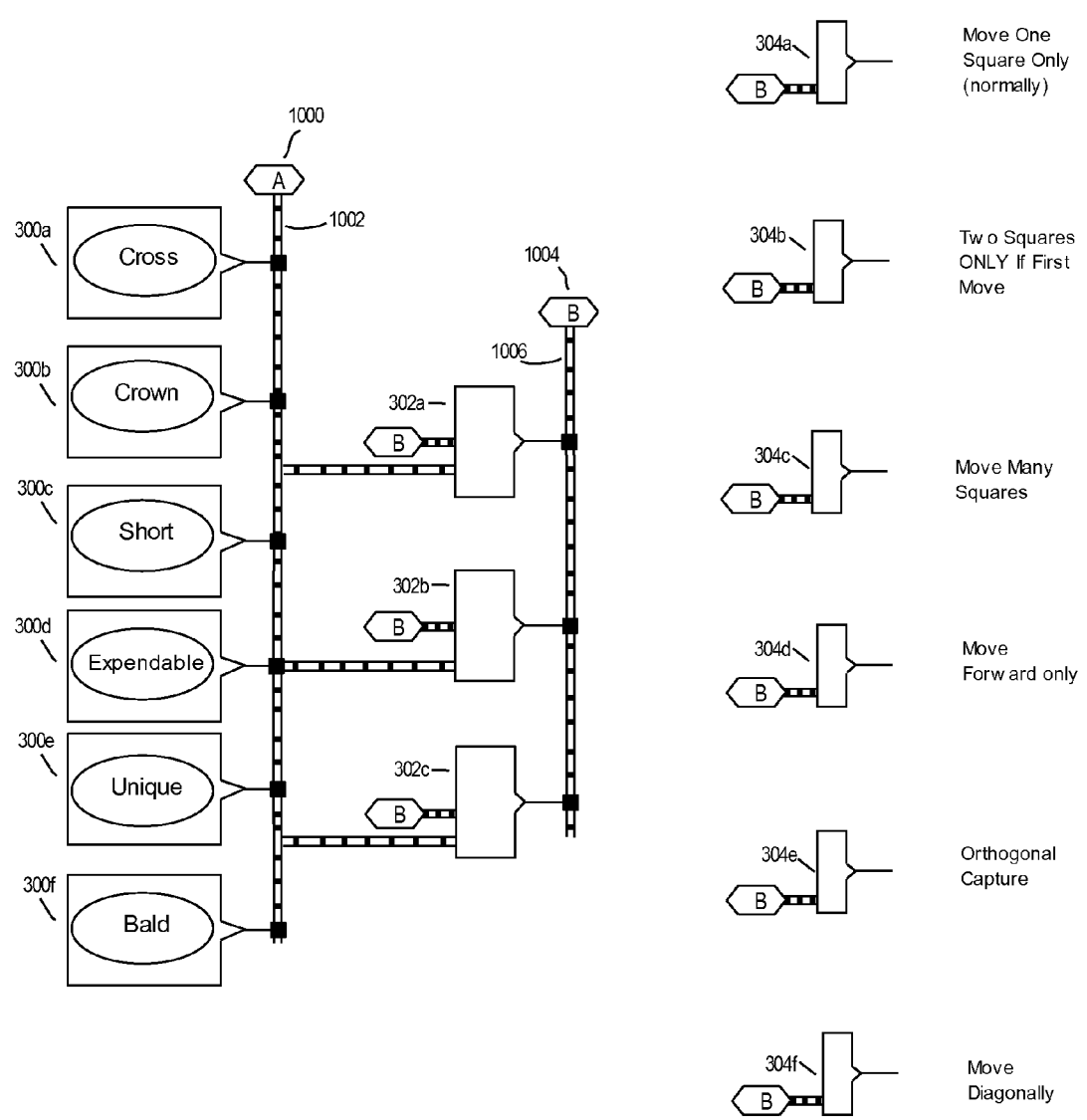
FIG. 10 is a schematic diagram of the neural network of a second embodiment called Feed Back Chess Net (FBCN), which incorporates feed back into the network.

FIG. 10 shows a diagram of the Feedback Chess Net, or FBCN network. There is only one functional difference between this network and the FFCN network of the first embodiment. In this network, the outputs of hidden layer neurons $302a$, $302b$, and $302c$ are not only connected to output neurons ($304a$-$304f$), but are also fed back to their own inputs. That is, each hidden layer neuron, aside from receiving one input from each of the six input nodes ($300a$-$300f$), also receives one input from each of the three hidden-layer neurons.

Signal Bus: Schematic Notational Convention

In order to reduce clutter when depicting interconnections between neurons, the schematic diagram of this network replaces the individual lines connecting neurons with a slightly more abstract notation called a signal bus, or more succinctly, a bus.

The concept of a bus for representing many signal lines in a single representative trace on a schematic has been used for many years in the field of electronics engineering and design. It has also been used in the past in schematic depictions of neural networks (Repici, Netlab, version 0.1, 1990, http://www.johnrepici.com/NN/Netlab/NLA001/NETLAB.EXE).

When no restrictions on feedback are imposed, the topology of a neural network can become as complex as a designer deems necessary. In these cases, a schematic representational convention that has evolved to deal with simpler, more restricted network types may itself become a limiting factor in network designs.

For this reason, a notational convention that represents a set of signal-lines as a single trace or named object on a schematic is used in the depiction of the neural network of the present embodiment. It will also be used in neural network schematics of embodiments that follow.

Signal Buses and Structure of the FBCN Network of the Second Embodiment—FIGS. 3 and 10

As stated, a signal bus, or more succinctly, a bus is represented on a schematic as either a bus line, or a bus label. FIG. 10 shows a bus line depicted by a line comprised of two closely spaced parallel lines 1002, 1006 connected at frequent intervals with perpendicular lines between them. When represented in this form, a bus is sometimes referred to as a bus line.

The second notational form for a bus is a bus label. Bus labels 1000 and 1004 is depicted on a schematic as a hexagon (not necessarily regular) containing a textual or symbolic label representing the name of the bus. A bus label can be used to convey a bus between disparate points on a schematic without the need to draw a contiguous bus line from the source point to the destination point.

On a schematic, a bus represents a bundle containing all the output means (axons) that have been connected to it. When a bus line on a schematic connects to the input of a neuron means or device, it is the equivalent of connecting each individual axon (output means) that has been connected to the bus, to the neuron's inputs. In FIG. 10, the schematic contains two signal buses labeled 'A' and 'B'.

Bus 'A' or 1000 carries the six outputs from the input nodes 300a-300f, and connects to the inputs of the three hidden neurons 302a-302c. This is identical in function to the connections made between input nodes and hidden layer neurons in FIG. 3 of the first embodiment. In that schematic, however, individual lines were used to depict each connection from the output of one neuron to the input of another neuron. In the schematic of FIG. 10, the individual connecting lines between input nodes and hidden layer neurons are replaced with bus line 'A'.

Bus 'B' (1004) holds the three outputs from the hidden layer neurons 302a-302c and carries them to the six output neurons 304a-304f. This is identical in function to the connections depicted by individual lines between hidden and output layer neurons in the schematic of FIG. 3 of the first embodiment. Here, another notational concept related to buses is utilized. The hexagon symbol containing bus label 1004 can be used to reference the labeled bus wherever it is required within the schematic, without having to run the bus line to the new location. In the schematic of FIG. 10 this convention can be seen connecting the signals represented in bus 'B' to the six output neurons 304a-304f, as well as the three hidden neurons 302a-302c.

Addition of Feedback to Neural Network—FIG. 10

The network of this second described embodiment (Feedback Chess Net, or FBCN) differs from the network of the first described embodiment in that it additionally employs feedback. This, in turn, demonstrates that the weight-adjustment learning method based on output-influenced and described in this disclosure can be used in networks with feedback, and is not restricted to use in only feed-forward networks.

The feedback is shown in the schematic by the connection of bus 'B' 1004 to the inputs of each of the three hidden-layer neurons. Because bus 'B' contains the outputs of the three hidden-layer neurons, this essentially diagrams the outputs of the three hidden layer neurons fed back to their own inputs. This makes them their own pre-synaptic artificial neuron means.

In other words, in addition to receiving one input from each input node 300a-300f, each hidden-layer neuron receives one input from itself, and one input from each of the other two hidden layer neurons. These feedback signals from the hidden layer neurons are depicted in the schematic by the connection of bus 'B' to each hidden layer neuron's input.

Operation of Second Embodiment—Feedback Chess Net (FBCN)—FIGS. 5-9

Like the first embodiment (FFCN), this Feed Back Chess Net (FBCN) network also uses as its learning means a weight-adjustment method that is based on attraction that pre-synaptic neurons exhibit towards post-synaptic neurons in response to the level of output-influenced by the post synaptic neurons.

With one exception, the functional operation of this network, which employs reactive feedback, is identical to the operation of the feed-forward network of the first embodiment (FFCN). Because feedback causes the outputs of neurons within the network to change as their own outputs are propagated back and used as inputs, it is generally necessary to run a propagation phase of the neural network multiple continuous times for each input pattern, so that the network outputs can settle near a given stable value. For this reason, the network is set to run a signal propagation phase with a given training pattern for three iterations in a row before running a weight-adjustment phase (a learning phase) for the propagated input pattern.

Network Training Procedure—FIG. 9

The neural network may be trained according to the procedure documented in the flow chart of FIG. 9 and in the source code (Embod2_c.txt in the appended attached files). The flow chart of FIG. 9 shows that a set of pre-defined input patterns are presented in sequence to the neuron along with desired output responses for each input pattern to be learned.

The procedure beginning at step 900 is controlled by a set of parameters, which are set in data block step 902. This second embodiment (Feed Back Chess Net) will be trained at one iteration per training pattern (N=1). This means that a training pattern from the set will be presented and trained once and then the next pattern in the set will be presented and trained. As discussed for the Feed Forward Chess Net above, responses to a set of three different input patterns (S=3) will taught to the network during training In networks with feedback it is sometimes necessary to run multiple propagation phases on a given pattern before performing a training phase, so that the network's response outputs have time to settle on a given response. The presently embodiment (Feed Back Chess Net) employs feedback, so the propagation phase will be run three times on a given pattern prior to running a learning (weight-adjustment) phase for the pattern. This is done in the flow chart of FIG. 9 by setting P equal to 3 in step 902.

Weight Jogging—FIG. 9

As discussed in the description of the Feed Forward Chess Net presented above, weight jogging is applied prior to training each set of patterns in the neural network. As in the first embodiment, this effectively initializes the weights to a small random value prior to starting the signal propagation and learning processes for the first time.

Signal Propagation and Learning Phases—FIGS. 5-9

As stated, each pattern in the set, along with its desired output value, is presented to the network for some number of iterations using steps 908, 910, and 912, and decision block 906. An index i is set to 1 in step 906 to access each of the three training patterns to be presented.

For each of the three training patterns in the set, the pattern and the desired outputs are presented to the network in step 908 and the network is trained on the pattern for 1 (N) iterations. An index j is initialized to 1 in step 910 to count of the number of times the network has been trained on the current (i) pattern.

To train the network on a given pattern, the network is first run in signal propagation phase in step 920 for five iterations. It is then run in learning phase in step 926. In this (FBCN) embodiment five propagation cycles are run for each learning cycle (P=5).

Index k is incremented in step 922 after performing the propagation phase in step 920.

If decision block 918 determines index k to be greater than P, a learn cycle will be performed in step 926. In this embodiment (FBCN) P is set to 5, and so the learning cycle is performed after five propagation cycles.

Signal Propagation Phase—FIGS. 5, 6, and 9

Each time a propagation phase is performed in step 920, the steps documented in FIG. 6 to perform a propagation phase for an entire network of neurons are run as detailed in this figure for the first embodiment. Recapping briefly, in FIG. 6, signal propagation processes performed for individual neurons are performed for each neuron in the network. The processes for performing signal propagation for a given single neuron are documented in FIG. 5. These have also been detailed in the discussion of FIG. 5 in the Feed Forward Chess Net of the first embodiment. In these steps, the signal is propagated to the output of the neuron in a conventional fashion. In addition, the influence factors of the learning method are propagated to the connecting (pre-synaptic) neurons.

Weight-Adjustment Learning Phase—FIGS. 7-9

As stated, once the predetermined number of propagation phases have been performed for a given training pattern in the set, a learn phase is performed in step 926. The steps required to perform a learning- and weight-adjustment phase for an entire network of neurons are documented in FIG. 8 and detailed in the discussion of FIG. 8 for the first embodiment (FFCN). Briefly, weight adjustment learning processes performed for individual neurons are performed for each neuron in the network. The processes for performing weight adjustment learning for a given single neuron are documented in FIG. 7. These have also been detailed in the discussion of FIG. 7 in the Feed Forward Chess Net of the first embodiment above.

Training Procedure May Be Repeated Multiple Times for Each Pattern—FIG. 9

After a signal propagation and learn phases have been performed index j is incremented in step 924. As stated, this index maintains a count of the number of times the network has been trained on a single given pattern from the set, If decision block 914 determines that the same pattern should be trained again, the propagation and learning steps just described are repeated.

Entire Set of Patterns Is Trained Multiple Times—FIG. 9

On the other hand, if decision block 914 determines that the current pattern doesn't need another iteration (indexed by j) of training, index i is incremented in step 912 to index the next pattern in the set of three training patterns.

If step 906 determines in that there are no more training patterns in the set, a decision is made in decision block or step 928 as to whether the training procedure should be run again for the entire set of training patterns. If step 928 decides to run the training set again, the steps described above to train the network will be repeated, starting at step 904. If step 928 decides that no more propagation and learning cycles are required, the training procedure for the current embodiment (FBCN, or Feed Back Chess Net) ends at step 930. This network typically achieves convergence rates in excess of 80 percent when it is trained on the training set and desired outputs described above.

Axonal Attraction to Output Influenced By Hidden-Layer Neurons

In the Feedback Chess Net (FBCN) of the currently described embodiment, learning is based on axonal attraction to the output-influenced by hidden-layer neurons. As with the first embodiment, this embodiment does not propagate error information back to hidden-layer neurons. Because no information about error value is back-propagated, the traditional restriction over signal feedback to hidden-layer neurons is completely eliminated. Instead, connections are formed and strengthened with hidden-layer neurons that have had the most influence over those output neurons that are most responsible for the network's response to the current input stimuli. Just as in the Feed Forward Chess Net, the system assumes that the forward neurons are themselves being taught to respond properly. The learning method based on the output influence learns, essentially by example, from the forward neuron's responses, instead of from error signals back propagated by the learning algorithm. Because the output neurons are themselves being taught to produce the most correct output responses, the system assumes that they will be more correct than incorrect.

Stated again in terms that are slightly more in line with biological descriptions, axons from the input nodes are most attracted to hidden-layer neurons that are exercising the greatest influence over post-synaptic neurons that have been most involved in the current network response to the current environmental situation.

This situation is generally sufficient for training the connections to the hidden layer because the forward neurons responsible for the current response are usually being properly trained, and are therefore likely to be responding correctly. That said, if the forward neurons are responding wrongly, the hidden-layer neurons, which are learning only from their responses, will be trained in support of the incorrect response.

In the next embodiment a neural network, Reinforcement Learning Chess Net (RLCN), will demonstrate how output-influenced based training of hidden neurons can be combined with positive and negative reinforcement signals produced by the neural network itself. By additionally utilizing these afferent positive and negative reinforcement signals, hidden neurons will be able to learn correctly, even when the network is producing an incorrect output response. The pre-synaptic connections will effectively be able to switch from being attracted to forward influence to being repulsed by forward influence, if negative afferent reinforcement signals are present.

FIGS. 4-12—Third Embodiment—Reinforcement Learning Chess Net (RLCN)

Figure 11:
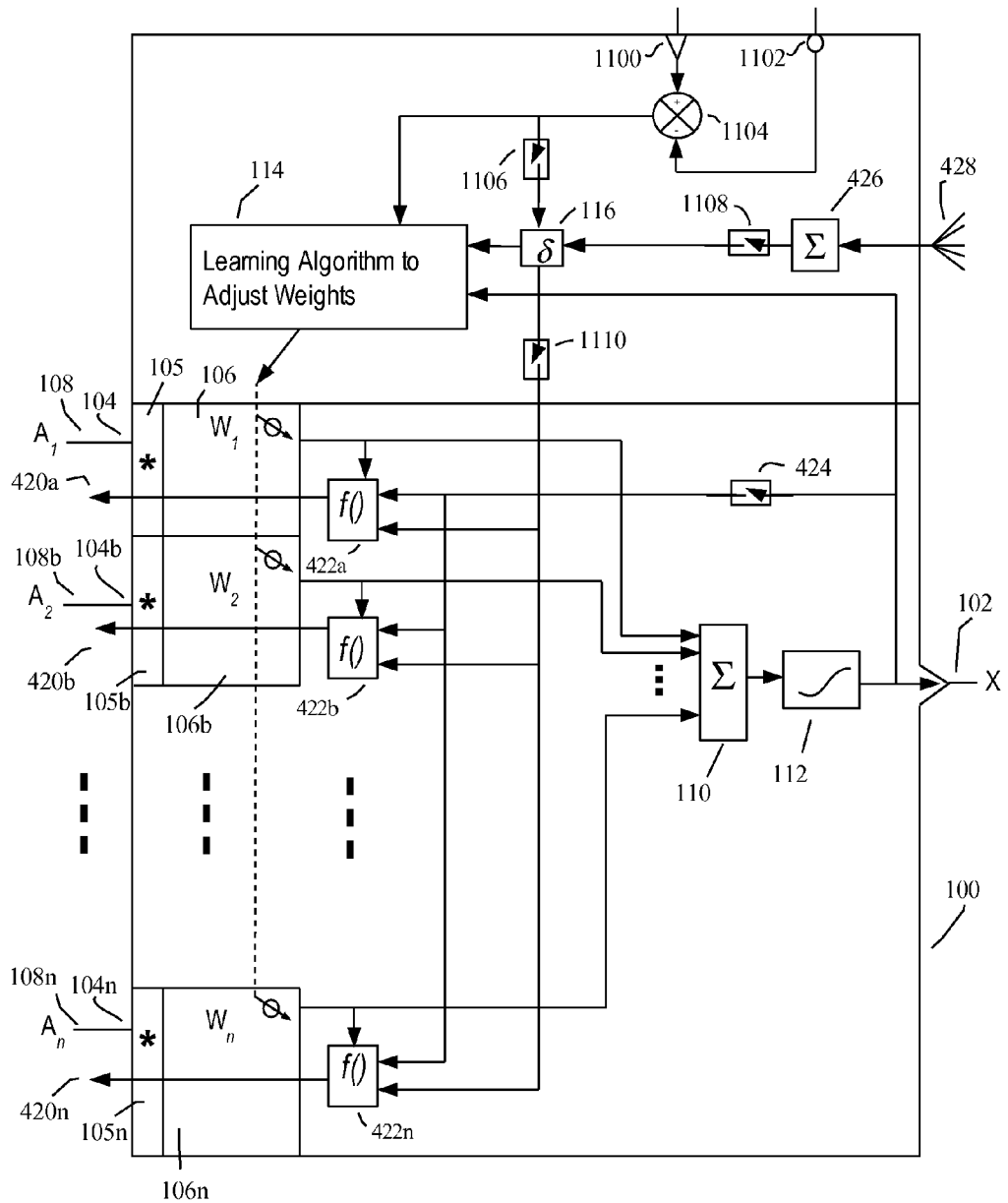
FIG. 11 is a schematic diagram of the neuron of FIG. 4 with some added features for using network signals as positive and negative reinforcement signals.
Figure 12:
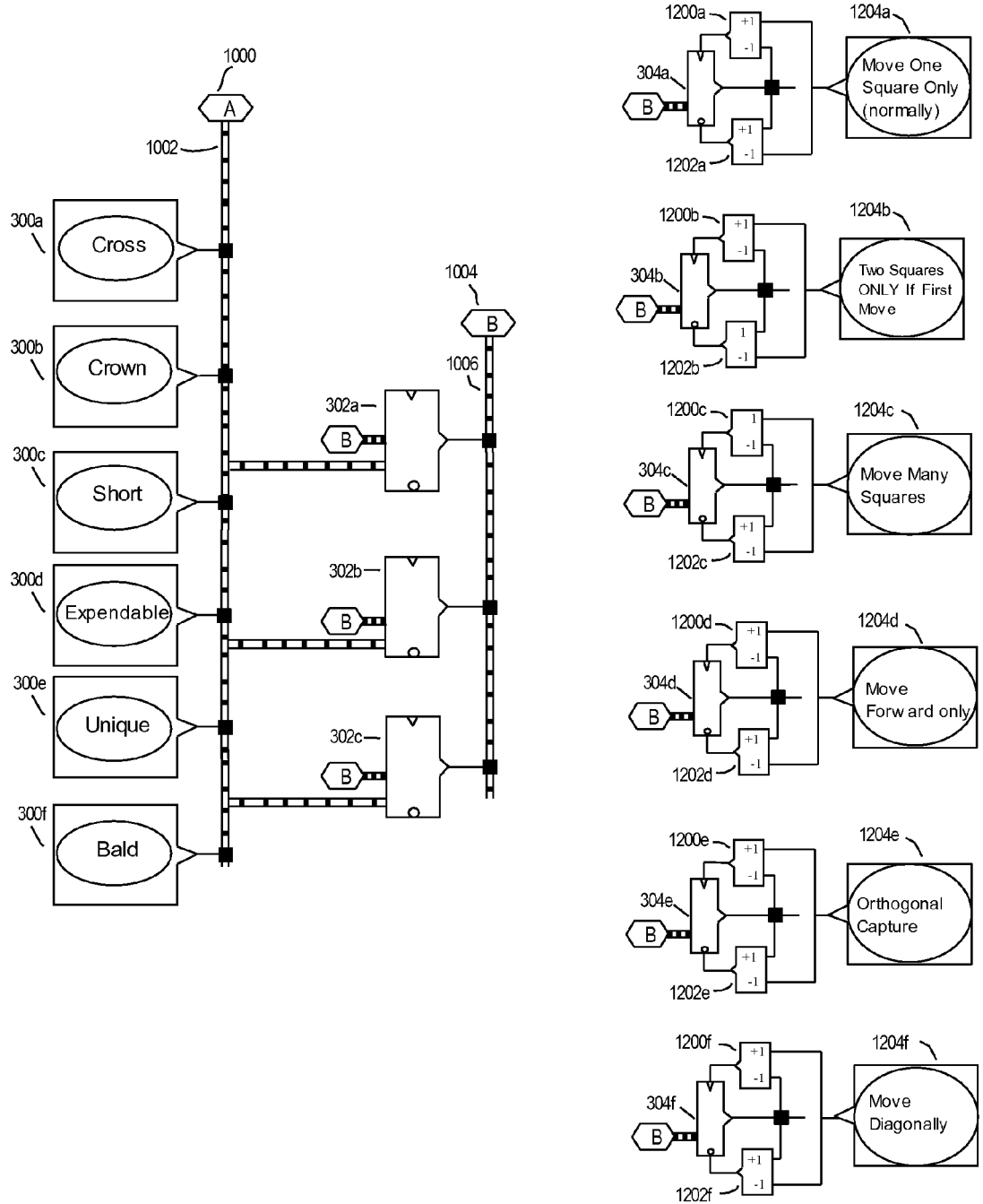
FIG. 12 is a schematic diagram of the neural network of third and fourth embodiments, called Reinforcement Learning Chess Net (RLCN), and Input-Influence Chess Net (IICN) respectively, which incorporate reactive and adaptive (reinforcement) feedback into the network.

Another aspect is embodied in the structure of a neuron device of FIG. 11 and demonstrated in the operation of an implementation of the Chess Network in the schematic of FIG. 12. It is named Reinforcement Learning Chess Net (RLCN) for ease of reference. This neuron uses—and is trained on—an identical set of training inputs and desired responses that were previously described for the Feed Forward Chess Net of the First embodiment.

Types of Signal Feedback

The class broadly described as "signal feedback" may itself be divided into constituent subclasses of feedback. Two of these subclasses are reactive feedback and adaptive feedback. Adaptive feedback is sometimes referred to in a broad sense as reinforcement feedback, reinforcement learning feedback, or associative feedback.

The reactive feedback of the previous embodiment is composed of output signals feeding back to the inputs of pre-synaptic neuron means as normal input stimuli. The adaptive feedback used in this embodiment is composed of feedback signals that are used to cause changes in how pre-synaptic neurons respond to other input stimuli. That is, adaptive feedback is defined as propagation-phase feedback signals that contribute to connection-weight value adjustments (or changes) in neuron devices. Adaptive signaling and adaptive feedback signals are roughly analogous to the signaling in biological organisms responsible for associative and reinforcement learning, although biological signaling mechanisms are very complex and varied.

In this aspect, called Reinforcement Learning Chess Net (RLCN), adaptive feedback is added to the network of the previously described embodiment (FBCN) in order to demonstrate the output-influenced based learning method operating in a network that employs both reactive and adaptive feedback signals. The network described here and in the drawings has also been implemented in the C programming language and is included as the C source code labeled Embod3_c.txt in the Appendix.

Neuron Structure—FIG. 11

The neuron device depicted in schematic form in FIG. 11 differs from the neurons thus far presented in that it contains inputs for adaptive signals 1100 and 1102. It also additionally contains a variety of means 1104, 1106, and 1108 for incorporating values of signals presented on the adaptive inputs into the neuron's error value and the weight-adjustment calculations performed by the neuron's weight adjustment facilities 114. In these embodiments the value of the negative adaptive input is subtracted from the value of the positive adaptive input and made available to be used as a factor in weight adjustments. This neuron further contains a means 1110 for incorporating the neuron's error value means or error signal (which may be produced from the adaptive input signals, forward calculated influence values, or both) into the influence values that are calculated and returned to pre-synaptic neurons. The use of the error signal in the influence value calculating means is represented in the diagram of a neuron device by a signal line from its error value means 116 to each of the function blocks 422a, 422b, 422n that perform the respective influence value calculations. This neuron device autonomously encapsulates and performs the functions required to use and teach neurons configured as a neural network.

This neuron device is generalized. Switch 1110 may be turned off to use the influence calculations presented and described in the previous embodiments. Switch 1110 will be turned on in this embodiment however, denoting that the neuron will incorporate error values when calculating influence values for pre-synaptic neurons.

The structure the synapse means depicted in this neuron are nearly identical to those of previous embodiments. The only difference is that the influence value calculating means additionally includes the ability to use the neuron's error value means 116 when producing respective influence values. Reviewing, each synapse means within the neuron means or neuron device is comprised of connection means 104 . . . 104n, modulating means 105 . . . 105n, weight means for storing or supplying a respective synapse weight or weight value 106 . . . 106n, influence value calculating means 422a . . . 422n for calculating influence values, and return paths 420a . . . 420n. The return paths make calculated influence values available to respective pre-synaptic neurons connected to each synapse via their connection means.

Adaptive inputs 1100 and 1102 that accept signals for use when altering weight values within a neuron can be seen in the schematic. Each neuron includes a positive adaptive input 1100, which is represented on a schematic as a hollow arrowhead on the inside of the line denoting the neuron. Each neuron also includes a negative adaptive input 1102, which is represented on a schematic as a small circle on the inside of the line denoting the neuron. This is consistent with conventions used to denote inverting inputs in schematics of electronic devices.

Each of adaptive inputs 1100 and 1102 to the neuron represent connection means that can accept any signal that can be conveyed on an axon. In other words, any signal source that can be connected to a neuron's input synapse means can also be connected to its adaptive inputs as well. Such signal sources may include the outputs of other neuron means, and signals from outside processes such as sensors. Neural networks that employ neurons with adaptive inputs are not new (Repici, Netlab, version 0.1, 1990, http://wwwjohnrepici.com/NN/NLA001/Netlab/NETLAB.EXE), but they are relatively unpopular in the prior art, in part because they can not be used effectively in combination with the popular back propagation weight adjustment algorithm.

Network Structure—FIG. 12

FIG. 12 shows a Reinforcement Learning Chess Net (RLCN) embodiment that adds an afferent sub-network to the neural network of the previous embodiment. The afferent sub-network of neurons processes and propagates signals that are, in turn, connected to the adaptive inputs of output neurons 304a-304f.

The additional afferent sub-network is composed of neurons 1200a-1200f to produce positive adaptive signals and neurons 1202a-1202f to produce negative adaptive signals. Also, the trainer no longer manipulates error values in the output neurons directly during learning phase but instead provides desired output values to the neural network for each pattern through afferent input nodes 1204a-1204f. These nodes provide axon level signal values that are processed by the neural network during signal propagation phase.

Neurons 1200a-1200f are referred to as positive adaptive neurons. Each positive adaptive neuron produces a signal that is connected to the positive adaptive input of each of respective output neurons 304a-304e. Desired output values provided by the trainer's input nodes 1204a-1204f for each input pattern are connected to an input on each respective positive adaptive neuron 1200a-1200f with a fixed connection weight value of +1.0. Each output neuron is also connected to each of these positive adaptive neurons with a fixed connection weight value of −1.0. This will produce an output when the output neuron's output-value is lower than the desired value from the trainer, and zero when the output neuron's output-value is higher than the value from the trainer.

Neurons 1202a-1202f are referred to as negative adaptive neurons. These mirror the positive adaptive neurons of the previous section (1200a-1200f), producing adaptive feedback signals for connection to the negative adaptive inputs of each of the output neurons. Each negative adaptive neuron produces a signal that is connected to the negative adaptive input of each of respective output neurons 304a-304e. Desired output values provided by the trainer's input nodes 1204a-1204f for each input pattern are connected to an input on each respective negative adaptive neuron 1202a-1202f with a fixed connection weight value of −1.0. Each output neuron is also connected to each of these negative adaptive neurons with a fixed connection weight value of −1.0. This will produce an output value when the desired output from the trainer neuron is lower than the output-neuron's output value, and no output when the desired output from the trainer is higher than the output neuron's output value.

Adaptive Input Values Are Used Directly by Output Neurons to Adjust their Connection Weights—FIG. 11

FIG. 11 shows that the external signal levels supplied to neurons at their adaptive inputs are used by each neuron to produce an error value 116. The error value is, in turn, used to make adjustments to weight values. As noted, each neuron has two adaptive inputs (sometimes called associative inputs) 1100 and 1102. One adaptive input, referred to as positive adaptive input 1100, accepts signals which will tend to make the input connection-weight values of the neuron more positive or less negative. The second adaptive input, the negative adaptive input, is for axon-level signals that will tend to make the input connection-weights of the neuron more negative or less positive. This is represented in a summing junction 1104 that essentially subtracts the value on negative adaptive input 1102 from that on positive adaptive input 1100 to produce a result which is incorporated in the neuron's error value 116. This is expressed in the following formula:

$$\delta = \alpha^{Positive} - \alpha^{Negative}$$

Here $\alpha^{Positive}$ is the value of the signal connected to the neuron's positive adaptive input, and $\alpha^{Negative}$ is the value of the signal connected to the neuron's negative adaptive input. Afferent neurons connected to the desired signal from the trainer and to the output neuron produce positive and negative adaptive input signals that represent the difference (positive or negative) between the output of the output neuron, and the desired signal from the trainer.

For output neurons an error value derived from the adaptive inputs is all that is generally used for a weight-adjustment factor. Functionally, this has the same effect on the neuron's error value as the more conventional method discussed above for output neurons in which the learning algorithm produces the output neuron's error value directly. That is, in more conventional methods, the learning algorithm itself produces the output neuron's error value by subtracting the actual output of the neuron from a known desired output value. The key functional difference in using adaptive input signals instead of the learning algorithm to produce the error value is as follows: The error value is produced during signal propagation phase and so is available for use during signal propagation phase as well as during the weight training phase that follows.

The neurons allow the option (represented as a switch 1106 in the schematic) of using the adaptive inputs, or the option (represented as a switch 1108) of using influence based inputs, or both, to produce the neuron error value that will be used to affect weight-adjustments when the next learning phase is performed.

Output-Influenced Values Are Further Modified By Neuron's Error Value—FIG. 11

In the present embodiment the output-influenced values are further modified by the post-synaptic neuron's error value before being returned to pre-synaptic neurons. In the neuron schematic of FIG. 11, just as in the previous embodiments, a value representing output-influenced is calculated for each pre-synaptic neuron connected at each synapse. These output-influenced values are calculated in post-synaptic (output) neurons and accumulated by each pre-synaptic neuron during the signal-propagation phase to be used as pre-synaptic neurons' error values. Error values produced in this way are, in turn, used during the learning phase as a factor in weight adjustment calculations, as well as during signal-propagation phase to produce influence values for connected neurons still further back.

Support for the disclosed learning method is depicted as return signal paths 420a, 420b . . . 420n, which represent influence values being made available to the respective pre-synaptic neurons making connection with each synapse. Influence values are produced during signal propagation phase in calculations represented in the schematic by function blocks 422a, 422b, 422n, and returned to pre-synaptic neurons. They are calculated during signal propagation phase for each synapse using a combination of the respective weight values ($W_1$, $W_2$ . . . $W_n$), the respective input values ($A_1$, $A_2$ . . . $A_n$), and the output value of the neuron X. They are also regulated by a predetermined proportion value ρ.

This embodiment differs from previous embodiments in that the influence values sent back to pre-synaptic neurons are further modified by the present neuron's error value. This error value may itself have been produced by influence values accumulated at signal-propagation phase, by signals connected to the neuron's adaptive inputs, or both. In any case, the advantage of error values produced in these ways is that they are produced during the signal propagation phase. Once a weight-adjustment (learning) phase begins, the error values are already in place and ready for use by whatever calculation one chooses to make the weight adjustments. In this embodiment, a conventional weight adjustment calculation (called the GDR or General Delta Rule) is used.

The calculations that produce the return influence values are depicted in the schematic as function boxes 422a, 422b . . . 422n for each synapse. The result of each calculation is returned to pre-synaptic neurons through return-paths 420a, 420b, . . . 420n. At each pre-synaptic neuron return paths 428 from post-synaptic neurons are summed in a summing block 426 and incorporated into the error value 116 used for its weight adjustment calculations.

The following expression shows the calculation performed and depicted by each of the function blocks 422a, 422b, 422n used to produce output-influenced values for pre-synaptic neurons during signal propagation phase:

$$r = W_{jk} A_j X_k \rho$$

For each synapse between the output of a pre-synaptic neuron j and the present neuron k the value of the axon level connected to the synapse $A_j$ is multiplied by the respective weight value $W_{jk}$, the output of the neuron $X_k$, and (optionally) a predetermined modifier value ρ used to globally regulate the proportion produced by the function blocks. The result r of each calculation of each function block 422a, 422b, . . . 422n is then further modified by the current neuron's error value $\delta_k$ and added to the error value of the pre-synaptic neuron connected at the respective synapse, as shown in the following expression:

$$\delta_j = \delta_j + r \delta_k$$

In this formula, the result r of the preceding calculation is further modified by the current neuron's error value $\delta_k$ before being accumulated to the pre-synaptic neuron's error value $\delta_j$. Each pre-synaptic neuron accumulates a sum 426 of all the output-influenced result values 428 calculated for it in all the post-synaptic neurons it is connected to. This sum, in turn, is added to the pre-synaptic neuron's error value 116, which is used in making weight adjustments during the neural network's learning phase.

The implementation of this embodiment provided in the Appendix (Embod3_c.txt) includes alternative code that simply makes the result r value the same mathematical sign as the current neuron's error value $\delta_k$ before accumulating it in the pre-synaptic neuron's error value.

Figure 13:
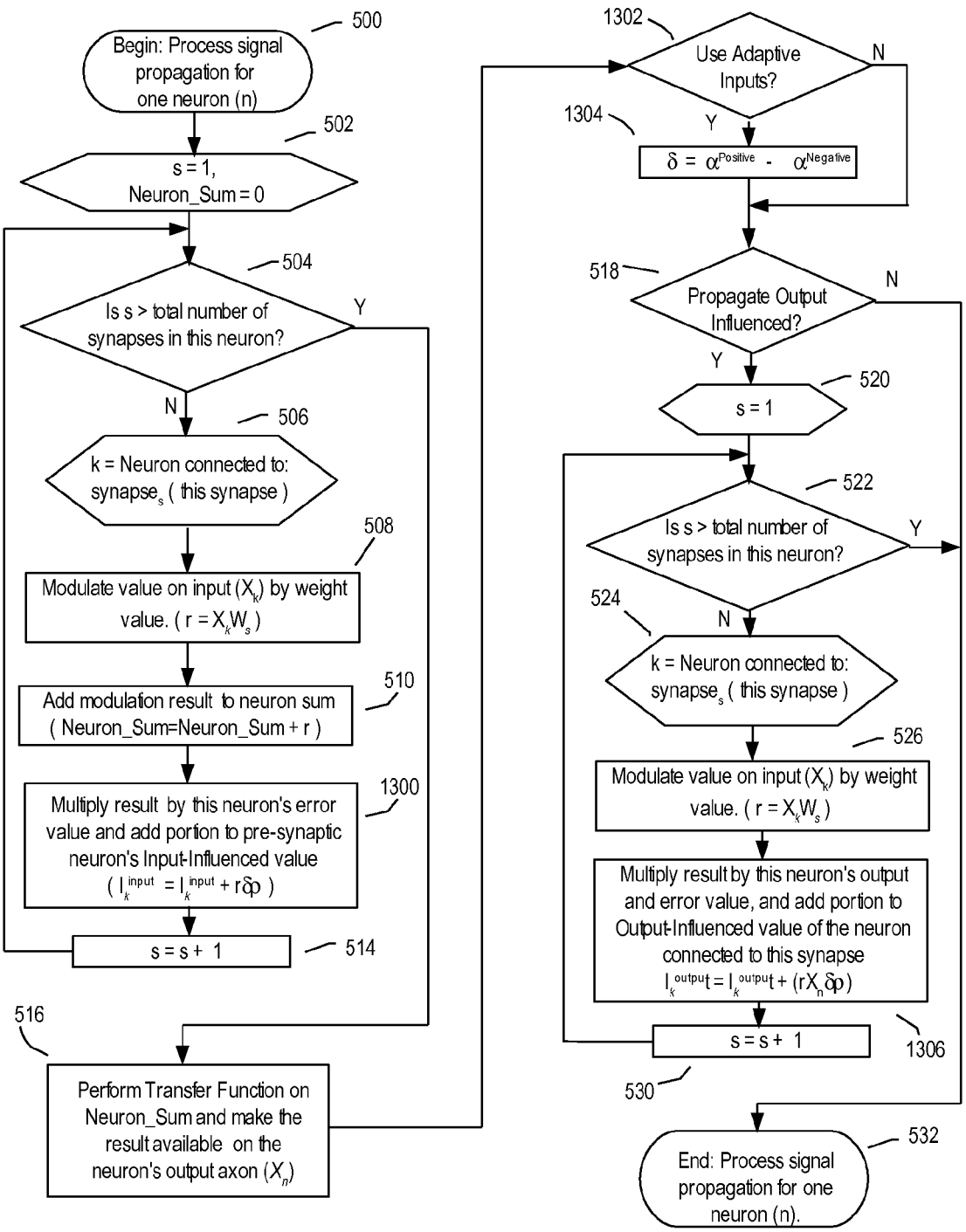
FIG. 13 is a flow chart showing the steps used to process signal propagation for a single neuron similar to FIG. 5 but including use of error values in influence calculations.

Signal Propagation Phase Processes for Neuron—FIG. 13

As in conventional methods, during signal propagation for a given neuron, a weighted sum of input values is produced. This is expressed in the following calculation:

$$x_k = \sum_i w_{ik} A_i$$

For each external process or pre-synaptic neuron i connected to the inputs of the given neuron k, axon level value $A_i$ is modulated by the weight value $w_{ik}$ between the given neuron k and the pre-synaptic neuron i. The result of each modulation of an axon level by a weight value is added to an internal sum $x_k$ for the neuron. The neuron's internal sum $x_k$ is then processed by a transfer function.

The flowchart of FIG. 13 begins with step 500, which is the start of the steps to process signal propagation for one neuron.

The internal weighted sum described above is calculated in steps 502-514 and 1300. The internal sum is first zeroed and an index s used to access each synapse is initialized in step 502. If the system determines in decision block 504 that there are more synapses in the neuron to process, an index k to the pre-synaptic neuron whose output is contacting it is obtained in step 506. The axon value from the pre-synaptic neuron $X_k$ is then multiplied by its respective weight $W_s$ in step 508, and the result is added to the neuron's internal sum in step 510.

In step 1300, this result of multiplying the input value by the weight value is further multiplied by the neuron's error value and then a portion of the result is added to the input-influenced value $I_k^{input}$ maintained for the pre-synaptic neuron k. Note that flexibility and performance in design is accommodated in the present embodiment by maintaining separate intermediate variables to accumulate input-influenced, and output-influenced variables in pre-synaptic neurons. These variables can be combined or selected for use as the error value for the neuron at this time or during weight adjustment phase. They are referred to in the C code amendment accompanying this embodiment as II variables for input-influenced variables, and OI variables for output-influenced variables.

Index s for synapses is incremented in step 514 so that processing steps 504-514 will be repeated for the next synapse in the neuron. If decision block 504 determines that there are no more synapses to process, the internal sum for the neuron has been accumulated and is ready to be processed by a transfer function.

Transfer Function—FIG. 13

According to the present embodiment a simple clipping routine is employed for use as a transfer function. Expressed in C code it is:

```
f(x){
  if(x>1) {
    x=1;
  }
  if(x<0) {
    x=0;
  }
  return(x);
}
```

Here, x represents the neuron's internal sum (the weighted sum of the inputs). If it is greater than +1 it is set equal to +1 and if it is less than 0 it is set equal to 0. If the value of x falls within the range of 0 to +1 it is not changed.

In step 516 of FIG. 13 this transfer function is performed and the output value returned by the transfer function is made available on the neuron's output axon. The neuron's output value is an axon level, which is made available for connection to other neurons as well as to external processes.

Summary of Calculation of Output-Influenced Values Incorporating Error Values During Signal Propagation Like the previously described embodiments, the neuron-level error values produced and used in calculations to affect weight adjustments in pre-synaptic non-output neurons (traditionally called "hidden neurons") are generated based on conditions present during the signal propagation (or "execution") phase of the network.

This embodiment differs from the previously described embodiment in that it employs error values when calculating output-influenced values that are returned to pre-synaptic neurons. As in previously described embodiments, the output-influenced values are values that loosely represent the amount of influence a given neuron has exerted over the outputs of the post-synaptic neurons it is connected to. The additional use of the post-synaptic neuron's error value when calculating influence values adds the ability for pre-synaptic neurons to learn directly from the network's incorrect responses as well as its correct responses. The calculation is documented in the following expression, which is performed for each hidden-layer neuron during signal propagation phase:

$$\delta_j = \delta_j + \left[ \sum_k w_{jk} A_j A_k \delta_k \rho \right]$$

Here, for a given neuron j, the amount of influence it has on a post-synaptic neuron's output response $A_k$ is added to its error value $\delta_j$, which will then be used by the neuron as a factor in making its weight adjustments. For each connection to a post-synaptic neuron, the influence value to be added to the neuron is calculated by multiplying (also referred to as modulating) the value of weight $w_{jk}$ connecting the post-synaptic neuron k to the neuron j by the neuron's output value A. The value is further modulated by the output of the post-synaptic neuron $A_k$ and by a predetermined propagation rate $\rho$ that is optional.

Finally, the internal sum of the neuron may be used instead of the output after the transfer function. Here, it is important to note that adjustments to the pre-synaptic neuron's weights represent changes in attraction to, or repulsion from, the pre-synaptic neuron by axons making connections with it.

Adaptive Inputs are Exclusive Source of Error Values in Output Neurons—FIG. 13

Continuing with FIG. 13, decision block 1302 then determines if the neuron's error value should be generated using the adaptive inputs. In the case of output neurons, adaptive inputs are used exclusively to produce the error value. Recall that the neuron's error value will be used in weight-adjustment calculations as well as in calculating influence values to be summed by pre-synaptic neurons. If the system determines that adaptive inputs should be used in decision block 1302, the calculation is performed in step 1304 to obtain the error value from the adaptive inputs. As previously discussed, this calculation is expressed in the formula:

$$\delta = \alpha^{Positive} - \alpha^{Negative}$$

This formula simply sets the neuron's error value 6 equal to the value on the positive adaptive input $\alpha^{Positive}$ minus the value connected to the negative adaptive input $\alpha^{Negative}$. In the code implementation included in the Appendix (Embod3_c.txt), the result of the subtraction is also maintained for each neuron in an intermediate value (Adapt) for coding convenience.

Implementation of Error Value Calculation Based on Output-Influenced—FIG. 13

From a practical frame of reference, the steps used to propagate output-influenced values to pre-synaptic neurons during signal propagation phase are documented in steps 518-530 and 1306 of FIG. 13.

The system first determines in decision block 518 if propagation of output-influenced is required. This is purely for design efficiency to avoid performing the computations if they are not necessary.

If propagation of output-influenced values is not necessary, the steps to process signal propagation for one neuron are completed and end in step 532.

If the system determines in step 518 that propagation of output-influenced values is required, all the synapses in the neuron are processed in sequence.

An index s for the synapses is initialized in step 520.

If the system determines in block 522 that there are more synapses in the neuron to process, an index k is obtained in step 524 to the pre-synaptic neuron k that is connected at the synapse.

The output value from the pre-synaptic neuron $X_k$ is then multiplied by its respective weight value $W_s$ to produce a result r for the synapse s in step 526.

In step 1304, the result r is further multiplied by the output X, and the error value 8 of the current neuron n, and a predetermined portion p is added to the pre-synaptic neuron's output-influenced value $I_k^{output}$, which will in turn be incorporated into its error value. The predetermined portion is optional in the calculation and may be disabled by setting it to 1.0. In this embodiment, the pre-determined portion is set to 1, which functionally disables it.

Index s for synapses is then incremented in step 530 so that these processing steps will be repeated for the next synapse in the neuron.

If decision block 522 determines that there are no more synapses to process, the steps to process signal propagation for one neuron are completed and end in step 532.

Signal Propagation Phase Process for Entire Network—FIG. 6

To performing the signal propagation phase for the network the signal is propagated for each neuron as described above and documented in the flow chart of FIG. 13. This is done for all the neurons in the neural network. FIG. 6 illustrates the process of signal propagation for an entire network, beginning at step 600. If decision block 602 determines that influence should be calculated during this process then step 604 initializes all the influence values in each neuron to zero (0.0). If no weight-adjustment phase will be run after the signal propagation phase, there is no need to calculate or initialize these error values.

Once the influence values have been optionally initialized, each neuron in the network is processed in sequence in steps 606, 610, and 612, and decision block 608. An index i to the neurons in the network is set to ONE in step 606. If decision block 608 system determines that there are more neurons in the network to be processed, the signal propagation procedure for a single neuron is performed for the next neuron i in step 610. The procedure used to process signal propagation for an individual neuron is documented in the flow chart of FIG. 13, as described above.

Continuing with FIG. 6, index i is incremented in step 612 so that all the neurons comprising the neural network will be processed in sequence. If decision block 608 determines in that there are no more neurons to process, the steps to process signal propagation for the entire network are completed and end in step 616.

Figure 14:
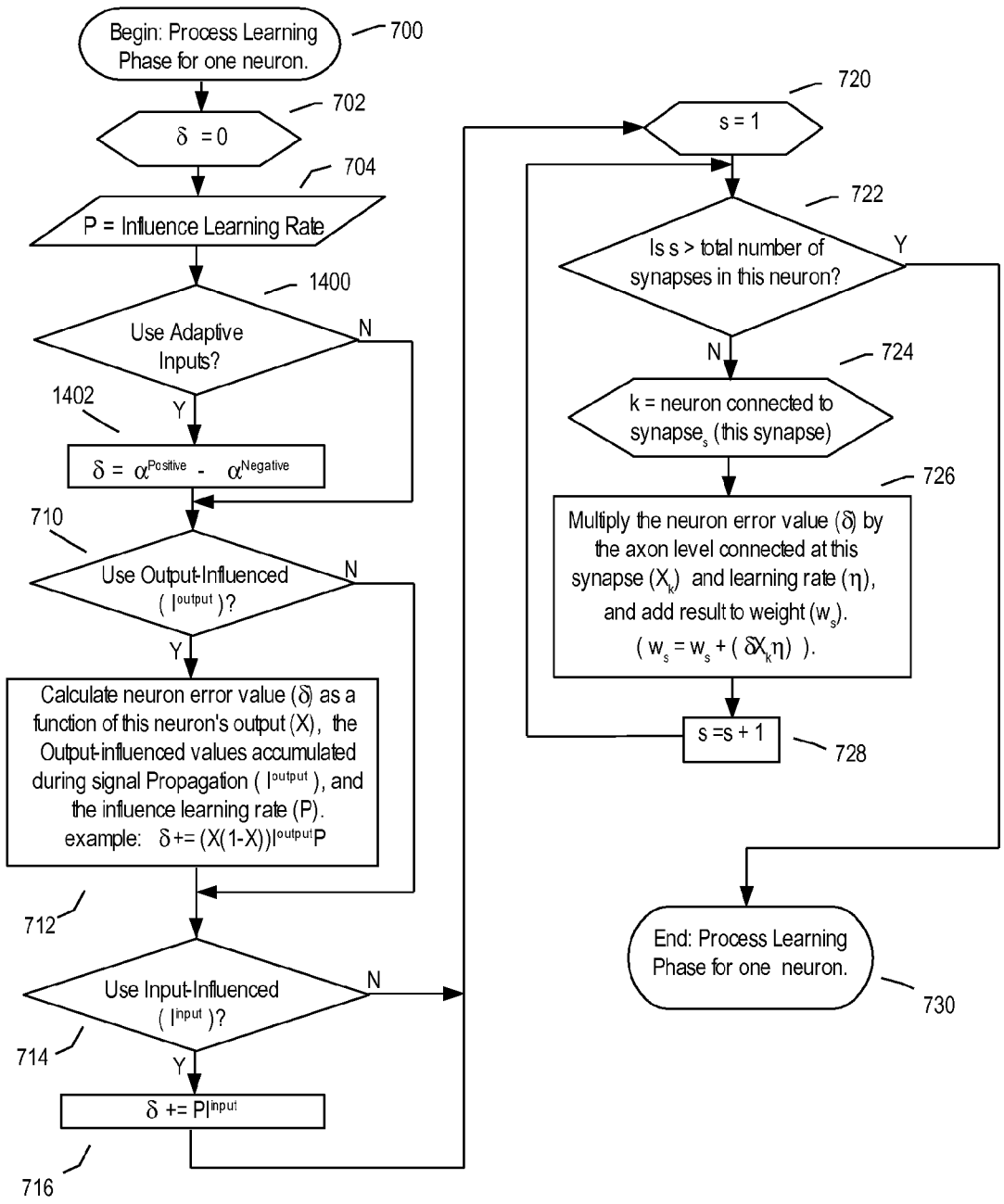
FIG. 14 is a flow chart showing the steps used to adjust weights with learning information for one neuron similar to FIG. 7 but including use of adaptive inputs in error-value calculations.

Weight-Adjustment Phase Processes for Neuron—FIG. 14

The learning, or weight-adjustment phase consists of adjusting the weights in each neuron in such a way that the network's output response is moved closer to the output response desired for the current stimulus pattern.

Obtaining Neuron Level Error Value For Output Neurons

During weight-adjustment phase error value δ for an output neuron that is trained using an external trainer is obtained in the same way as the error value is obtained for these output neurons during the signal-propagation phase. Specifically, the signal value present on the negative adaptive input $\alpha^{Negative}$ is subtracted from the signal value present on the positive adaptive input $\alpha^{Positive}$, and the result is used as the error value. It is expressed in a simple formula as:

$$\delta = \alpha^{Positive} - \alpha^{Negative}$$

This formula is identical to the error calculation performed for output neurons during signal propagation. It simply sets the neuron's error value δ equal to the value on the positive adaptive input $\alpha^{Positive}$ minus the value connected to the negative adaptive input $\alpha^{Negative}$. In the C code implementation included in the Appendix (Embod3_c.txt) the result of the subtraction is also maintained for each neuron in an intermediate value (Adapt) for coding convenience.

Using Output-Influenced or Input-Influenced Values Obtained During Signal Propagation Phase—FIG. 14

Pre-synaptic, or hidden-layer neurons (i.e., neurons whose outputs are connected to other neurons in the network) will employ error values based on influence values produced by the disclosed methods and means to affect connections with their inputs. In this embodiment these error values are calculated during signal-propagation phase. The calculation was documented as an expression in the section above titled "Summary of Calculation of Output-Influenced Values Incorporating Error Values During Signal Propagation". In this embodiment, therefore, the neuron level error values based on influence have already been calculated prior to the start of the weight-adjustment phase.

From a practical frame of reference, the steps performed during the weight-adjustment phase for a neuron being trained are implemented in the embodiment according to the steps and decision blocks of the flow chart of FIG. 14. As FIG. 14 shows, the error value used to adjust the weights is obtained in steps and decision blocks 702-716, 1400, and 1402. In this case, because separate intermediate variables have been used in the implementation to accumulate the influence values, the actual error value is initialized to ZERO in step 702. If the error value had been directly accumulated during signal propagation phase it will not be necessary to perform this initialization step, or the selection steps of 704-716, 1400, and 1402.

An optional predetermined influence learning rate is provided in step 704. If such a rate is not desired it can simply be set to 1.0. If there is are adaptive inputs derived from an example signal provided by an external trainer, the system determines in decision block 1400 and the error value is set equal to the value on the positive adaptive input minus the value on the negative adaptive input in step 1402.

If step 710 determines that output-influenced should be used, the error value used for weight-adjustments is calculated based on the output-influenced error value $I^{output}$ that was accumulated for this neuron during signal-propagation phase. In the present embodiment (Reinforcement Learning Chess Net, or RLCN) error value based on output-influenced is used to perform weight-adjustments in pre-synaptic neurons.

Modulating Neuron Error Value By Neuron's Modified Output Value—FIG. 14

The error value can be said to be modified by a function of the neuron's output in order to be expressed more generally, as shown in the expression:

$$\delta = \delta f(X)$$

Here f(X) represents some function of the output X of the post-synaptic neuron. In this embodiment (Reinforcement Learning Chess Net, or RLCN), the target neuron's output is modified in the function to provide a proper learning response curve as expressed in the following formula:

$$\delta = \delta(X(1-X))$$

In the above expression δ again represents the output-influenced value produced during the signal-propagation phase and X the output value produced by the target neuron. Here, the output value of the neuron is further modified to produce a faster learning rate in the middle of the neuron's output range and a slower learning rate when the neuron's output is near its minimum or maximum output levels. This is the calculation performed in the present embodiment in step 712 of FIG. 14.

If decision block 714 determines that the error value used for weight-adjustments is to input-influenced, then the input-influenced value accumulated during the signal propagation phase is multiplied by the learning rate P (if any) in step 716 and used as the error value 6 in the weight-adjustment calculation.

The present embodiment does not use input-influenced values as a factor in weight-adjustments however, so control is passed to steps and decision block 720-730. Here the neuron level error value that has been previously produced is used to adjust each individual connection weight in the neuron.

Adjusting Individual Weights

Error value δ, calculated by the learning method for a given neuron, is used as a factor when making adjustments to the individual weights within the neuron. Once the error value has been calculated as a function of influence, or through the adaptive inputs (as described above), individual weights may be adjusted using a variety of conventional means that employ the error value to alter the weight value. In the present embodiment, individual weights are, as stated, adjusted by a conventional method referred to as the generalized delta rule, or GDR. Though it is a conventional formula, it will employ a neuron error value produced by the methods of the embodiment described above. The weight-adjustment procedure is expressed by the equation:

$$W_{ij} = W_{ij} + \eta \delta_j A_i$$

for a given neuron j, the error value $\delta_j$ calculated using one of the methods described above is incorporated in making the individual weight-adjustment calculations for the neuron j. Here i represents the pre-synaptic neuron or process that is connected to the neuron j whose weights are currently being adjusted. In this calculation, $W_{ij}$ is the weight value between i and j that will be adjusted by the calculation. In pre-synaptic neurons, the weight is adjusted by the neuron's error value $\delta_j$ which is culled during signal propagation phase as the output-influenced value described above. For output neurons the error value is obtained simply by subtracting a desired output from the actual output. The neuron's error value is further modulated in this expression by the learning rate η determined as part of the learning algorithm. The learning rate is generally used to slow the rate at which the weights are altered so as to reduce the amount each weight-adjustment will corrupt weight values that have already been trained on previously trained patterns.

Finally, the individual weight-adjustment value is also proportional to the output value $A_i$ produced by the pre-synaptic neuron or process connected to (and modulated by) this weight (i.e., the output value of the neuron connecting to the target neuron). If the value on the output of the pre-synaptic neuron is small, the weight-adjustment will be small in the target neuron. As mentioned, this particular weight-adjustment method, based on these three factors, is referred to as the GDR, or generalized delta rule.

Implementation of Individual Weight Adjustments—FIG. 14

Continuing with FIG. 14, in step 720 an index s for use in accessing the connections and weights of the neuron's synapses is initialized. If decision block 722 determines that there are more synapse connections to process, an index k to the neuron connecting to the current synapse s is obtained in step 724. The output value ($X_k$) of the neuron connecting to the target neuron is multiplied by the error value δ and a global learning rate η, and the result is added to the weight value for the connection synapse $w_s$. Index s is incremented in step 728 to access the next connection synapse. If decision block 720 determines that there are no more connection synapses in the neuron to process, the process to perform the learning phase for one neuron ends in step 730.

Weight-Adjustment Learning Phase Processes For An Entire Network—FIG. 8

Performing the weight-adjustment phase processes for an entire network of neurons consists of performing the weight-adjustment processes for each neuron in the network as described above and documented in the flow chart of FIG. 14. As shown in FIG. 8, the weight-adjustment process for an entire network begins at step 800. Each neuron in the network is processed in sequence in steps 802, 806, 808, and decision block 804. An index i to the neurons in the network is first initialized in step 802.

If decision block 804 determines that there are more neurons in the network to be processed, the weight-adjustment procedure for a single neuron is performed for the next neuron i in step 806. The procedure used to process signal propagation for an individual neuron is documented in the flow chart of FIG. 14, as described above.

Index i is incremented in step 808 so that all the neurons comprising the neural network will be processed in sequence. If decision block 804 determines that there are no more neurons to process in the network, the steps to perform weight-adjustments for the entire network are completed and end in step 812.

Network Training Procedure—FIG. 9

The neural network may be trained according to the procedure documented in the flow chart of FIG. 9 and in the source code (Embod3_c.txt in the appended attached files). The flow chart of FIG. 9 shows a set of pre-defined input patterns presented in sequence to the network along with desired output responses for each input pattern to be learned.

The procedure beginning at step 900 is controlled by a set of parameters which are set in data block step 902. This third embodiment (Reinforcement Learning Chess Net, or RLCN) will be trained at one iteration per a training pattern (N=1). This means that a training pattern from the set will be presented and trained once, and then the next pattern in the set will be presented and trained. As discussed for the Feed Forward Chess Net above, responses to a set of three different input patterns (S=3) will be taught to the network during training In networks with feedback it is sometimes necessary to run multiple propagation phases on a given pattern before performing a training phase, so that the network's response outputs have time to settle on a given response. The present embodiment (Reinforcement Learning Chess Net) employs both reactive and adaptive feedback, so the propagation phase will be run seven times on a given pattern prior to running a learning (weight-adjustment) phase for the pattern. This is accomplished in the flow chart of FIG. 9 by setting P equal to 7 in step 902.

Weight Jogging—FIG. 9

As discussed in the description of the Feed Forward Chess Net above, weight jogging is applied prior to training each set of patterns on the neural network. As in the first embodiment, this effectively initializes the weights to a small random value prior to starting the signal propagation and learning processes for the first time.

Signal Propagation and Learning Phases—FIGS. 8, 9, and 13

Each pattern in the set, along with its desired output value, is presented to the network for some number of iterations using steps 908, 910, 912, and decision block 914. An index i is initialized in step 906 to access each of the three training patterns to be presented.

For each of the three training patterns in the set, the pattern and the desired outputs are presented to the network in step 908 and the network is trained on the pattern for 1 (N) iterations. Step 910 initializes an index j to maintain a count of the number of times the network has been trained on the current (i) pattern.

To train the network on a given pattern, the network is first run in signal propagation phase in step 920 for seven iterations. It is then run in learning phase in step 926. In this (RLCN) embodiment seven propagation cycles are run for each learning cycle (P=7).

Index k is incremented in step 922 after performing the propagation phase in step 920. If the system determines index k to be greater than P in decision block 918, a learn cycle will be performed at step 926. In this embodiment (RLCN) P is set to 7, and so the learning cycle is performed after seven propagation cycles.

Signal Propagation Phase—FIGS. 6, 9, and 13

Each time a propagation phase is performed in step 920, the steps documented in FIG. 6 to perform a propagation phase for an entire network of neurons are run as detailed for FIG. 6 for this embodiment. Recapping briefly, in FIG. 6, signal propagation processes performed for individual neurons are performed for each neuron in the network. The processes for performing signal propagation for a given single neuron of this embodiment are documented in FIG. 13. Here the signal is propagated to the output of the neuron in a conventional fashion. The adaptive inputs are used at the output neurons to produce error values, which are incorporated in the calculations of the influence factors of the learning method, which are, in turn, propagated to the connecting neurons.

Weight-Adjustment Learning Phase—FIGS. 8, 9, and 14

As stated, once the predetermined number of propagation phases have been performed for a given training pattern in the set, step 926 performs a learn phase. The steps required to perform a learning and weight adjustment phase for an entire network of neurons are documented and detailed in FIG. 8 and its discussion for this embodiment (Reinforcement Learning Chess Net, or RLCN) above. Briefly, weight-adjustment learning processes performed for individual neurons are performed for each neuron in the network. The processes for performing weight-adjustment learning for a given single neuron are documented in FIG. 14 and detailed in the accompanying discussion.

Training Procedure May Be Repeated Multiple Times for Each Pattern—FIG. 9

After a signal propagation and learn phases have been performed, index j, as stated, maintains a count of the number of times the network has been trained on a single given pattern from the set. The step 924 increments the index. If decision block 914 determines that the same pattern should be trained again, the propagation and learning steps just described are repeated for the current pattern.

Entire Set of Patterns Is Trained Multiple Times—FIG. 9

On the other hand, if decision block 914 determines that the current pattern doesn't need another iteration (indexed by j) of training, step 912 increments index i to index the next pattern in the set of three training patterns.

If step 906 determines that there are no more training patterns in the set, block 928 decides whether the training procedure should be run again for the entire set of training patterns. If block 928 decides to run the training set again, the steps described above to train the network will be repeated, starting at step 904. If block 928 decides that no more propagation and learning cycles are required, the training procedure for the current embodiment (RLCN, or Reinforcement Learning Chess Net) ends at step 930. This network typically achieves convergence rates in excess of 90 percent when it is trained on the training set and desired outputs described above.

Learning is Based on Both Attraction and Aversion to Influence Exerted By Hidden Layer Neurons The network of this embodiment, called Reinforcement Learning Chess Net (RLCN), demonstrates how output-influenced based weight-adjustments in hidden neurons can be combined with positive and negative afferent signals (sometimes referred to as reinforcement signals, or adaptive signals) produced by the neural network during the signal-propagation phase. By additionally utilizing error values based on these afferent positive and negative signals when calculating influence, hidden neurons are able to learn correctly, even when the network is producing an incorrect output response. When afferent signals indicating an incorrect response are present, the pre-synaptic connections to the hidden-layer neurons will effectively be able to switch from being attracted to forward influence, to being repulsed by forward influence.

To accomplish this, the embodiment uses error information from the post-synaptic (output-layer) neurons as a factor when calculating output-influenced values that are propagated back to hidden layer neurons. This is functionally similar to the conventional back propagation algorithm of the prior art, but differs in at least one very significant way. Because the error values are produced during the signal-propagation phase, there is no restriction on propagation-phase feedback signals. Instead, the production and propagation of error information to pre-synaptic neurons is itself a form of signal feedback that is propagated during signal-propagation phase. As is the case for all networks with signal feedback, the signal-propagation phase may need to be run multiple times over a single pattern in order for the feedback reactions to settle, but use of signal feedback itself will not be limited in the network design. In fact, for the Reinforcement Learning Chess Net (RLCN) of this embodiment, propagation phase feedback of adaptive signals contributes to the network's ability to correctly learn how to respond from the training set.

Incorporating error values into the pre-synaptic influence value calculations has the effect of modulating the attraction of input axons to the influence exhibited by hidden-layer neurons over the current network response. An overall indication in afferent signals that the output response is wrong will cause connection strengths to the most influential hidden-layer neurons to be reduced instead of strengthened.

In biological terms, the reinforcement feedback used in this embodiment roughly allows the internal (input) neurons to switch from being attracted to influence exerted by forward neurons, to being repulsed by it, if afferent network signals indicating an overall incorrect response are present.

FIGS. 6, 8, 9, and 11-14—Fourth Embodiment—Input-Influenced Chess Net (IICN)

In another aspect, the network of the previous embodiment (RLCN) is modified to use an influence-learning method based on attraction or aversion to the influence over weighted input levels that has been exercised by forward (post-synaptic) neurons. This aspect of the learning method used is referred to as input-influenced. It differs from the output-influenced method utilized in the Reinforcement Learning Chess Net (RLCN) of the previous embodiment in that it does not consider the output produced by the post-synaptic neuron when calculating reinforcement values for pre-synaptic neurons to which it is connected.

The network topology of this embodiment is identical to the network of the previous network. It has been documented in schematic form in FIG. 12 and described in detail for the previous embodiment.

The network described here and in the drawings has also been implemented in the C programming language and included as C code labeled Embod4_c.txt in the Appendix.

Operation of Fourth Embodiment—Input-Influenced Chess Net (IICN)—FIGS. 6, 8, 9, and 11-14

FIG. 11 shows the artificial neuron schematic. There is only one operational difference between this embodiment and the Reinforcement Learning Chess Net (RLCN) of the previous embodiment. Here the learning algorithm used to produce influence values for pre-synaptic artificial neuron means (or simply pre-synaptic neurons) during signal propagation phase does not incorporate the post-synaptic neuron's output value as a factor. This can be represented in FIG. 11 as switch 424 being opened so that the output value is not input to function blocks 422a-422n that produce influence values for pre-synaptic neurons (the influence value calculating means).

The primary advantage of using input-influenced values over output-influenced values is that they can be calculated at the same time the post-synaptic neuron's internal sum is calculated. Thus a separate computational pass over the post-synaptic neuron's synapse means following the calculation of an output value is not necessary. The input-influenced learning method in this aspect should only be used in feed-forward-only networks if some means is employed that will stop learning once convergence has been achieved. For this reason it may be thought of as a less-general solution than the output-influenced method described in the previous three embodiments. That said, in networks where inherent limiting factors, such as adaptive feedback, are an integral part of the design of the network, no outside process will be needed. The network will stop learning on its own, even in the presence of continued learning cues from the environment.

Network Training Procedure—FIG. 9

The neural network may be trained according to the procedure documented in the flow chart of FIG. 9, and in source code (Embod4_c.txt in the appended attached files). The flow chart shows that a set of pre-defined input patterns are presented in sequence to the neuron, along with desired output responses for each input pattern to be learned.

The procedure beginning at step 900 is controlled by a set of parameters which are set in data block step 902. This fourth embodiment (Input-Influenced Chess Net) will be trained at one iteration per a training pattern (N=1). This means that a training pattern from the set will be presented and trained once, and then the next pattern in the set will be presented and trained. As discussed for the Reinforcement Learning Chess Net above, responses to a set of three different input patterns (S=3) will be taught to the network during training In networks with feedback it is generally necessary to run multiple propagation phases on a given pattern before performing a training phase, so that the network's response outputs have time to settle on a given response. The present embodiment (Input-Influenced Chess Net) employs feedback, so the propagation phase will be run seven times on a given pattern prior to running a learning (weight-adjustment) phase for the pattern. This is accomplished in the flow chart of FIG. 9 by setting P equal to 7 in step 902.

Weight Jogging—FIG. 9

As discussed in the description of the Feed Forward Chess Net, weight jogging is applied prior to training each set of patterns on the neural network. As in the first embodiment, this effectively initializes the weights to a small random value prior to starting the signal propagation and learning processes for the first time.

Signal Propagation And Learning Phases—FIGS. 6 and 8-14

As stated, each pattern in the set, along with its desired output value, is presented to the network for some number of iterations using steps 908, 910, 912, and decision block 914. An index i is initialized in step 906 to access each of the three training patterns to be presented.

For each of the three training patterns in the set, the pattern and the desired outputs are presented to the network in step 908 and the network is trained on the pattern for 1 (N) iterations. FIG. 12 shows that the desired output value for each neuron is presented as input signals through six afferent input-nodes 1204a-1204f. These provide the desired output as an example input signal to afferent neurons 1200a-1200f and 1202a-1202f.

An index j is initialized in step 910 to maintain a count of the number of times the network has been trained on a pattern. To train the network on a given pattern, the network is first run in signal propagation phase in step 920 for seven iterations. It is then run in learning phase in step 926. In this (Input-Influenced Chess Net, or IICN) embodiment seven propagation cycles are run for each learning cycle (P=7). Step 922 increments index k in after performing the propagation phase in step 920. If decision block 918 determines index k to be greater than P, step 926a will perform a learn cycle.

Signal Propagation Phase—FIGS. 6, 13, and 9

Each time step 920 of FIG. 9 performs a propagation phase, the steps documented in FIG. 6 to perform a propagation phase for an entire network of neurons are run as detailed for the Reinforcement Learning Chess Net of the previous embodiment. Recapping briefly, in FIG. 6, signal propagation processes performed for individual neurons are performed for each neuron in the network. The processes for performing signal propagation for a given individual neuron are documented in FIG. 13. These have also been detailed in the discussion of FIG. 13 in the Reinforcement Learning Chess Net in the embodiment described previously. In these steps, the signal is propagated to the output of the neuron in a conventional fashion and the influence factors generated by the learning method are propagated to the connecting neurons.

Calculation of Input-Influenced Value—FIG. 13

In this aspect, input-influenced is used. Thus the calculations performed in step 1300 of FIG. 13 are the ones that will produce the error values that will be used by pre-synaptic neurons to adjust their weight values. Here, the calculation performed in step 1300 uses the result r produced in step 508, by multiplying the output value from the pre-synaptic neuron $X_k$ with the weight value at the neuron's synapse $W_s$. In step 1300, this result r is multiplied by the present neuron's error value $\delta$ and a propagation proportion $\rho$ and added to the pre-synaptic neuron's input-influenced valued $I_k^{input}$. In this embodiment the proportion value is set to 1.0 which effectively disables it. The input-influenced value is used as an intermediate value for coding convenience, and will be the value of the pre-synaptic neuron's error value in the code implementation (Embod4_c.txt).

Summary of Calculations Performed by the Input-Influenced Learning Method

Like the previously described embodiments, the neuron-level error values produced and used in calculations to affect weight-adjustments in pre-synaptic neurons (traditionally called "hidden neurons") are generated based on conditions present during the signal propagation (or "execution") phase of the network.

Forward neurons calculate input-influenced values, which are accumulated by pre-synaptic neurons to use as their error value when adjusting weights, and when calculating influence values for their own connected pre-synaptic neurons. This embodiment differs from previously described embodiment in that it employs input-influenced instead of output-influenced values. Input-influenced values don't use the output of the current neuron as a factor in their production.

The input-influenced values produced by the learning method are values that loosely represent the amount of influence a given neuron has exerted over the inputs of the post-synaptic neurons to which it is connected. The calculation is documented in the following expression, which is performed for each hidden-layer neuron in the Input-Influenced Chess Net (IICN) during signal propagation phase:

$$\delta_j = \delta_j + \left[\sum_k w_{jk} A_j \delta_k \rho\right]$$

Here, for a given neuron j, the amount of influence its output $A_j$ has on a post-synaptic neuron's weighted input $W_{jk}A_j$ is added to its error value $\delta_j$, which will then be used by the neuron as a factor in making its weight adjustments. For each connection to a post-synaptic neuron, the influence value to be added to the pre-synaptic neuron's error value is calculated by multiplying (also referred to as modulating) the value of the weight Wk connecting the post-synaptic neuron k to the pre-synaptic neuron j, by the pre-synaptic neuron's output value $A_j$. The value is further modulated by the post-synaptic neuron's error value $\delta_k$, and by a predetermined influence propagation rate $\rho$ that is optional. In the present embodiment (Input-Influenced Chess Net, or IICN) the propagation rate $\rho$ is set to 1.0, which effectively disables it.

Adaptive Inputs Are Exclusive Source of Error Values In Output Neurons—FIG. 13

As shown in FIG. 13, step 1302 determines whether the error value should be generated using the adaptive inputs. In the case of output neurons, adaptive inputs are used exclusively to produce the error value. As stated, the neuron's error value will be used in weight-adjustment calculations as well as in calculating influence values to be summed by pre-synaptic neurons. If the system determines that adaptive inputs should be used in decision block 1302, step 1304 performs the calculation to obtain the error value from the adaptive inputs. As in the previously described embodiment, this calculation is expressed in the formula:

$$\delta = \alpha^{Positive} - \alpha^{Negative}$$

This formula simply sets the neuron's error value $\delta$ equal to the value on the positive adaptive input $\alpha^{Positive}$ minus the value connected to the negative adaptive input $\alpha^{Negative}$. In the C code implementation included in the Appendix (Embod4_c.txt) the result of the subtraction is also maintained for each neuron in an intermediate value (Adapt) for coding convenience.

Weight-Adjustment Learning Phase—FIGS. 8, 9, and 14

As stated, once the predetermined number of propagation phases have been performed for a given training pattern in the set, step 926a performs a learn phase. The steps required to perform a learning and weight-adjustment phase for an entire network of neurons are documented in FIG. 8 and detailed in the accompanying discussion for the previous embodiment (RLCN) above. Briefly, in FIG. 8, weight-adjustment learning processes performed for individual neurons are performed for each neuron in the network. The processes for performing weight-adjustment learning for a given single neuron are documented in FIG. 14. These have also been detailed in the discussion of FIG. 14 in the Reinforcement Learning Chess Net of the previous embodiment (above).

The Training Procedure May Be Repeated Multiple Times for Each Pattern—FIG. 9

After a signal propagation and learn phases have been performed, index j, as stated, maintains a count of the number of times the network has been trained on a single given pattern from the set.

Step 924 increments the index. If decision block 914 that the same pattern should be trained again, the propagation and learning steps just described are repeated for the current pattern.

Entire Set of Patterns Is Trained Multiple Times—FIG. 9

On the other hand, if decision block 914 determines that the current pattern doesn't need another iteration (indexed by j) of training, step 912 increments index i to index the next pattern in the set of three training patterns.

If step 906 determines that there are no more training patterns in the set, decision block 928 decides whether the training procedure should be run again for the entire set of training patterns.

If step 928 determines to run the training set again, the system repeats steps described above to train the network starting at step 904. If decision block 928 determines that no more propagation and learning cycles are required, the training procedure for the current embodiment (IICN, or Input-Influenced Chess Net) ends at step 930. This network typically achieves convergence rates in excess of 90 percent when it is trained on the training set and desired outputs described above.

Learning is Based on Both Attraction and Aversion to Input Influenced by Hidden Layer Neurons The neural network of this embodiment, called Input-Influenced Chess Net (IICN), demonstrates how input-influenced based weight-adjustments in hidden neurons can be combined with positive and negative afferent signals produced by the neural network. By additionally utilizing error values based on these afferent positive and negative signals when calculating influence values for pre-synaptic neurons, hidden neurons are able to learn correctly, even when the network is producing an incorrect output response. The pre-synaptic connections to the input neurons will effectively be able to switch from being attracted to forward influence, to being repulsed by forward influence, when afferent signals indicating an incorrect response are present.

To accomplish this, the neuron uses its own error information as a factor when calculating influence values that are propagated back to hidden layer neurons. This is functionally similar to the conventional back-propagation algorithm of the prior-art, but differs in at least one very significant way. Because the error values are produced during signal propagation phase, there is no restriction on propagation-phase feedback signals. Instead, the production and propagation of error information to pre-synaptic neurons is itself a form of signal feedback that is propagated, as all signaling, during signal propagation phase.

Incorporating neuron error values into the pre-synaptic influence value calculations has the effect of modulating the amount of attraction that input axons exhibit to the influence exercised by hidden-layer neurons over the weighted input of the post-synaptic neurons to which they connect. An overall indication in afferent signals that the output response is wrong will cause connection strengths with the most influential hidden-layer neurons to be reduced instead of strengthened.

In biological terms, the reinforcement feedback used in this embodiment roughly allows internal (input) neurons to switch from being attracted to influence exerted by forward neurons to being repulsed by it, if afferent network signals indicating an overall incorrect response are present.

Conclusions, Ramifications, and Scope

Thus the reader will see that the embodiments employing this influence-based learning method are inherently capable of producing viable weight-adjustments (learning) in neural networks that are constructed with one or more hidden layers of neurons. This can be accomplished without regard for the complexity or type of feedback used in the construction of the network. Networks constructed with no feedback (customarily called feed-forward networks) may employ the output-influenced, or input-influenced aspects of the learning method to effect weight-adjustments, as has been documented in the Feed Forward Chess Net of the first embodiment. Those wishing to construct neural networks with unlimited feedback structures may also employ the output-influenced learning method as it was used in both the Feed Back Chess Net and the Reinforcement Learning Chess Net that have been documented above. Put simply, the influence learning method disclosed and used in these embodiments is a truly general learning method, which may be used in neural networks constructed without feedback, or in neural networks constructed with feedback paths of arbitrary complexity and type.

In situations where adaptive feedback is included in the design of the neural network, a neural network designer has the option of using a slightly more computationally efficient aspect of the learning method called input-influenced learning. This was the learning method used in the neural network of the embodiment called Input-Influenced Chess Net (IICN), which was described above. Influence learning can be configured to use input-influenced values in feed-forward networks as well. However in such cases the designer may want to specify some means of disabling weight-adjustment learning once the network has learned to properly respond to the training patterns, i.e., once it has converged.

Because the methods and device described can be used in neural networks with any amount and type of feedback, a variety of practical benefits are provided. The documented learning method gives ANN designers the ability to construct neural network structures that more closely resemble the complex feedback structures observed in biological neural networks. This leads to more useful and more adaptive neural network designs, which will enhance a variety of applications where neural networks are currently used. The added flexibility and scalability in neural network designs afforded by this learning method and neuron device is also likely to open new opportunities to use neural networks in applications that previous neural network structures were simply not adequately able to accommodate.

Output-influenced and input-influenced learning that further incorporates error values within the calculated influence values that are returned to pre-synaptic neurons are self-limiting and can be run in continuous learning situations. Similarly, the added flexibility of using feedback will also permit network designs that can more easily be specifically constructed to limit their own levels of vigilance and attention, thereby allowing networks that can continuously learn from within their working environments.

Another exciting ramification of this learning method, and the neuron device that implements it, is that it permits neurons to be constructed that are functionally self-contained. The neuron used in the Reinforcement Learning Chess Net, and in the Input-Influenced Chess Net (documented in the schematic of FIG. 11) contains all of the structural and functional components needed to build learning networks of neurons entirely within the individual neuron unit. No outside, globally-dependent functionality need be executed at the network-level in order to support the learning and weight-training method performed by networks of these neurons. One of the promises of neural networks has been that they will be infinitely scalable to run on multiple parallel processors. If a learning method were required to run globally over all the neurons in a given network, the otherwise massively parallel nature of a network of neurons would be lost. By allowing all the learning and weight-adjustment functionality to be performed autonomously, entirely within the computational structure of each single neuron in the network, this method and neuron device does away with the need for network-level global functionality that would otherwise restrict the scalability of networks of neurons.

While my above description contains many specificities, these should not be construed as limitations on the scope, but rather as exemplifications of several embodiments. Many other variations are possible. For example, neuron calculations may be expressed using integer math equivalents to the floating-point formulas described here. This saves considerably on energy consumption in large networks of neurons, i.e., it saves the added energy costs associated with using floating-point processing units for each computer processing unit.

There is no limit to the number of layers that neural networks using this learning method or neuron device can employ in their construction. The weight-adjustment method may also be used in combination with other weight-adjustment methods within the same neuron or processing unit.

All the various conventional means used within the embodiments may be expanded upon or eliminated to suit specific applications. These include the selection of learning rates used in weight adjustments, the means of specifying synapse proportions to be accumulated by the summing functions, the function (if any) applied to the neuron output value when using it within error value calculations, and the transfer functions used for the neuron output or for weight sums, to name some. The learning method may also be employed as the learning method used to adjust one or more synapse weights in neurons with multiple weights per a synapse, such as the neuron described in my above-referenced patent application.

ANNs built and trained using the learning method or neuron device described in the embodiments are not limited to the chess application used for illustrative purposes, but may be used in a variety of applications that include, but are not limited to such applications as: more adaptive autonomous factory automation, autonomous control of unmanned vehicles, pattern and character recognition, and artificial intelligence applications including medical diagnosis. They may also be used in most applications where conventional artificial neurons are used today, bringing the added benefit of a more general learning algorithm that can be used in any network topology, and being able to accommodate many future design improvements.

Thus, the scope of the embodiments should be determined by the appended claims and their legal equivalents, rather than by the examples given.

The invention claimed is:

1. In an artificial neural network comprising a plurality of functionally connected neurons, including pre-synaptic neurons and other neurons, a method of producing or generating weight-adjustment factors for said pre-synaptic neurons, comprising:

(a) providing a plurality of interconnected artificial neuron means for use as processing unit means, each interconnected artificial neuron means comprising:

(1) a plurality of connection means that accept respective input signals from others of said plurality of interconnected artificial neuron means or input signals from external sources, (2) means for storing or supplying respective weight values for each of said plurality of connection means, (3) modulating means for modulating the values of said input signals accepted at said plurality of connection means by said respective weight values, thereby to provide a respective modulation result for each of said plurality of connection means, and (4) an output means for storing or supplying an output signal value derived by summing the results of said modulating means in said plurality of connection means and subjecting the result to a transfer function, (b) calculating a plurality of respective influence values by modulating said respective input signal values by said respective weight values within at least one of said plurality of connection means, and (c) forming an error value for each of said pre-synaptic neurons by accumulating and storing a sum of the respective influence values calculated in said plurality of connection means to which the output signal value of each pre-synaptic neuron connects, whereby said error value will be used as a factor to adjust each of said respective weight values for said plurality of connection means, so that weight values representing connection strengths from pre-synaptic neurons and external sources will tend to be adjusted most when said interconnected artificial neuron means has exercised the greatest influence over the individual modulation results of artificial neuron means to which its output means is connected.

2. The method of claim 1, further including modulating said respective influence values by said output signal value to produce said respective influence values, whereby output signal values are additionally used in influence value calculations that are in turn used to form said error value, whereby said error value will, in turn, be used as a factor to adjust each respective weight value for each of said plurality of connection means, so that the weight values representing connection strengths from pre-synaptic neurons and external sources will tend to be adjusted most when said neuron means has exercised the greatest influence over the output signal values of the post-synaptic artificial neuron means to which its output means is connected.

3. The method of claim 2, further including modulating said respective influence values by said error value to produce said respective influence values, whereby weight value adjustment calculations within said neuron means will be further modified by the error values of post-synaptic artificial neuron means to which said output means is connected.

4. The method of claim 2, further including setting said respective influence values to have the same mathematical sign as said error value to produce said respective influence values, whereby the absolute value of each of the respective influence values is made negative if the error value is negative, and positive if the error value is positive, such that weight value adjustment calculations within said artificial neuron means will be further modulated based on the mathematical signs of the error values of post-synaptic neurons to which said output means is connected.

5. The method of claim 1, further including modulating each of said respective influence values by said error value, whereby weight value adjustment calculations within said artificial neuron means will be further modified by the respective error values of post-synaptic neurons to which said output means is connected.

6. The method of claim 1, further including setting said respective influence values to have the same mathematical sign as said error value to produce said respective influence values, whereby the absolute value of each of the respective influence values is made negative if the error value is negative, and positive if the error value is positive, such that weight value adjustment calculations within pre-synaptic neurons will be further modulated based on the mathematical signs of the error values of post-synaptic neurons to which said output means is connected.

7. A neuron device for use in artificial neural networks, each neuron device comprising:
- (a.) at least one synapse comprising:
  - (1.) an input arranged to accept an input signal value from a neuron device or from an external source,
  - (2.) a weight memory for storing or supplying at least one synapse weight or weight value,
  - (3.) a synapse modulator for modulating said input signal value by said weight value stored or supplied at said weight memory, thereby to produce a synapse modulation result determined by modulating said input signal by the value of said synapse weight,
  - (4.) an influence value calculator for calculating a resultant influence value by modulating said input signal value by said weight value stored or supplied at said weight memory, and
- (b.) a summing unit for accumulating results of said synapse modulator in said one synapse, or plural synapses into an internal sum,
- (c.) an output for subjecting said internal sum to a predetermined transfer function, thereby to provide an output value, and
- (d.) an error-value accumulator for producing an error value by accumulating and storing influence values calculated by the influence value calculators within any synapses of post-synaptic neurons to which said output of said neuron device connects, whereby said error value will be used as a factor to adjust each respective weight value for each of said one or more synapses, so that weight values representing connection strengths from pre-synaptic neurons and external sources will tend to be adjusted most when said neuron device has exercised the greatest influence over synapse modulation results of the post-synaptic neurons to which its output is connected.

8. A neuron device of claim 7 wherein said influence value calculator additionally modulates said resultant influence value by said output value of said neuron device, thereby to produce said resultant influence value, whereby output signal values are additionally used in influence value calculations that are accumulated by said error value accumulator, whereby said error value will, in turn, be used as a factor to adjust each respective weight value for each of said one or more synapses, so that weight values representing connection strengths from pre-synaptic neurons and external sources will tend to be adjusted most when said output value of said neuron device has exercised the greatest influence over the output values of post-synaptic neurons to which its output value is connected.

9. The neuron device of claim 8 wherein said influence value calculator is arranged to further multiply said resultant influence value by said error value of said neuron device, thereby to produce said resultant influence value, whereby weight value adjustment calculations within said neuron device will be further modified by the error values of post-synaptic neurons to which said output value is connected.

10. The neuron device of claim 8 wherein said influence value calculator is arranged to further cause said resultant influence value to have the same mathematical sign as said error value of said neuron device, thereby to produce said resultant influence value, whereby the absolute value of the resultant influence value produced by said influence value calculator is made negative if the error value is negative, and positive if the error value is positive, such that weight value adjustment calculations within said neuron device will be further modulated based on the mathematical signs of error values of post-synaptic neurons to which said output value is connected.

11. The neuron device of claim 7 wherein said influence value calculator is arranged to further modulate said resultant influence value by said error value of said neuron device, thereby to produce said resultant influence value, whereby weight value adjustment calculations within said neuron device will be further modified by the error values of post-synaptic neurons to which said output value is connected.

12. The neuron device of claim 7 wherein said influence value calculator is arranged to additionally causes said resultant value to have the same mathematical sign as said error value of said neuron device, thereby to produce said resultant influence value, whereby the absolute value of the resultant influence value of said influence value calculator is made negative if the error value is negative, and positive if the error value is positive, such that weight value adjustment calculations within said neuron device will be further modulated based on the mathematical signs of the error values of post-synaptic neurons to which said output value is connected.

13. A neuron unit, comprising:
- (a.) at least one synapse means, comprising:
  - (1.) connection means for accepting an input signal value from another neuron unit or from external sources,
  - (2.) weight means for storing or supplying at least one synapse weight or weight value,
  - (3.) synapse modulating means for modulating said input signal value by said synapse weight, thereby to produce a synapse modulation result or weighted-input, and
  - (4.) an influence value calculating means for calculating a resultant influence value by modulating said input signal value by the value of said synapse weight, thereby to produce an influence value,
- (b.) a summing means for accumulating the results from said synapse modulating means in any of said one synapse means, or plural synapses means into an internal sum,
- (c.) an output means for subjecting said internal sum accumulated by said summing means to a predetermined transfer function, thereby to provide an output value, and
- (d.) an error value means for producing an error value by summing the influence values produced by said influence value calculating means in any synapse means to which said output means is connected, whereby said error value produced by said error value means will be used as a factor to adjust each respective weight value in each of said one or more synapse means, or plural synapse means so that weight values representing connection strengths from pre-synaptic neurons and external sources will tend to be adjusted most when said neuron unit has exercised the greatest influence over the individual synapse modulation results of post-synaptic neurons to which its output means is connected.

14. A neuron unit of claim 13 wherein said influence value calculating means additionally modulates said resultant influence value by said output value of said neuron device, thereby to produce said resultant influence value, whereby output signal values are additionally used in influence value calculations that are summed by said error value means, and said error value will, in turn, be used as a factor to adjust each weight value comprising each of said at least one synapse means, so that the weight values representing connection strengths from pre-synaptic neurons and external sources will tend to be adjusted most when said neuron unit has exercised the greatest influence over output values of the neurons to which its output means is connected.

15. The neuron unit of claim 14 wherein said influence value calculating means is arranged to further multiply said resultant influence value by said error value of said neuron device, thereby to produce said resultant influence value,
   whereby weight value adjustment calculations within said neuron unit will be further modified by error values of post-synaptic neurons to which said output means of said neuron unit is connected.

16. The neuron unit of claim 14 wherein said influence value calculating means is arranged to further cause said resultant influence value to have the same mathematical sign as said error value of said neuron device, thereby to produce said resultant influence value,
   whereby the absolute value of said resultant influence value of said influence value calculating means is made negative if said error value is negative, and positive if said error value is positive, such that weight value adjustment calculations within said neuron means will be further modulated based on the mathematical signs of said error values of any post-synaptic neurons to which said output means of said neuron unit is connected.

17. The neuron unit of claim 13 wherein said influence value calculating means is arranged to further modulate said resultant influence value by said error value of said neuron device, thereby to produce said resultant influence value,
   whereby weight value adjustment calculations within said neuron unit will be further modified by said error values of any post-synaptic neurons to which said output value of said neuron unit is connected.

18. The neuron unit of claim 13, wherein said influence value calculating means further includes means for setting said resultant influence value to have the same mathematical sign as said error value of said neuron unit,
   whereby the absolute value of the resultant influence value of said influence value calculating means is made negative if the error value is negative, and positive if the error value is positive, such that weight value adjustment calculations within said neuron unit will be further modulated based on the mathematical signs of the error values of post-synaptic neurons to which said output value of said neuron unit is connected.

* * * * *